US011509879B2

United States Patent
Oh et al.

(10) Patent No.: US 11,509,879 B2
(45) Date of Patent: Nov. 22, 2022

(54) METHOD FOR TRANSMITTING VIDEO, APPARATUS FOR TRANSMITTING VIDEO, METHOD FOR RECEIVING VIDEO, AND APPARATUS FOR RECEIVING VIDEO

(71) Applicant: LG Electronics Inc., Seoul (KR)

(72) Inventors: Hyunmook Oh, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/281,477

(22) PCT Filed: Oct. 1, 2019

(86) PCT No.: PCT/KR2019/012844
§ 371 (c)(1),
(2) Date: Mar. 30, 2021

(87) PCT Pub. No.: WO2020/071738
PCT Pub. Date: Apr. 9, 2020

(65) Prior Publication Data
US 2021/0409670 A1 Dec. 30, 2021

(30) Foreign Application Priority Data
Oct. 2, 2018 (KR) ........................ 10-2018-0117734

(51) Int. Cl.
*H04N 13/161* (2018.01)
*H04N 13/111* (2018.01)
(Continued)

(52) U.S. Cl.
CPC ......... *H04N 13/161* (2018.05); *H04N 13/111* (2018.05); *H04N 13/194* (2018.05); *H04N 19/597* (2014.11)

(58) Field of Classification Search
None
See application file for complete search history.

(56) References Cited

U.S. PATENT DOCUMENTS

2011/0280316 A1* 11/2011 Chen .................... H04N 13/161
375/240.25
2014/0314147 A1* 10/2014 Rusanovskyy ...... H04N 19/467
375/240.12
(Continued)

FOREIGN PATENT DOCUMENTS

KR 1020150031500 3/2015

OTHER PUBLICATIONS

PCT International Search Report and Written Opinion in international Appln. No. PCT/KR2019/012844, dated Feb. 3, 2020, 12 pages (with English translation).

*Primary Examiner* — Christopher Braniff
(74) *Attorney, Agent, or Firm* — Fish & Richardson P.C.

(57) ABSTRACT

In accordance with embodiments, a method of transmitting a video includes inter-view redundancy removing pictures for multiple viewing positions; packing inter-view redundancy removed pictures; and/or encoding the packed pictures and/or signaling information including center view generation information, pre-generation information, view synthesis recommendation information and/or reference view information. In accordance with embodiments, a method of receiving a video includes decoding a bitstream of the video based on viewing position and/or viewport information, unpacking pictures in the decoded bitstream; view regenerating the unpacked pictures; and/or view synthesizing the view regenerated pictures.

20 Claims, 31 Drawing Sheets

(51) Int. Cl.
*H04N 13/194* (2018.01)
*H04N 19/597* (2014.01)

(56) References Cited

U.S. PATENT DOCUMENTS

2016/0088282 A1 3/2016 Sadi et al.
2016/0301936 A1 10/2016 Chen et al.

* cited by examiner

FIG. 7
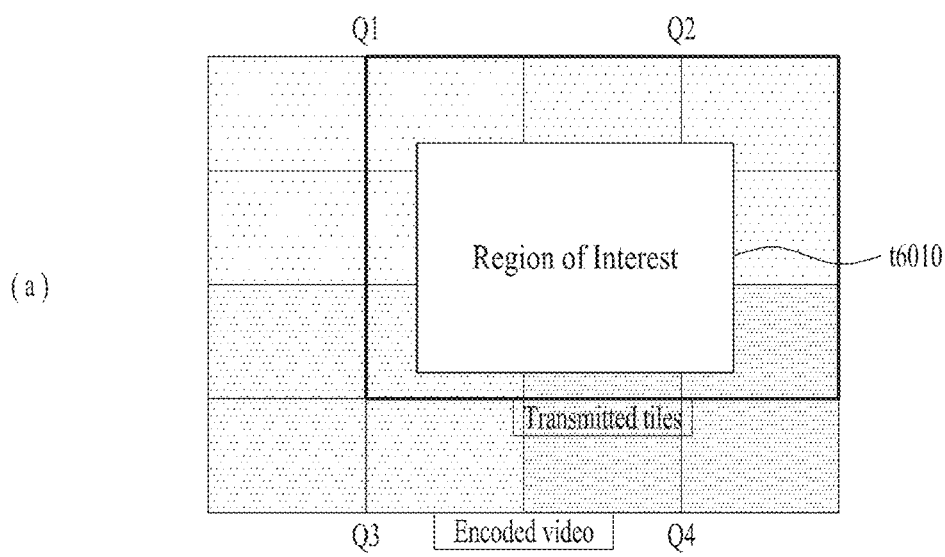
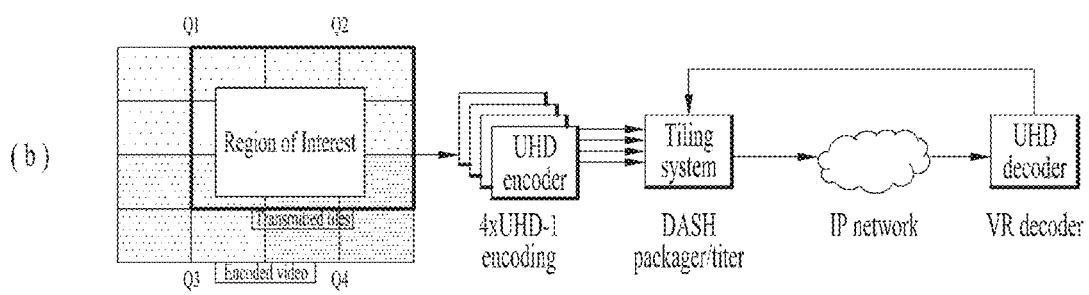

FIG. 8

```
      <basic metadata>
unsigned    int(8)         vr_geometry;
unsigned    int(8)         projection_schme;
      <stereoscopic-related metadata>
unsigned    int(1)         is_stereoscopic;
unsigned    int(3)         stereo_mode;
      <initial-view-related metadata>
signed      int(8)         initial_view_yaw_degree;
signed      int(8)         initial_view_pitch_degree;
signed      int(8)         initial_view_roll_degree;
      <roi-related metadata>
unsigned int(1)            2d_roi_range_flag;
unsigned int(1)            3d_roi_range_flag;
if (2d_roi_region_flag == 1) {
   unsigned int(16) min_top_left_x;
   unsigned int(16) max_top_left_x;
   unsigned int(16) min_top_left_y;
   unsigned int(16) max_top_left_y;
   unsigned int(16) min_width;
   unsigned int(16) max_width;
   unsigned int(16) min_height;
   unsigned int(16) max_height;
   unsigned int(16) min_x;
   unsigned int(16) max_x;
   unsigned int(16) min_y;
   unsigned int(16) max_y;
}
if (3d_roi_region_flag == 1) {
   unsigned int(16) min_yaw;
   unsigned int(16) max_yaw;
   unsigned int(16) min_pitch;
   unsigned int(16) max_pitch;
   unsigned int(16) min_roll;
   unsigned int(16) max_roll;
   unsigned int(16) min_field_of_view;
   unsigned int(16) max_field_of_view;
}
      <field-of-view-related metadata>
unsigned int(1)            content_fov_flag;
if (content_fov_flag == 1) {
   unsigned int(16)        content_fov;
}
      <cropped-region-related metadata>
unsigned int(1)            is_cropped_region;
if (is_cropped_region == 1) {
   unsigned int(16)        cr_region_left_top_x;
   unsigned int(16)        cr_region_left_top_y;
   unsigned int(16)        cr_region_width;
   unsigned int(16)        cr_region_height;
}
```

FIG. 30

| | Descriptor |
|---|---|
| viewing_position_group_information (payloadSize) { | |
| viewing_position_group_info_id | u(14) |
| viewing_position_group_info_cancel_flag | u(1) |
| if ( !viewing_position_group_info_cancel_flag ) { | |
| viewing_position_group_info_persistence_flag | u(1) |
| viewpoint_id | u(8) |
| view_position_descriptor( ) // viewpoint position, total coverage, total rotation | |
| center_view_present_flag | u(1) |
| out_of_center_ref_view_present_flag // could signal the numbers if needed | u(1) |
| source_view_with_regeneration_present_flag | u(1) |
| pregenerated_view_present_flag | u(1) |
| analyzed_view_synthesis_info_present_flag | u(1) |
| dynamic_interview_reference_flag | u(1) |
| reserved_2bits | u(2) |
| if ( !center_view_present_flag ) { // center view generation info | |
| alternative_viewing_position_id | u(8) |
| alternative_view_distance // use the recommendation if distance is acceptable | u(32) |
| rec_center_view_generation_method_type[ i ] | u(8) |
| center_view_generation_parameter( ) | |
| for( i = 0; i < = num_pictures_for_center_view_generation; i++ ) { | |
| viewing_position_id[ i ] | u(8) |
| center_view_generation_parameter( ) | u(32) |
| } | |
| } | |
| num_viewing_positions | u(8) |
| for( i = 0; i < = num_viewing_positions; i++ ) { | |
| view_position_descriptor( ) | u(1) |
| view_position_depth_present_flag | u(1) |
| view_position_texture_present_flag | u(1) |
| view_position_processing_order_id[ i ] | u(3) |
| if( viewing_position_picture_type[ i ] == 1 ) { // picture processing type | u(5) |
| num_views_using_this_ref_view[ i ] | u(8) |
| for( j = 0; j < = num_views_using_this_ref_view[ i ]; j++ ) { | |
| viewing_position_id[ i ][ j ] // viewing positions that uses this ref view | u(8) |
| } | |
| else if( viewing_position_picture_type[ i ] == 2 ) { // regeneration | |
| num_ref_views[ i ] | u(8) |
| for( j = 0; j < = num_ref_views[ i ]; j++ ) { // ref. viewing positions for view regeneration | u(8) |
| viewing_position_id[ i ][ j ] | |
| view_regeneration_method_type[ i ] | |

| | |
|---|---|
| num_sparse_views[ i ] | u(8) |
| for( j = 0; j < = num_sparse_views[ i ]; j++ ) | |
| picture_id[ i ][ j ] | u(8) |
| } | |
| else if( viewing_position_picture_type[ i ] == 3 ) { // pre-generated views | |
| regeneration_method_type[ i ] | u(6) |
| num_ref_views[ i ] | u(8) |
| for( j = 0; j < = num_ref_views[ i ]; j++ ) | |
| viewing_position_id[ i ][ j ] // ref. viewing positions for view regeneration | u(8) |
| view_regeneration_method_type[ i ] | u(8) |
| num_sparse_views[ i ] | u(8) |
| for( j = 0; j < = num_sparse_views[ i ]; j++ ) | |
| picture_id[ i ][ j ] | u(8) |
| } | |
| else if(viewing_position_picture_type[ i ] == 4 ) { // views synthesis recommended position | |
| ref_view_synthesis_method_type[ i ] | u(8) |
| view_synthesis_parameter( ) | u(8) |
| num_ref_views[ i ] // representing whether one view or multiple views | u(8) |
| for( j = 0; j < = num_ref_views[ i ]; j++ ) { | |
| viewing_position_id[ i ][ j ] // ref. viewing positions for view regeneration | u(8) |
| sparse_view_present_flag | u(1) |
| reserved_7bits | u(7) |
| } | |
| else if(viewing_position_picture_type[ i ] == 5 ) // redundant view | |
| alternative_viewing_position_id[ i ] | u(8) |
| } | |
| view_position_descriptor( ) { | |
| viewing_position_id | u(8) |
| viewing_position_x | u(32) |
| viewing_position_y | u(32) |
| viewing_position_z | u(32) |
| viewing_orientation_yaw | u(32) |
| viewing_orientation_pitch | u(32) |
| viewing_orientation_roll | u(32) |
| coverage_horizontal | u(32) |
| coverage_vertical | u(32) |

METHOD FOR TRANSMITTING VIDEO, APPARATUS FOR TRANSMITTING VIDEO, METHOD FOR RECEIVING VIDEO, AND APPARATUS FOR RECEIVING VIDEO

CROSS-REFERENCE TO RELATED APPLICATIONS

This application is a National Stage application under 35 U.S.C. § 371 of International Application No. PCT/KR2019/012844, filed on Oct. 1, 2019, which claims the benefit of Korean Application No. 10-2018-0117734, filed on Oct. 2, 2018. The disclosures of the prior applications are incorporated by reference in their entirety.

TECHNICAL FIELD

The present disclosure relates to a method for transmitting a video, an apparatus for transmitting a video, a method for receiving a video, and an apparatus for receiving a video.

BACKGROUND ART

A virtual reality (VR) system provides a user with sensory experiences through which the user may feel as if he/she were in an electronically projected environment. A system for providing VR may be further improved in order to provide higher-quality images and spatial sound. Such a VR system may enable the user to interactively enjoy VR content.

DISCLOSURE OF INVENTION

Technical Problem

VR systems need to be improved in order to more efficiently provide a user with a VR environment. To this end, it is necessary to propose plans for data transmission efficiency for transmitting a large amount of data such as VR content, robustness between transmission and reception networks, network flexibility considering a mobile reception apparatus, and efficient reproduction and signaling.

Solution to Problem

In order to solve the technical problem, a method of transmitting a video may be disclosed. The method comprising, inter-view redundancy removing pictures for multiple viewing positions; packing inter-view redundancy removed pictures; and encoding the packed pictures and signaling information including center view generation information, pre-generation information, view synthesis recommendation information and reference view information.

Additionally, an example of the method may include, generating a center view picture and center view generation information based on source view pictures included in the pictures for multiple viewing positions, wherein the packing further packs the center view picture.

Moreover, an example of the method may include, synthesizing intermediate view pictures based on the source view pictures, wherein the synthesizing generates intermediate view pictures, pre-generation information and view synthesis recommendation information. And wherein the inter-view redundancy removing performs pruning redundancy based on the source view pictures and the center view picture, wherein the inter-view redundancy removed pictures include one or more sparse view pictures and one or more reference view pictures.

In addition, an example of the method, wherein the inter-view redundancy removing generates reference view information, the reference view information including first information representing a number of the reference view pictures and second information representing a number of the sparse view pictures, wherein the pre-generation information includes third information representing type of pre-generation method. And wherein the center view generation information includes fourth information for alternative viewing position related to the center view picture and fifth information related to method of generating the center view.

In order to solve the technical problem, a method of receiving a video may be disclosed. The method may include decoding a bitstream of the video based on viewing position and viewport information; unpacking pictures in the decoded bitstream; view regenerating the unpacked pictures; and view synthesizing the view regenerated pictures.

Additionally, an example of the method may include, generating a center view picture based on reference view pictures included in the unpacked pictures and center view generation information included in the decoded bitstream, wherein the view regenerating is performed based on the center view picture, the reference view pictures, sparse view pictures included in the unpacked pictures and reference view information.

Additionally, an example of the method may include, parsing the decoded bitstream including the reference view information, the center view generation information and information for view synthesis, wherein the view synthesizing is performed based on the information for view synthesis.

Moreover, the reference view pictures include a first picture and a second picture, wherein the center view picture is generated based on the first picture and the second picture, wherein the view regeneration generates a third picture based on the center view picture and a fourth picture included in the sparse view pictures, wherein the view synthesizing synthesizes a fifth picture based on the center view picture, the first picture and the third picture.

Advantageous Effects of Invention

Receivers could generate a video with head motion parallax and/or binocular disparity, or different viewpoints, which receivers could generate interactive video with changing locations.

Therefore, by saving bandwidth to deliver the 3DoF+ video or the storage space, high quality of 3DoF+ video which could provide head motion parallax could be achieved.

Receiver can provide different viewing experience with viewer's action in the VR environment.

This could increase bit efficiency by eliminating redundant information between views.

Also, in the usage of the view regeneration information SEI message, the bit efficiency of the encoded 3DoF+ video is anticipated to be increased since the redundancy between multiple pictures are removed by using the spatial relationship of adjacent viewing position. By saving bandwidth to deliver the 3DoF+ video or the storage space, high quality of 3DoF+ video which could provide head motion parallax could be achieved. Also, receiver can provide different viewing experience with viewer's action in the VR environment.

BRIEF DESCRIPTION OF DRAWINGS

FIG. 7 is a view showing a tile according to an embodiment of the present disclosure.

FIG. 8 is a view showing 360-degree-video-related metadata according to an embodiment of the present disclosure.

FIG. 30 shows viewing position group information SEI message syntax according to some embodiments.

BEST MODE FOR CARRYING OUT THE INVENTION

Reference will now be made in detail to the preferred embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood according to the intended meanings of the terms rather than their simple names or meanings.

Figure 1:
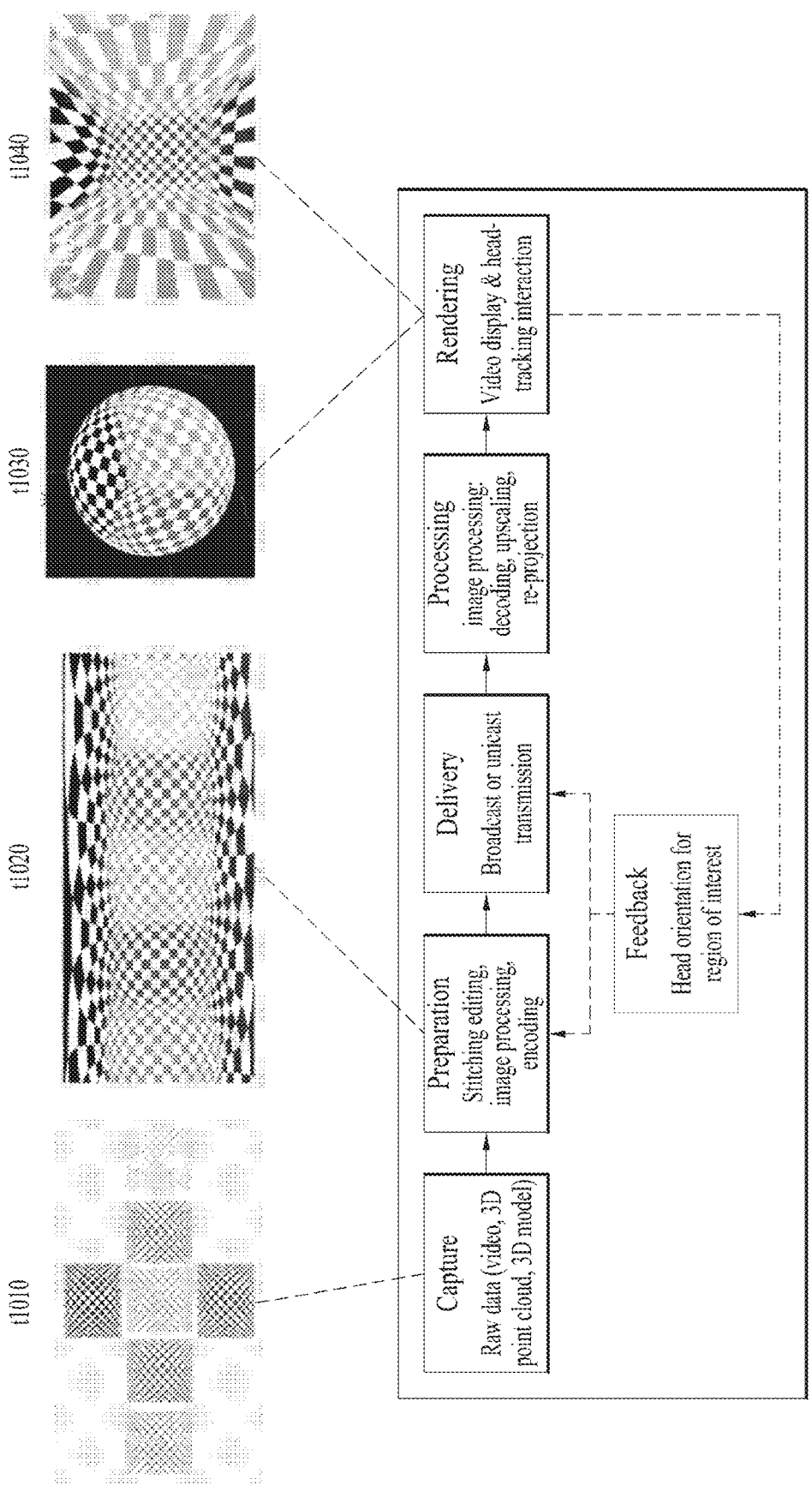
FIG. 1 is a view showing the entire architecture for providing a 360-degree video according to the present disclosure.

FIG. 1 is a view showing the entire architecture for providing 360-degree video according to the present disclosure.

The present disclosure proposes a scheme for 360-degree content provision in order to provide a user with virtual reality (VR). VR may mean technology or an environment for replicating an actual or virtual environment. VR artificially provides a user with sensual experiences through which the user may feel as if he/she were in an electronically projected environment.

360-degree content means all content for realizing and providing VR, and may include 360-degree video and/or 360-degree audio. The term "360-degree video" may mean video or image content that is captured or reproduced in all directions (360 degrees) at the same time, which is necessary to provide VR. Such 360-degree video may be a video or an image that appears in various kinds of 3D spaces depending on 3D models. example, the 360-degree video may appear on a spherical surface. The term "360-degree audio", which is audio content for providing VR, may mean spatial audio content in which the origin of a sound is recognized as being located in a specific 3D space. The 360-degree content may be generated, processed, and transmitted to users, who may enjoy a VR experience using the 360-degree content.

The present disclosure proposes a method of effectively providing 360-degree video in particular. In order to provide 360-degree video, the 360-degree video may be captured using at least one camera. The captured 360-degree video may be transmitted through a series of processes, and a reception side may process and render the received data into the original 360-degree video. As a result, the 360-degree video may be provided to a user.

Specifically, the overall processes of providing the 360-degree video may include a capturing process, a preparation process, a delivery process, a processing process, a rendering process, and/or a feedback process.

The capturing process may be a process of capturing an image or a video at each of a plurality of viewpoints using at least one camera. At the capturing process, image/video data may be generated, as shown (t1010). Each plane that is shown (t1010) may mean an image/video at each viewpoint. A plurality of captured images/videos may be raw data. At the capturing process, capturing-related metadata may be generated.

A special camera for VR may be used for capturing. In some embodiments, in the case in which 360-degree video for a virtual space generated by a computer is provided, capturing may not be performed using an actual camera. In this case, a process of simply generating related data may replace the capturing process.

The preparation process may be a process of processing the captured images/videos and the metadata generated at the capturing process. At the preparation process, the captured images/videos may undergo a stitching process, a projection process, a region-wise packing process, and/or an encoding process.

First, each image/video may undergo the stitching process. The stitching process may be a process of connecting the captured images/videos to generate a panoramic image/video or a spherical image/video.

Subsequently, the stitched image/video may undergo the projection process. At the projection process, the stitched image/video may be projected on a 2D image. Depending on the context, the 2D image may be called a 2D image frame. 2D image projection may be expressed as 2D image mapping. The projected image/video data may have the form of a 2D image, as shown (t1020).

The video data projected on the 2D image may undergo the region-wise packing process in order to improve video coding efficiency. The region-wise packing process may be a process of individually processing the video data projected on the 2D image for each region. Here, the term "regions" may indicate divided parts of the 2D image on which the video data are projected. In some embodiments, regions may be partitioned by uniformly or arbitrarily dividing the 2D image. Also, in some embodiments, regions may be partitioned depending on a projection scheme. The region-wise packing process is optional, and thus may be omitted from the preparation process.

In some embodiments, this process may include a process of rotating each region or rearranging the regions on the 2D image in order to improve video coding efficiency. For example, the regions may be rotated such that specific sides of the regions are located so as to be adjacent to each other, whereby coding efficiency may be improved.

In some embodiments, this process may include a process of increasing or decreasing the resolution of a specific region in order to change the resolution for areas on the 360-degree video. For example, regions corresponding to relatively important areas in the 360-degree video may have higher resolution than other regions. The video data projected on the 2D image or the region-wise packed video data may undergo the encoding process via a video codec.

In some embodiments, the preparation process may further include an editing process. At the editing process, image/video data before and after projection may be edited. At the preparation process, metadata related to stitching/projection/encoding/editing may be generated in the same manner. In addition, metadata related to the initial viewpoint of the video data projected on the 2D image or a region of interest (ROI) may be generated.

The delivery process may be a process of processing and delivering the image/video data that have undergone the preparation process and the metadata. Processing may be performed based on an arbitrary transport protocol for delivery. The data that have been processed for delivery may be delivered through a broadcast network and/or a broadband connection. The data may be delivered to the reception side in an on-demand manner. The reception side may receive the data through various paths.

The processing process may be a process of decoding the received data and re-projecting the projected image/video data on a 3D model. In this process, the image/video data projected on the 2D image may be re-projected in a 3D space. Depending on the context, this process may be called mapping or projection. At this time, the mapped 3D space may have different forms depending on the 3D model. For example, the 3D model may be a sphere, a cube, a cylinder, or a pyramid.

In some embodiments, the processing process may further include an editing process and an up-scaling process. At the editing process, the image/video data before and after re-projection may be edited. In the case in which the image/video data are down-scaled, the size of the image/video data may be increased through up-scaling at the up-scaling process. As needed, the size of the image/video data may be decreased through down-scaling.

The rendering process may be a process of rendering and displaying the image/video data re-projected in the 3D space. Depending on the context, a combination of re-projection and rendering may be expressed as rendering on the 3D model. The image/video re-projected on the 3D model (or rendered on the 3D model) may have the form that is shown (t1030). The image/video is re-projected on a spherical 3D model, as shown (t1030). The user may view a portion of the rendered image/video through a VR display. At this time, the portion of the image/video that is viewed by the user may have the form that is shown (t1040).

The feedback process may be a process of transmitting various kinds of feedback information that may be acquired at a display process to a transmission side. Interactivity may be provided in enjoying the 360-degree video through the feedback process. In some embodiments, head orientation information, information about a viewport, which indicates the area that is being viewed by the user, etc. may be transmitted to the transmission side at the feedback process. In some embodiments, the user may interact with what is realized in the VR environment. In this case, information related to the interactivity may be provided to the transmission side or to a service provider side at the feedback process. In some embodiments, the feedback process may not be performed.

The head orientation information may be information about the position, angle, and movement of the head of the user. Information about the area that is being viewed by the user in the 360-degree video, i.e. the viewport information, may be calculated based on this information.

The viewport information may be information about the area that is being viewed by the user in the 360-degree video. Gaze analysis may be performed therethrough, and therefore it is possible to check the manner in which the user enjoys the 360-degree video, the area of the 360-degree video at which the user gazes, and the amount of time during which the user gazes at the 360-degree video. The gaze analysis may be performed at the reception side and may be delivered to the transmission side through a feedback channel. An apparatus, such as a VR display, may extract a viewport area based on the position/orientation of the head of the user, a vertical or horizontal FOV that is supported by the apparatus, etc.

In some embodiments, the feedback information may not only be delivered to the transmission side, but may also be used at the reception side. That is, the decoding, re-projection, and rendering processes may be performed at the reception side using the feedback information. For example, only the portion of the 360-degree video that is being viewed by the user may be decoded and rendered first using the head orientation information and/or the viewport information.

Here, the viewport or the viewport area may be the portion of the 360-degree video that is being viewed by the user. The viewpoint, which is the point in the 360-degree video that is being viewed by the user, may be the very center of the viewport area. That is, the viewport is an area based on the viewpoint. The size or shape of the area may be set by a field of view (FOV), a description of which will follow.

In the entire architecture for 360-degree video provision, the image/video data that undergo a series of capturing/projection/encoding/delivery/decoding/re-projection/rendering processes may be called 360-degree video data. The term "360-degree video data" may be used to conceptually include metadata or signaling information related to the image/video data.

Figure 2:
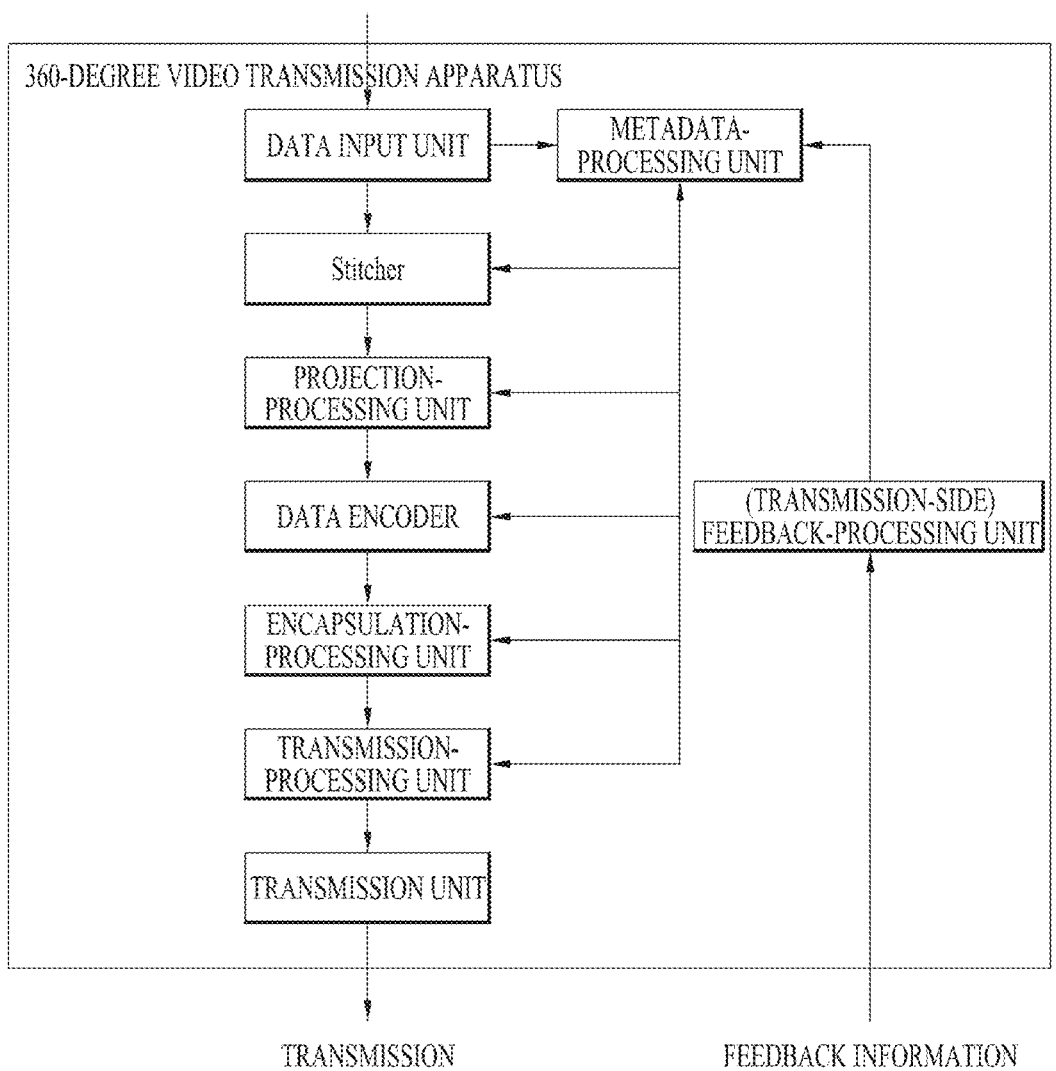
FIG. 2 is a view showing a 360-degree video transmission apparatus according to an aspect of the present disclosure.

FIG. 2 is a view showing a 360-degree video transmission apparatus according to an aspect of the present disclosure.

According to an aspect of the present disclosure, the present disclosure may be related to a 360-degree video transmission apparatus. The 360-degree video transmission apparatus according to the present disclosure may perform operations related to the preparation process and the delivery process. The 360-degree video transmission apparatus according to the present disclosure may include a data input unit, a stitcher, a projection-processor, a region-wise packing processor (not shown), a metadata-processor, a (transmission-side) feedback-processor, a data encoder, an encapsulation-processor, a transmission-processor, and/or a transmission unit as internal/external elements.

The data input unit may allow captured viewpoint-wise images/videos to be input. The viewpoint-wise image/videos may be images/videos captured using at least one camera. In addition, the data input unit may allow metadata generated at the capturing process to be input. The data input unit may deliver the input viewpoint-wise images/videos to the stitcher, and may deliver the metadata generated at the capturing process to a signaling processor.

The stitcher may stitch the captured viewpoint-wise images/videos. The stitcher may deliver the stitched 360-degree video data to the projection-processor. As needed, the stitcher may receive necessary metadata from the metadata-processor in order to use the received metadata at the stitching process. The stitcher may deliver metadata generated at the stitching process to the metadata-processor. The metadata generated at the stitching process may include information about whether stitching has been performed and the stitching type.

The projection-processor may project the stitched 360-degree video data on a 2D image. The projection-processor may perform projection according to various schemes, which will be described below. The projection-processor may perform mapping in consideration of the depth of the viewpoint-wise 360-degree video data. As needed, the projection-processor may receive metadata necessary for projection from the metadata-processor in order to use the received metadata for projection. The projection-processor may deliver metadata generated at the projection process to the metadata-processor. The metadata of the projection-processor may include information about the kind of projection scheme.

The region-wise packing processor (not shown) may perform the region-wise packing process. That is, the region-wise packing processor may divide the projected 360-degree video data into regions, and may rotate or re-arrange each region, or may change the resolution of each region. As previously described, the region-wise packing process is optional. In the case in which the region-wise packing process is not performed, the region-wise packing processor may be omitted. As needed, the region-wise packing processor may receive metadata necessary for region-wise packing from the metadata-processor in order to use the received metadata for region-wise packing. The region-wise packing processor may deliver metadata generated at the region-wise packing process to the metadata-processor. The metadata of the region-wise packing processor may include the extent of rotation and the size of each region.

In some embodiments, the stitcher, the projection-processor, and/or the region-wise packing processor may be incorporated into a single hardware component.

The metadata-processor may process metadata that may be generated at the capturing process, the stitching process, the projection process, the region-wise packing process, the encoding process, the encapsulation process, and/or the processing process for delivery. The metadata-processor may generate 360-degree-video-related metadata using the above-mentioned metadata. In some embodiments, the metadata-processor may generate the 360-degree-video-related metadata in the form of a signaling table. Depending on the context of signaling, the 360-degree-video-related metadata may be called metadata or signaling information related to the 360-degree video. In addition, the metadata-processor may deliver the acquired or generated metadata to the internal elements of the 360-degree video transmission apparatus, as needed. The metadata-processor may deliver the 360-degree-video-related metadata to the data encoder, the encapsulation-processor, and/or the transmission-processor such that the 360-degree-video-related metadata can be transmitted to the reception side.

The data encoder may encode the 360-degree video data projected on the 2D image and/or the region-wise packed 360-degree video data. The 360-degree video data may be encoded in various formats.

The encapsulation-processor may encapsulate the encoded 360-degree video data and/or the 360-degree-video-related metadata in the form of a file. Here, the 360-degree-video-related metadata may be metadata received from the metadata-processor. The encapsulation-processor may encapsulate the data in a file format of ISOBMFF or CFF, or may process the data in the form of a DASH segment. In some embodiments, the encapsulation-processor may include the 360-degree-video-related metadata on the file format. For example, the 360-degree-video-related metadata may be included in various levels of boxes in the ISOBMFF file format, or may be included as data in a separate track within the file. In some embodiments, the encapsulation-processor may encapsulate the 360-degree-video-related metadata itself as a file. The transmission-processor may perform processing for transmission on the encapsulated 360-degree video data according to the file format. The transmission-processor may process the 360-degree video data according to an arbitrary transport protocol. Processing for transmission may include processing for delivery through a broadcast network and processing for delivery through a broadband connection. In some embodiments, the transmission-processor may receive 360-degree-video-related metadata from the metadata-processor, in addition to the 360-degree video data, and may perform processing for transmission thereon.

The transmission unit may transmit the transmission-processed 360-degree video data and/or the 360-degree-video-related metadata through the broadcast network and/or the broadband connection. The transmission unit may include an element for transmission through the broadcast network and/or an element for transmission through the broadband connection.

In an embodiment of the 360-degree video transmission apparatus according to the present disclosure, the 360-degree video transmission apparatus may further include a data storage unit (not shown) as an internal/external element. The data storage unit may store the encoded 360-degree video data and/or the 360-degree-video-related metadata before delivery to the transmission-processor. The data may be stored in a file format of ISOBMFF. In the case in which the 360-degree video is transmitted in real time, no data storage unit is needed. In the case in which the 360-degree video is transmitted on demand, in non-real time (NRT), or through a broadband connection, however, the encapsulated 360-degree data may be transmitted after being stored in the data storage unit for a predetermined period of time.

In another embodiment of the 360-degree video transmission apparatus according to the present disclosure, the 360-degree video transmission apparatus may further include a (transmission-side) feedback-processor and/or a network interface (not shown) as an internal/external element. The network interface may receive feedback information from a 360-degree video reception apparatus according to the present disclosure, and may deliver the received feedback information to the transmission-side feedback-processor. The transmission-side feedback-processor may deliver the feedback information to the stitcher, the projection-processor, the region-wise packing processor, the data encoder, the encapsulation-processor, the metadata-processor, and/or the transmission-processor. In some embodiments, the feedback information may be delivered to the metadata-processor, and may then be delivered to the respective internal elements. After receiving the feedback information, the internal elements may reflect the feedback information when subsequently processing the 360-degree video data.

In another embodiment of the 360-degree video transmission apparatus according to the present disclosure, the region-wise packing processor may rotate each region, and may map the rotated region on the 2D image. At this time, the regions may be rotated in different directions and at different angles, and may be mapped on the 2D image. The rotation of the regions may be performed in consideration of the portions of the 360-degree video data that were adjacent to each other on the spherical surface before projection and the stitched portions thereof. Information about the rotation of the regions, i.e. the rotational direction and the rotational angle, may be signaled by the 360-degree-video-related metadata. In another embodiment of the 360-degree video transmission apparatus according to the present disclosure, the data encoder may differently encode the regions. The data encoder may encode some regions at high quality, and may encode some regions at low quality. The transmission-side feedback-processor may deliver the feedback information, received from the 360-degree video reception apparatus, to the data encoder, which may differently encode the regions. For example, the transmission-side feedback-processor may deliver the viewport information, received from the reception side, to the data encoder. The data encoder may encode regions including the areas indicated by the viewport information at higher quality (UHD, etc.) than other regions.

In a further embodiment of the 360-degree video transmission apparatus according to the present disclosure, the transmission-processor may differently perform processing for transmission on the regions. The transmission-processor may apply different transport parameters (modulation order, code rate, etc.) to the regions such that robustness of data delivered for each region is changed.

At this time, the transmission-side feedback-processor may deliver the feedback information, received from the 360-degree video reception apparatus, to the transmission-processor, which may differently perform transmission processing for the regions. For example, the transmission-side feedback-processor may deliver the viewport information, received from the reception side, to the transmission-processor. The transmission-processor may perform transmission processing on regions including the areas indicated by the viewport information so as to have higher robustness than other regions.

The internal/external elements of the 360-degree video transmission apparatus according to the present disclosure may be hardware elements that are realized as hardware. In some embodiments, however, the internal/external elements may be changed, omitted, replaced, or incorporated. In some embodiments, additional elements may be added to the 360-degree video transmission apparatus.

Figure 3:
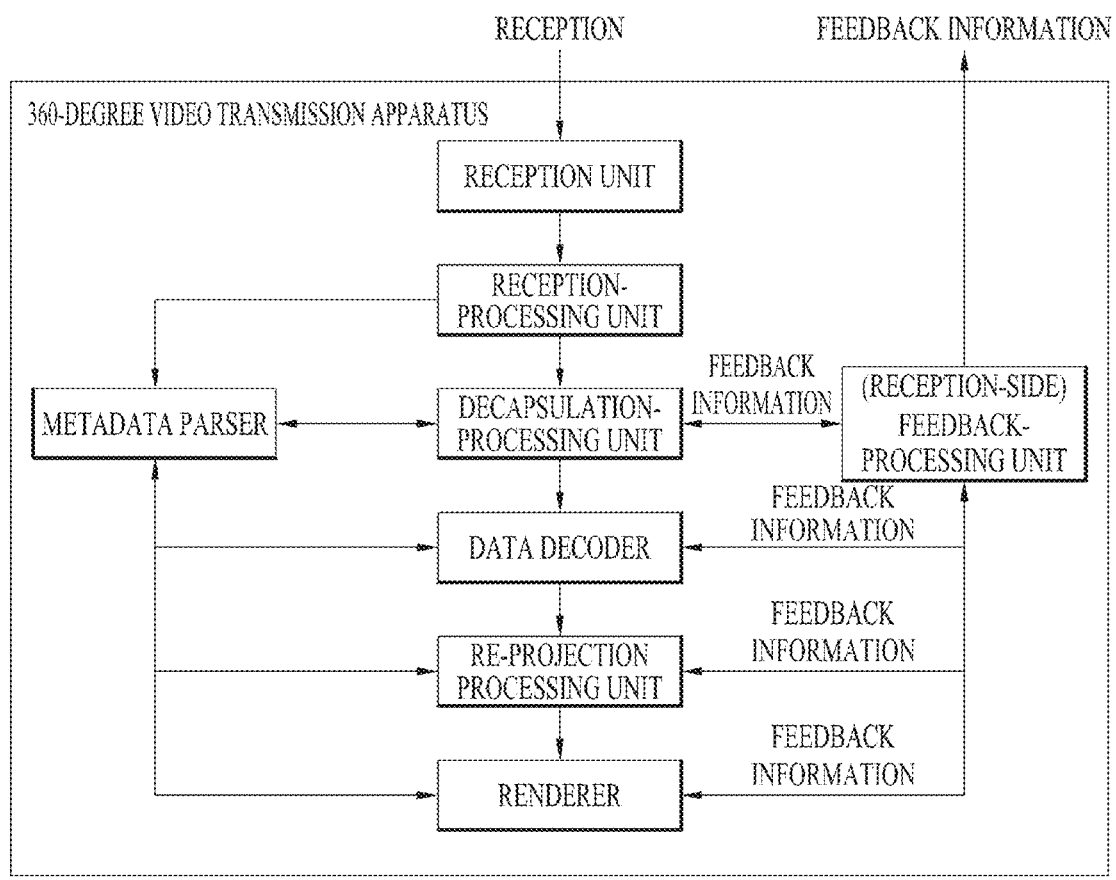
FIG. 3 is a view showing a 360-degree video reception apparatus according to another aspect of the present disclosure.

FIG. 3 is a view showing a 360-degree video reception apparatus according to another aspect of the present disclosure.

According to another aspect of the present disclosure, the present disclosure may be related to a 360-degree video reception apparatus. The 360-degree video reception apparatus according to the present disclosure may perform operations related to the processing process and/or the rendering process. The 360-degree video reception apparatus according to the present disclosure may include a reception unit, a reception-processor, a decapsulation-processor, a data decoder, a metadata parser, a (reception-side) feedback-processor, a re-projection processor, and/or a renderer as internal/external elements.

The reception unit may receive 360-degree video data transmitted by the 360-degree video transmission apparatus. Depending on the channel through which the 360-degree video data are transmitted, the reception unit may receive the 360-degree video data through a broadcast network, or may receive the 360-degree video data through a broadband connection.

The reception-processor may process the received 360-degree video data according to a transport protocol. In order to correspond to processing for transmission at the transmission side, the reception-processor may perform the reverse process of the transmission-processor. The reception-processor may deliver the acquired 360-degree video data to the decapsulation-processor, and may deliver the acquired 360-degree-video-related metadata to the metadata parser. The 360-degree-video-related metadata, acquired by the reception-processor, may have the form of a signaling table.

The decapsulation-processor may decapsulate the 360-degree video data, received in file form from the reception-processor. The decapsulation-processor may decapsulate the files based on ISOBMFF, etc. to acquire 360-degree video data and 360-degree-video-related metadata. The acquired 360-degree video data may be delivered to the data decoder, and the acquired 360-degree-video-related metadata may be delivered to the metadata parser. The 360-degree-videorelated metadata, acquired by the decapsulation-processor, may have the form of a box or a track in a file format. As needed, the decapsulation-processor may receive metadata necessary for decapsulation from the metadata parser.

The data decoder may decode the 360-degree video data. The data decoder may receive metadata necessary for decoding from the metadata parser. The 360-degree-video-related metadata, acquired at the data decoding process, may be delivered to the metadata parser.

The metadata parser may parse/decode the 360-degree-video-related metadata. The metadata parser may deliver the acquired metadata to the decapsulation-processor, the data decoder, the re-projection processor, and/or the renderer.

The re-projection processor may re-project the decoded 360-degree video data. The re-projection processor may re-project the 360-degree video data in a 3D space. The 3D space may have different forms depending on the 3D models that are used. The reprojection processor may receive metadata for re-projection from the metadata parser. For example, the re-projection processor may receive information about the type of 3D model that is used and the details thereof from the metadata parser. In some embodiments, the re-projection processor may re-project, in the 3D space, only the portion of 360-degree video data that corresponds to a specific area in the 3D space using the metadata for re-projection.

The renderer may render the re-projected 360-degree video data. As previously described, the 360-degree video data may be expressed as being rendered in the 3D space. In the case in which two processes are performed simultaneously, the re-projection processor and the renderer may be incorporated such that the renderer can perform these processes. In some embodiments, the renderer may render only the portion that is being viewed by a user according to user's viewpoint information.

The user may view a portion of the rendered 360-degree video through a VR display. The VR display, which is a device that reproduces the 360-degree video, may be included in the 360-degree video reception apparatus (tethered), or may be connected to the 360-degree video reception apparatus (untethered).

In an embodiment of the 360-degree video reception apparatus according to the present disclosure, the 360-degree video reception apparatus may further include a (reception-side) feedback-processor and/or a network interface (not shown) as an internal/external element. The reception-side feedback-processor may acquire and process feedback information from the renderer, the re-projection processor, the data decoder, the decapsulation-processor, and/or the VR display. The feedback information may include viewport information, head orientation information, and gaze information. The network interface may receive the feedback information from the reception-side feedback-processor, and may transmit the same to the 360-degree video transmission apparatus.

As previously described, the feedback information may not only be delivered to the transmission side but may also be used at the reception side. The reception-side feedback-processor may deliver the acquired feedback information to the internal elements of the 360-degree video reception apparatus so as to be reflected at the rendering process. The reception-side feedback-processor may deliver the feedback information to the renderer, the re-projection processor, the data decoder, and/or the decapsulation-processor. For example, the renderer may first render the area that is being viewed by the user using the feedback information. In addition, the decapsulation-processor and the data decoder may first decapsulate and decode the area that is being viewed by the user or the area that will be viewed by the user.

The internal/external elements of the 360-degree video reception apparatus according to the present disclosure described above may be hardware elements that are realized as hardware. In some embodiments, the internal/external elements may be changed, omitted, replaced, or incorporated. In some embodiments, additional elements may be added to the 360-degree video reception apparatus.

According to another aspect of the present disclosure, the present disclosure may be related to a 360-degree video transmission method and a 360-degree video reception method. The 360-degree video transmission/reception method according to the present disclosure may be performed by the 360-degree video transmission/reception apparatus according to the present disclosure described above or embodiments of the apparatus.

Embodiments of the 360-degree video transmission/reception apparatus and transmission/reception method according to the present disclosure and embodiments of the internal/external elements thereof may be combined. For example, embodiments of the projection-processor and embodiments of the data encoder may be combined in order to provide a number of possible embodiments of the 360-degree video transmission apparatus. Such combined embodiments also fall within the scope of the present disclosure.

Figure 4:
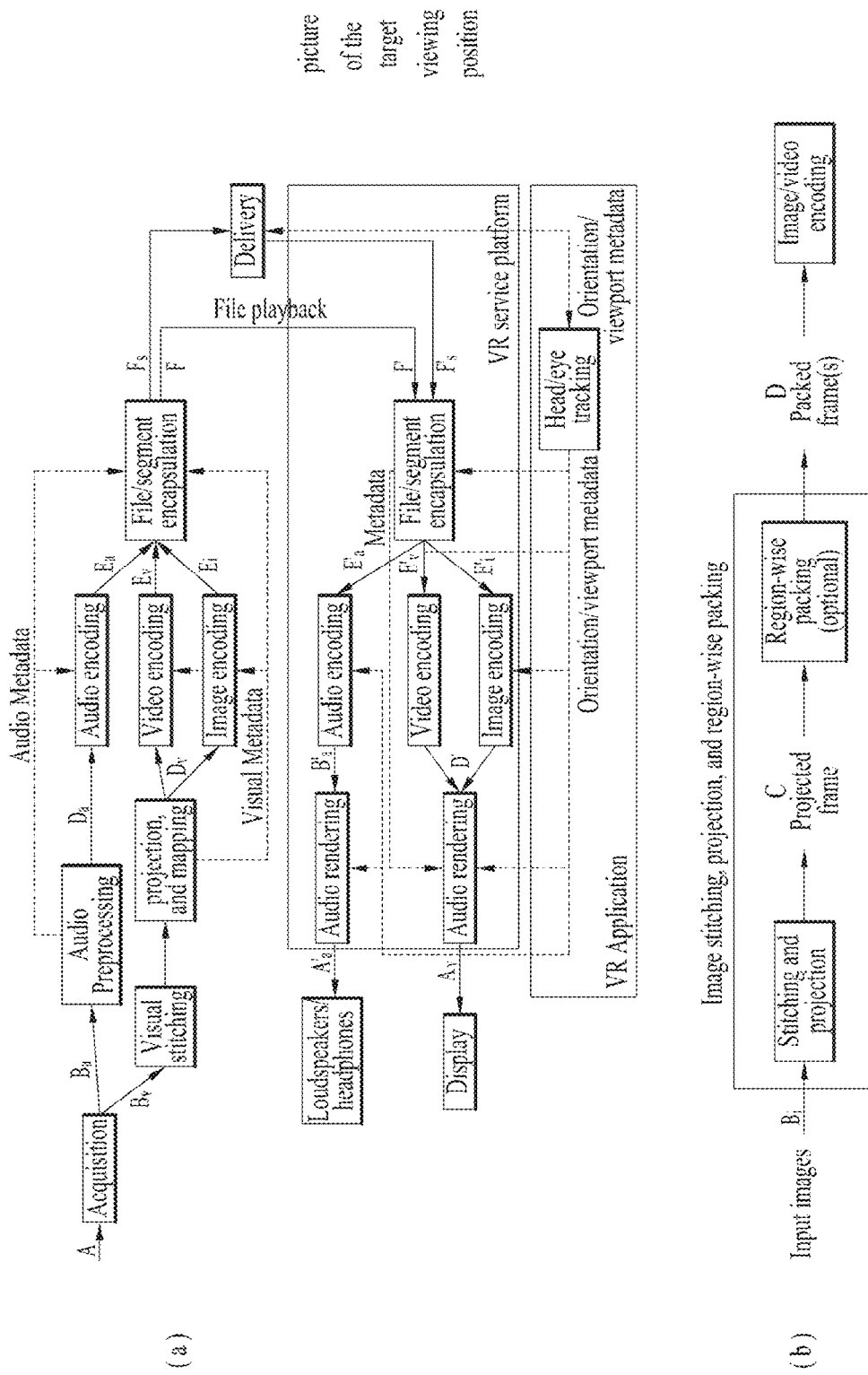
FIG. 4 is a view showing a 360-degree video transmission apparatus/360-degree video reception apparatus according to another embodiment of the present disclosure.

FIG. 4 is a view showing a 360-degree video transmission apparatus/360-degree video reception apparatus according to another embodiment of the present disclosure.

As previously described, 360-degree content may be provided through the architecture shown in FIG. 4(a). The 360-degree content may be provided in the form of a file, or may be provided in the form of segment-based download or streaming service, such as DASH. Here, the 360-degree content may be called VR content.

As previously described, 360-degree video data and/or 360-degree audio data may be acquired (Acquisition).

The 360-degree audio data may undergo an audio pre-processing process and an audio encoding process. In these processes, audio-related metadata may be generated. The encoded audio and the audio-related metadata may undergo processing for transmission (file/segment encapsulation).

The 360-degree video data may undergo the same processes as previously described. The stitcher of the 360-degree video transmission apparatus may perform stitching on the 360-degree video data (Visual stitching). In some embodiments, this process may be omitted, and may be performed at the reception side. The projection-processor of the 360-degree video transmission apparatus may project the 360-degree video data on a 2D image (Projection and mapping (packing)).

The stitching and projection processes are shown in detail in FIG. 4(b). As shown in FIG. 4(b), when the 360-degree video data (input image) is received, stitching and projection may be performed. Specifically, at the projection process, the stitched 360-degree video data may be projected in a 3D space, and the projected 360-degree video data may be arranged on the 2D image. In this specification, this process may be expressed as projecting the 360-degree video data on the 2D image. Here, the 3D space may be a sphere or a cube. The 3D space may be the same as the 3D space used for re-projection at the reception side.

The 2D image may be called a projected frame C. Region-wise packing may be selectively performed on the 2D image. When region-wise packing is performed, the position, shape, and size of each region may be indicated such that the regions on the 2D image can be mapped on a packed frame D. When region-wise packing is not performed, the projected frame may be the same as the packed frame. The regions will be described below. The projection process and the region-wise packing process may be expressed as projecting the regions of the 360-degree video data on the 2D image. Depending on the design, the 360-degree video data may be directly converted into the packed frame without undergoing intermediate processes.

As shown in FIG. 4(a), the projected 360-degree video data may be image-encoded or video-encoded. Since even the same content may have different viewpoints, the same content may be encoded in different bit streams. The encoded 360-degree video data may be processed in a file format of ISOBMFF by the encapsulation-processor. Alternatively, the encapsulation-processor may process the encoded 360-degree video data into segments. The segments may be included in individual tracks for transmission based on DASH.

When the 360-degree video data are processed, 360-degree-video-related metadata may be generated, as previously described. The metadata may be delivered while being included in a video stream or a file format. The metadata may also be used at the encoding process, file format encapsulation, or processing for transmission.

The 360-degree audio/video data may undergo processing for transmission according to the transport protocol, and may then be transmitted. The 360-degree video reception apparatus may receive the same through a broadcast network or a broadband connection.

In FIG. 4(a), a VR service platform may correspond to one embodiment of the 360-degree video reception apparatus. In FIG. 4(a), Loudspeaker/headphone, display, and head/eye tracking components are shown as being performed by an external device of the 360-degree video reception apparatus or VR application. In some embodiments, the 360-degree video reception apparatus may include these components. In some embodiments, the head/eye tracking component may correspond to the reception-side feedback-processor.

The 360-degree video reception apparatus may perform file/segment decapsulation for reception on the 360-degree audio/video data. The 360-degree audio data may undergo audio decoding and audio rendering, and may then be provided to a user through the loudspeaker/headphone component.

The 360-degree video data may undergo image decoding or video decoding and visual rendering, and may then be provided to the user through the display component. Here, the display component may be a display that supports VR or a general display.

As previously described, specifically, the rendering process may be expressed as re-projecting the 360-degree video data in the 3D space and rendering the re-projected 360-degree video data. This may also be expressed as rendering the 360-degree video data in the 3D space.

The head/eye tracking component may acquire and process head orientation information, gaze information, and viewport information of the user, which have been described previously.

A VR application that communicates with the reception-side processes may be provided at the reception side.

Figure 5:
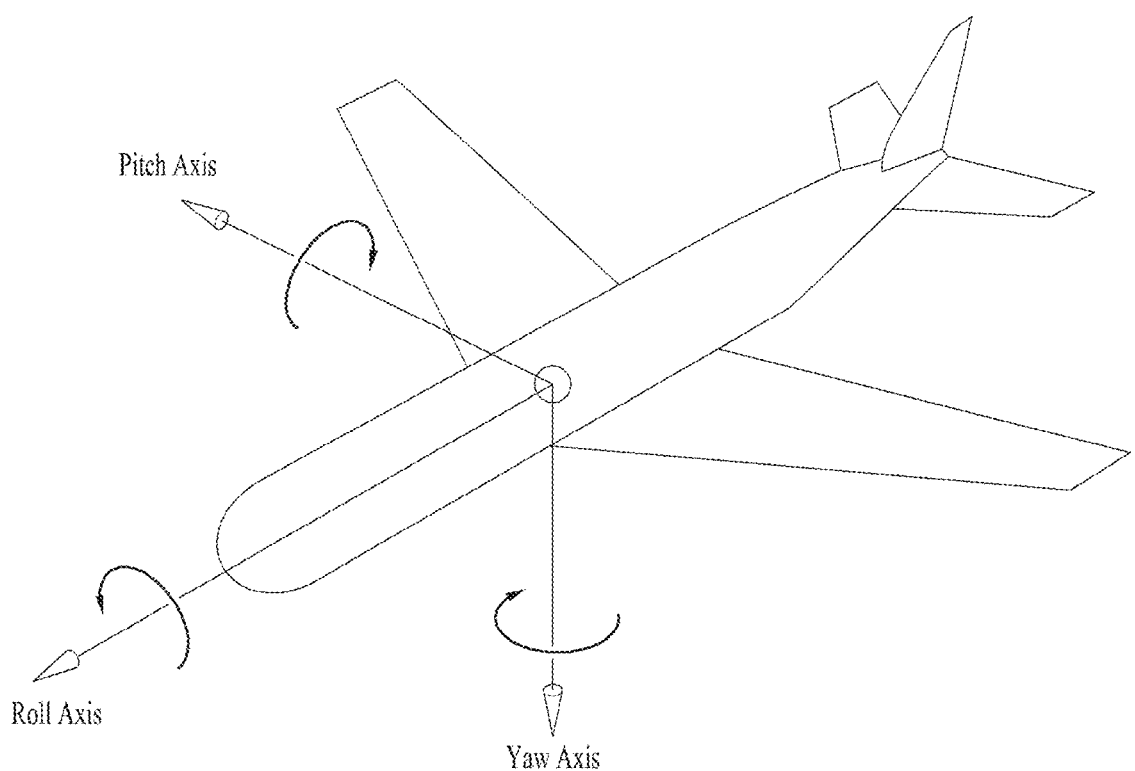
FIG. 5 is a view showing the concept of principal aircraft axes for describing 3D space in connection with the present disclosure.

FIG. 5 is a view showing the concept of principal aircraft axes for describing 3D space in connection with the present disclosure.

In the present disclosure, the concept of principal aircraft axes may be used in order to express a specific point, position, direction, distance, area, etc. in the 3D space.

That is, in the present disclosure, the 3D space before projection or after re-projection may be described, and the concept of principal aircraft axes may be used in order to perform signaling thereon. In some embodiments, a method of using X, Y, and Z-axis concepts or a spherical coordinate system may be used.

An aircraft may freely rotate in three dimensions. Axes constituting the three dimensions are referred to as a pitch axis, a yaw axis, and a roll axis. In this specification, these terms may also be expressed either as pitch, yaw, and roll or as a pitch direction, a yaw direction, and a roll direction.

The pitch axis may be an axis about which the forward portion of the aircraft is rotated upwards/downwards. In the shown concept of principal aircraft axes, the pitch axis may be an axis extending from one wing to another wing of the aircraft.

The yaw axis may be an axis about which the forward portion of the aircraft is rotated leftwards/rightwards. In the shown concept of principal aircraft axes, the yaw axis may be an axis extending from the top to the bottom of the aircraft.

In the shown concept of principal aircraft axes, the roll axis may be an axis extending from the forward portion to the tail of the aircraft. Rotation in the roll direction may be rotation performed about the roll axis.

As previously described, the 3D space in the present disclosure may be described using the pitch, yaw, and roll concept.

Figure 6:
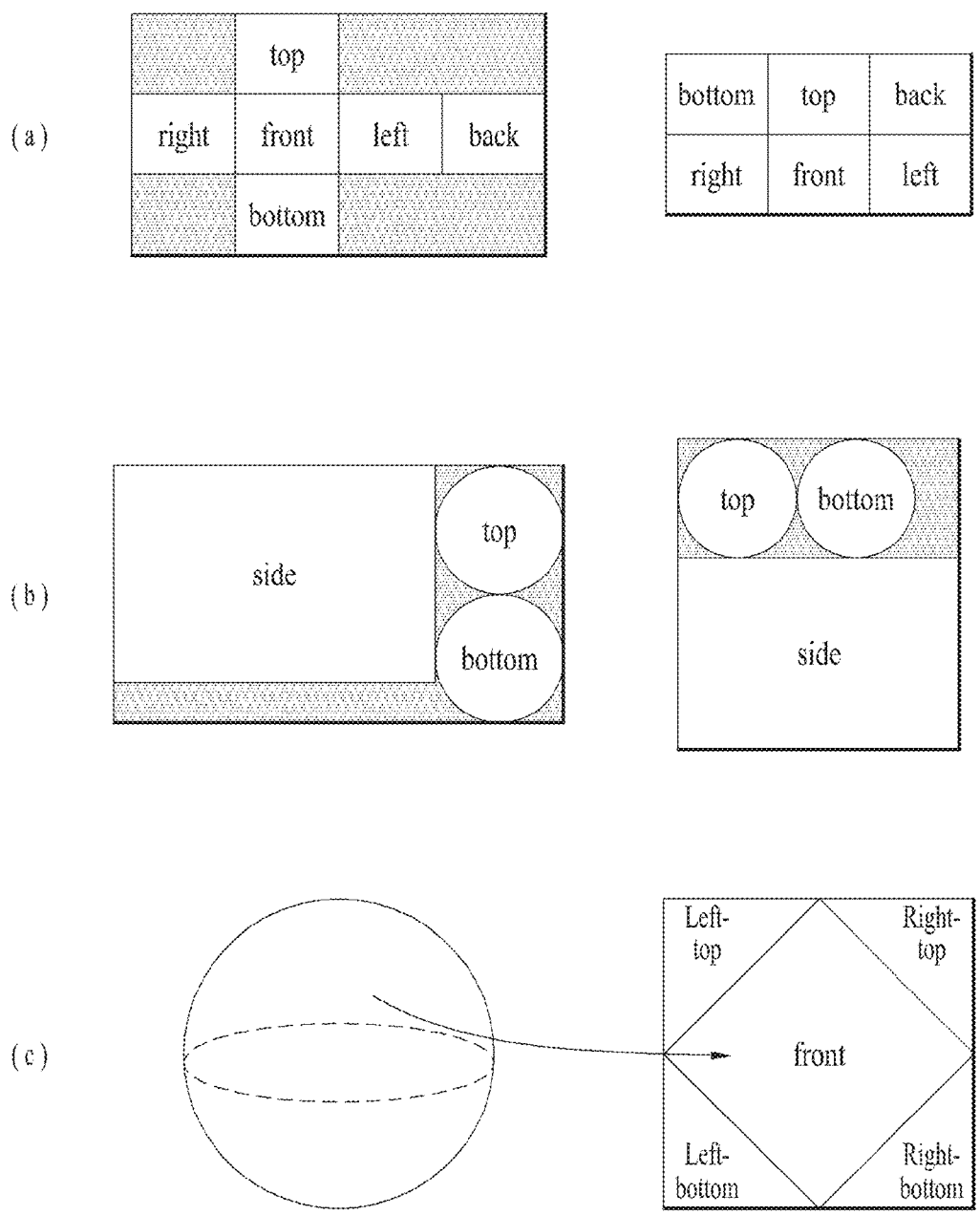
FIG. 6 is a view showing projection schemes according to an embodiment of the present disclosure.

FIG. 6 is a view showing projection schemes according to an embodiment of the present disclosure.

As previously described, the projection-processor of the 360-degree video transmission apparatus according to the present disclosure may project the stitched 360-degree video data on the 2D image. In this process, various projection schemes may be used.

In another embodiment of the 360-degree video transmission apparatus according to the present disclosure, the projection-processor may perform projection using a cubic projection scheme. For example, the stitched 360-degree video data may appear on a spherical surface. The projection-processor may project the 360-degree video data on the 2D image in the form of a cube. The 360-degree video data on the spherical surface may correspond to respective surfaces of the cube. As a result, the 360-degree video data may be projected on the 2D image, as shown at the left side or the right side of FIG. 6(a).

In another embodiment of the 360-degree video transmission apparatus according to the present disclosure, the projection-processor may perform projection using a cylindrical projection scheme. In the same manner, on the assumption that the stitched 360-degree video data appear on a spherical surface, the projection-processor may project the 360-degree video data on the 2D image in the form of a cylinder. The 360-degree video data on the spherical surface may correspond to the side, the top, and the bottom of the cylinder. As a result, the 360-degree video data may be projected on the 2D image, as shown at the left side or the right side of FIG. 6(b).

In a further embodiment of the 360-degree video transmission apparatus according to the present disclosure, the projection-processor may perform projection using a pyramidal projection scheme. In the same manner, on the assumption that the stitched 360-degree video data appears on a spherical surface, the projection-processor may project the 360-degree video data on the 2D image in the form of a pyramid. The 360-degree video data on the spherical surface may correspond to the front, the left top, the left bottom, the right top, and the right bottom of the pyramid. As a result, the 360-degree video data may be projected on the 2D image, as shown at the left side or the right side of FIG. 6(c).

In some embodiments, the projection-processor may perform projection using an equirectangular projection scheme or a panoramic projection scheme, in addition to the above-mentioned schemes.

As previously described, the regions may be divided parts of the 2D image on which the 360-degree video data are projected. The regions do not necessarily coincide with respective surfaces on the 2D image projected according to the projection scheme. In some embodiments, however, the regions may be partitioned so as to correspond to the projected surfaces on the 2D image such that region-wise packing can be performed. In some embodiments, a plurality of surfaces may correspond to a single region, and a single surface corresponds to a plurality of regions. In this case, the regions may be changed depending on the projection scheme. For example, in FIG. 6(a), the respective surfaces (top, bottom, front, left, right, and back) of the cube may be respective regions. In FIG. 6(b), the side, the top, and the bottom of the cylinder may be respective regions. In FIG. 6(c), the front and the four-directional lateral surfaces (left top, left bottom, right top, and right bottom) of the pyramid may be respective regions.

FIG. 7 is a view showing a tile according to an embodiment of the present disclosure.

The 360-degree video data projected on the 2D image or the 360-degree video data that have undergone region-wise packing may be partitioned into one or more tiles. FIG. 7(a) shows a 2D image divided into 16 tiles. Here, the 2D image may be the projected frame or the packed frame. In another embodiment of the 360-degree video transmission apparatus according to the present disclosure, the data encoder may independently encode the tiles.

Region-wise packing and tiling may be different from each other. Region-wise packing may be processing each region of the 360-degree video data projected on the 2D image in order to improve coding efficiency or to adjust resolution. Tiling may be the data encoder dividing the projected frame or the packed frame into tiles and independently encoding the tiles. When the 360-degree video data are provided, the user does not simultaneously enjoy all parts of the 360-degree video data. Tiling may enable the user to enjoy or transmit only tiles corresponding to an important part or a predetermined part, such as the viewport that is being viewed by the user, to the reception side within a limited bandwidth. The limited bandwidth may be more efficiently utilized through tiling, and calculation load may be reduced because the reception side does not process the entire 360-degree video data at once.

Since the regions and the tiles are different from each other, the two areas are not necessarily the same. In some embodiments, however, the regions and the tiles may indicate the same areas. In some embodiments, region-wise packing may be performed based on the tiles, whereby the regions and the tiles may become the same. Also, in some embodiments, in the case in which the surfaces according to the projection scheme and the regions are the same, the surface according to the projection scheme, the regions, and the tiles may indicate the same areas. Depending on the context, the regions may be called VR regions, and the tiles may be called tile regions.

A region of interest (ROI) may be an area in which users are interested, proposed by a 360-degree content provider. The 360-degree content provider may produce a 360-degree video in consideration of the area of the 360-degree video in which users are interested. In some embodiments, the ROI may correspond to an area of the 360-degree video in which an important portion of the 360-degree video is shown.

In another embodiment of the 360-degree video transmission/reception apparatus according to the present disclosure, the reception-side feedback-processor may extract and collect viewport information, and may deliver the same to the transmission-side feedback-processor. At this process, the viewport information may be delivered using the network interfaces of both sides. FIG. 7(a) shows a viewport t6010 displayed on the 2D image. Here, the viewport may be located over 9 tiles on the 2D image.

In this case, the 360-degree video transmission apparatus may further include a tiling system. In some embodiments, the tiling system may be disposed after the data encoder (see FIG. 7(b)), may be included in the data encoder or the transmission-processor, or may be included in the 360-degree video transmission apparatus as a separate internal/external element.

The tiling system may receive the viewport information from the transmission-side feedback-processor. The tiling system may select and transmit only tiles including the viewport area. In the FIG. 7(a), 9 tiles including the viewport area t6010, among a total of 16 tiles of the 2D image, may be transmitted. Here, the tiling system may transmit the tiles in a unicast manner over a broadband connection. The reason for this is that the viewport area may be changed for respective people.

Also, in this case, the transmission-side feedback-processor may deliver the viewport information to the data encoder. The data encoder may encode the tiles including the viewport area at higher quality than other tiles.

Also, in this case, the transmission-side feedback-processor may deliver the viewport information to the metadata-processor. The metadata-processor may deliver metadata related to the viewport area to the internal elements of the 360-degree video transmission apparatus, or may include the same in the 360-degree-video-related metadata.

By using this tiling system, it is possible to save transmission bandwidth and to differently perform processing for each tile, whereby efficient data processing/transmission is possible.

Embodiments related to the viewport area may be similarly applied to specific areas other than the viewport area. For example, processing performed on the viewport area may be equally performed on an area in which users are determined to be interested through the gaze analysis, ROI, and an area that is reproduced first when a user views the 360-degree video through the VR display (initial viewpoint).

In another embodiment of the 360-degree video transmission apparatus according to the present disclosure, the transmission-processor may perform transmission processing differently for respective tiles. The transmission-processor may apply different transport parameters (modulation order, code rate, etc.) to the tiles such that robustness of data delivered for each region is changed.

At this time, the transmission-side feedback-processor may deliver the feedback information, received from the 360-degree video reception apparatus, to the transmission-processor, which may perform transmission processing differently for respective tiles. For example, the transmission-side feedback-processor may deliver the viewport information, received from the reception side, to the transmission-processor. The transmission-processor may perform transmission processing on tiles including the viewport area so as to have higher robustness than for the other tiles.

FIG. 8 is a view showing 360-degree-video-related metadata according to an embodiment of the present disclosure.

The 360-degree-video-related metadata may include various metadata for the 360-degree video. Depending on the context, the 360-degree-video-related metadata may be called 360-degree-video-related signaling information. The 360-degree-video-related metadata may be transmitted while being included in a separate signaling table, or may be transmitted while being included in DASH MPD, or may be transmitted while being included in the form of a box in a file format of ISOBMFF. In the case in which the 360-degree-video-related metadata are included in the form of a box, the metadata may be included in a variety of levels, such as a file, a fragment, a track, a sample entry, and a sample, and may include metadata related to data of a corresponding level.

In some embodiments, a portion of the metadata, a description of which will follow, may be transmitted while being configured in the form of a signaling table, and the remaining portion of the metadata may be included in the form of a box or a track in a file format.

In an embodiment of the 360-degree-video-related metadata according to the present disclosure, the 360-degree-video-related metadata may include basic metadata about projection schemes, stereoscopy-related metadata, initial-view/initial-viewpoint-related metadata, ROI-related metadata, field-of-view (FOV)-related metadata, and/or cropped-region-related metadata. In some embodiments, the 360-degree-video-related metadata may further include metadata other than the above metadata.

Embodiments of the 360-degree-video-related metadata according to the present disclosure may include at least one of the basic metadata, the stereoscopy-related metadata, the initial-view-related metadata, the ROI-related metadata, the FOV-related metadata, the cropped-region-related metadata, and/or additional possible metadata. Embodiments of the 360-degree-video-related metadata according to the present disclosure may be variously configured depending on possible number of metadata included therein. In some embodiments, the 360-degree-video-related metadata may further include additional information.

The basic metadata may include 3D-model-related information and projection-scheme-related information. The basic metadata may include a vr_geometry field and a projection scheme field. In some embodiments, the basic metadata may include additional information.

The vr_geometry field may indicate the type of 3D model supported by the 360-degree video data. In the case in which the 360-degree video data is re-projected in a 3D space, as previously described, the 3D space may have a form based on the 3D model indicated by the vr_geometry field. In some embodiments, a 3D model used for rendering may be different from a 3D model used for re-projection indicated by the vr_geometry field. In this case, the basic metadata may further include a field indicating the 3D model used for rendering. In the case in which the field has a value of 0, 1, 2, or 3, the 3D space may follow a 3D model of a sphere, a cube, a cylinder, or a pyramid. In the case in which the field has additional values, the values may be reserved for future use. In some embodiments, the 360-degree-video-related metadata may further include detailed information about the 3D model indicated by the field. Here, the detailed information about the 3D model may be radius information of the sphere or the height information of the cylinder. This field may be omitted.

The projection scheme field may indicate the projection scheme used when the 360-degree video data is projected on a 2D image. In the case in which the field has a value of 0, 1, 2, 3, 4, or 5, this may indicate that an equirectangular projection scheme, a cubic projection scheme, a cylindrical projection scheme, a tile-based projection scheme, a pyramidal projection scheme, or a panoramic projection scheme has been used. In the case in which the field has a value of 6, this may indicate that the 360-degree video data has been projected on a 2D image without stitching. In the case in which the field has additional values, the values may be reserved for future use. In some embodiments, the 360-degree-video-related metadata may further include detailed information about regions generated by the projection scheme specified by the field. Here, the detailed information about the regions may be rotation of the regions or radius information of the top region of the cylinder.

The stereoscopy-related metadata may include information about 3D-related attributes of the 360-degree video data. The stereoscopy-related metadata may include an is stereoscopic field and/or a stereo_mode field. In some embodiments, the stereoscopy-related metadata may further include additional information.

The is stereoscopic field may indicate whether the 360-degree video data support 3D. When the field is 1, this may mean 3D support. When the field is 0, this may mean 3D non-support. This field may be omitted.

The stereo_mode field may indicate a 3D layout supported by the 360-degree video. It is possible to indicate whether the 360-degree video supports 3D using only this field. In this case, the is stereoscopic field may be omitted. When the field has a value of 0, the 360-degree video may have a mono mode. That is, the 2D image, on which the 360-degree video is projected, may include only one mono view. In this case, the 360-degree video may not support 3D.

When the field has a value of 1 or 2, the 360-degree video may follow a left-right layout or a top-bottom layout. The left-right layout and the top-bottom layout may be called a side-by-side format and a top-bottom format, respectively. In the left-right layout, 2D images on which a left image/a right image are projected may be located at the left/right side on an image frame. In the top-bottom layout, 2D images on which a left image/a right image are projected may be located at the top/bottom side on the image frame. In the case in which the field has additional values, the values may be reserved for future use.

The initial-view-related metadata may include information about the time at which a user views the 360-degree video when the 360-degree video is reproduced first (an initial viewpoint). The initial-view-related metadata may include an initial view yaw degree field, an initial view pitch degree field, and/or an initial view roll degree field. In some embodiments, the initial-view-related metadata may further include additional information.

The initial view yaw degree field, the initial view pitch degree field, and the initial view roll degree field may indicate an initial viewpoint when the 360-degree video is reproduced. That is, the very center point of the viewport that is viewed first at the time of reproduction may be indicated by these three fields. The fields may indicate the position of the right center point as the rotational direction (symbol) and the extent of rotation (angle) about the yaw, pitch, and roll axes. At this time, the viewport that is viewed when the video is reproduced first according to the FOV may be determined. The horizontal length and the vertical length (width and height) of an initial viewport based on the indicated initial viewpoint through the FOV may be determined. That is, the 360-degree video reception apparatus may provide a user with a predetermined area of the 360-degree video as an initial viewport using these three fields and the FOV information.

In some embodiments, the initial viewpoint indicated by the initial-view-related metadata may be changed for each scene. That is, the scenes of the 360-degree video may be changed over time. An initial viewpoint or an initial viewport at which the user views the video first may be changed for every scene of the 360-degree video. In this case, the initial-view-related metadata may indicate the initial viewport for each scene. To this end, the initial-view-related metadata may further include a scene identifier identifying the scene to which the initial viewport is applied. In addition, the FOV may be changed for each scene. The initial-view-related metadata may further include scene-wise FOV information indicating the FOV corresponding to the scene.

The ROI-related metadata may include information related to the ROI. The ROI-related metadata may a 2d_roi_range_flag field and/or a 3d_roi_range_flag field. Each of the two fields may indicate whether the ROI-related metadata includes fields expressing the ROI based on the 2D image or whether the ROI-related metadata includes fields expressing the ROI based on the 3D space. In some embodiments, the ROI-related metadata may further include additional information, such as differential encoding information based on the ROI and differential transmission processing information based on the ROI.

In the case in which the ROI-related metadata includes fields expressing the ROI based on the 2D image, the ROI-related metadata may include a min_top_left_x field, a max_top_left_x field, a min_top_left_y field, a max_top_left_y field, a min_width field, a max_width field, a min_height field, a max_height field, a min_x field, a max_x field, a min_y field, and/or a max_y field.

The min_top_left_x field, the max_top_left_x field, the min_top_left_y field, and the max_top_left_y field may indicate the minimum/maximum values of the coordinates of the left top end of the ROI. These fields may indicate the minimum x coordinate, the maximum x coordinate, the minimum y coordinate, and the maximum y coordinate of the left top end, respectively.

The min_width field, the max_width field, the min_height field, and the max_height field may indicate the minimum/maximum values of the horizontal size (width) and the vertical size (height) of the ROI. These fields may indicate the minimum value of the horizontal size, the maximum value of the horizontal size, the minimum value of the vertical size, and the maximum value of the vertical size, respectively.

The min_x field, the max_x field, the min_y field, and the max_y field may indicate the minimum/maximum values of the coordinates in the ROI. These fields may indicate the minimum x coordinate, the maximum x coordinate, the minimum y coordinate, and the maximum y coordinate of the coordinates in the ROI, respectively. These fields may be omitted.

In the case in which the ROI-related metadata includes fields expressing the ROI based on the coordinates in the 3D rendering space, the ROI-related metadata may include a min_yaw field, a max_yaw field, a min_pitch field, a max_pitch field, a min_roll field, a max_roll field, a min_field_of_view field, and/or a max_field_of_view field.

The min_yaw field, the max_yaw field, the min_pitch field, the max_pitch field, the min_roll field, and the max_roll field may indicate the area that the ROI occupies in 3D space as the minimum/maximum values of yaw, pitch, and roll. These fields may indicate the minimum value of the amount of rotation about the yaw axis, the maximum value of the amount of rotation about the yaw axis, the minimum value of the amount of rotation about the pitch axis, the maximum value of the amount of rotation about the pitch axis, the minimum value of the amount of rotation about the roll axis, and the maximum value of the amount of rotation about the roll axis, respectively.

The min_field_of_view field and the max_field_of_view field may indicate the minimum/maximum values of the FOV of the 360-degree video data. The FOV may be a range of vision within which the 360-degree video is displayed at once when the video is reproduced. The min_field_of_view field and the max_field_of_view field may indicate the minimum value and the maximum value of the FOV, respectively. These fields may be omitted. These fields may be included in FOV-related metadata, a description of which will follow.

The FOV-related metadata may include the above information related to the FOV. The FOV-related metadata may include a content_fov_flag field and/or a content_fov field. In some embodiments, the FOV-related metadata may further include additional information, such as information related to the minimum/maximum values of the FOV.

The content_fov_flag field may indicate whether information about the FOV of the 360-degree video intended at the time of production exists. When the value of this field is 1, the content_fov field may exist.

The content_fov field may indicate information about the FOV of the 360-degree video intended at the time of production. In some embodiments, the portion of the 360-degree video that is displayed to a user at once may be determined based on the vertical or horizontal FOV of the 360-degree video reception apparatus. Alternatively, in some embodiments, the portion of the 360-degree video that is displayed to the user at once may be determined in consideration of the FOV information of this field.

The cropped-region-related metadata may include information about the area of an image frame that includes actual 360-degree video data. The image frame may include an active video area, in which actual 360-degree video data is projected, and an inactive video area. Here, the active video area may be called a cropped area or a default display area. The active video area is an area that is seen as the 360-degree video in an actual VR display. The 360-degree video reception apparatus or the VR display may process/display only the active video area. For example, in the case in which the aspect ratio of the image frame is 4:3, only the remaining area of the image frame, excluding a portion of the upper part and a portion of the lower part of the image frame, may include the 360-degree video data. The remaining area of the image frame may be the active video area.

The cropped-region-related metadata may include an is_cropped_region field, a cr_region_left_top_x field, a cr_region_left_top_y field, a cr_region_width field, and/or a cr_region_height field. In some embodiments, the cropped-region-related metadata may further include additional information.

The is_cropped_region field may be a flag indicating whether the entire area of the image frame is used by the 360-degree video reception apparatus or the VR display. That is, this field may indicate whether the entire image frame is the active video area. In the case in which only a portion of the image frame is the active video area, the following four fields may be further included.

The cr_region_left_top_x field, the cr_region_left_top_y field, the cr_region_width field, and the cr_region_height field may indicate the active video area in the image frame. These fields may indicate the x coordinate of the left top of the active video area, the y coordinate of the left top of the active video area, the horizontal length (width) of the active video area, and the vertical length (height) of the active video area, respectively. The horizontal length and the vertical length may be expressed using pixels.

As described above, the 360-degree-video-related signaling information or metadata may be transmitted while being included in a randomly defined signaling table, or may be transmitted while being included in a file format of ISOBMFF or Common File Format in the form of a box, or may be transmitted while being included in DASH MPD. Also, the 360-degree media data may be transmitted while being included in the file format or DASH segment.

Figure 9:
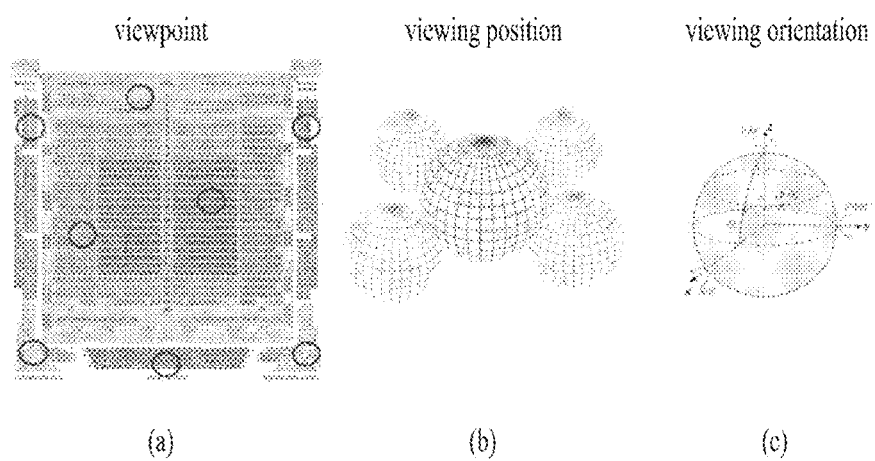
FIG. 9 is a view showing a viewpoint and viewing position additionally defined in a 3DoF+ VR system.

FIG. 9 is a view showing a viewpoint and viewing position additionally defined in a 3DoF+ VR system.

The 360-degree video based VR system of the present disclosure may provide visual/auditory experiences for different viewing orientations based on a position of a user for 360-degree video. This method may be referred to as 3DoF (three degree of freedom) plus. In detail, the VR system that provides visual/auditory experiences for different orientations in a fixed position of a user may be referred to as a 3DoF based VR system.

Meanwhile, the VR system that may provide extended visual/auditory experiences for different orientations in different viewpoints and different viewing positions at the same time zone may be referred to as a 3DoF+ or 3DoF plus based VR system.

Supposing a space such as (a) (example of art center), different positions (example of art center marked with a red circle) may be considered as the respective viewpoints. At this time, video/audio provided by the respective viewpoints existing in the same space as example may have the same time flow.

In this case, different visual/auditory experiences may be provided in accordance with a viewpoint change (head motion) of a user in a specific position. That is, spheres of various viewing positions may be assumed as shown in (b) for a specific viewpoint, and video/audio/text information in which a relative position of each viewpoint is reflected may be provided.

Meanwhile, visual/auditory information of various orientations such as the existing 3DoF may be delivered at a specific viewpoint of a specific position as shown in (c). In this case, additional various sources as well as main sources (video/audio/text) may be provided in combination, and this may be associated with a viewing orientation of a user or information may be delivered independently.

Figure 10:
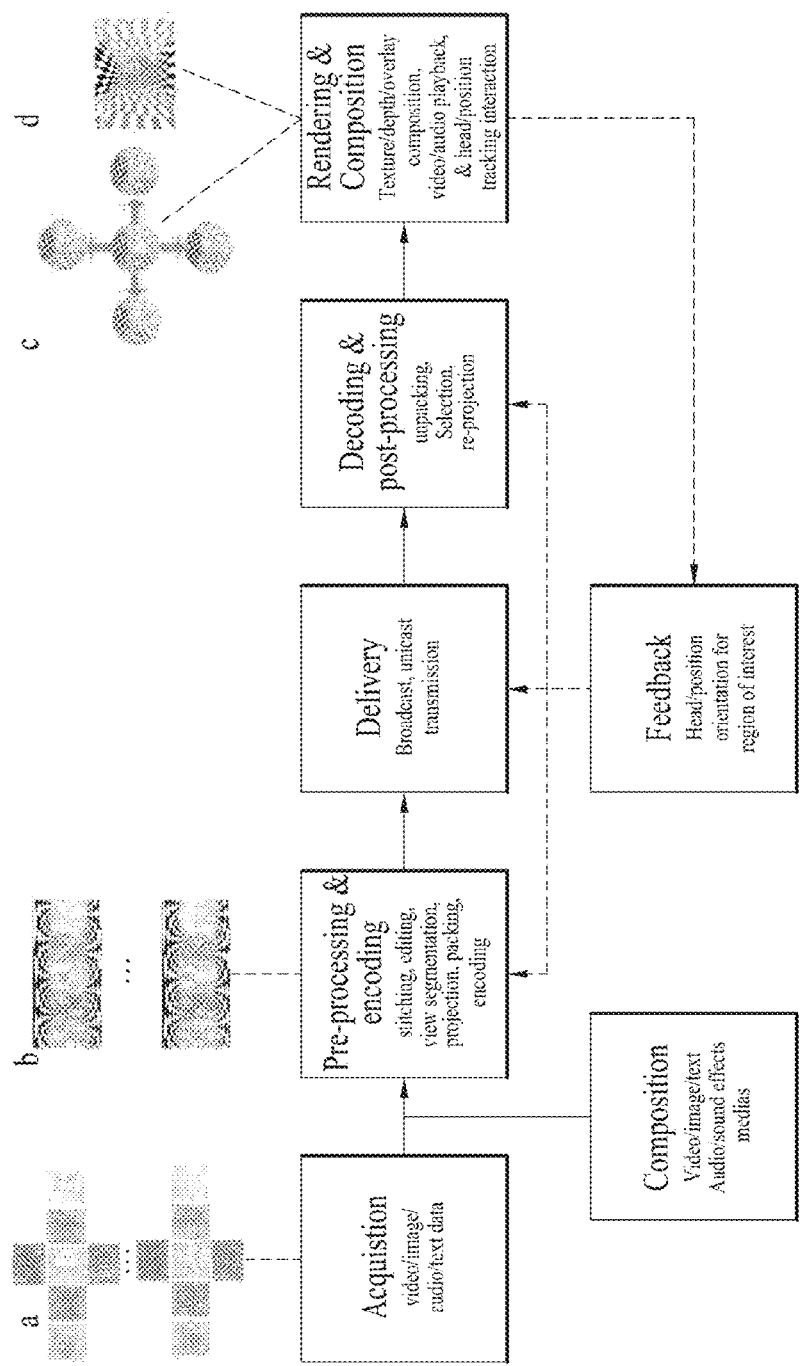
FIG. 10 is a view showing a method for implementing 360-degree video signal processing and related transmission apparatus/reception apparatus based on 3DoF+ system.

FIG. 10 is a view showing a method for implementing 360-degree video signal processing and related transmission apparatus/reception apparatus based on 3DoF+ system.

FIG. 10 is an example of 3DoF+ end-to-end system flow chart including video acquisition, pre-processing, transmission, (post)processing, rendering and feedback processes of 3DoF+.

Acquisition: may mean a process of acquiring 360-degree video through capture, composition or generation of 360-degree video. Various kinds of video/audio information according to head motion may be acquired for a plurality of positions through this process. In this case, video information may include depth information as well as visual information (texture). At this time, a plurality of kinds of information of different viewing positions according to different viewpoints may be acquired like example of video information of a.

Composition: may define a method for composition to include video (video/image, etc.) through external media, voice (audio/effect sound, etc.) and text (caption, etc.) as well as information acquired through the video/audio input module in user experiences.

Pre-processing: is a preparation (pre-processing) process for transmission/delivery of the acquired 360-degree video, and may include stitching, projection, region wise packing and/or encoding process. That is, this process may include pre-processing and encoding processes for modifying/complementing data such as video/audio/text information in accordance with a producer's intention. For example, the pre-processing process of the video may include mapping (stitching) of the acquired visual information onto 360 sphere, editing such as removing a region boundary, reducing difference in color/brightness or providing visual effect of video, view segmentation according to viewpoint, a projection for mapping video on 360 sphere into 2D image, region-wise packing for rearranging video in accordance with a region, and encoding for compressing video information. A plurality of projection videos of different viewing positions according to different viewpoints may be generated like example in view of video of B.

Delivery: may mean a process of processing and transmitting video/audio data and metadata subjected to the preparation process (pre-processing). As a method for delivering a plurality of video/audio data and related metadata of different viewing positions according to different viewpoints, a broadcast network or a communication network may be used, or unidirectional delivery method may be used.

Post-processing & composition: may mean a post-processing process for decoding and finally reproducing received/stored video/audio/text data. For example, the post-processing process may include unpacking for unpacking a packed video and re-projection for restoring 2D projected image to 3D sphere image as described above.

Rendering: may mean a process of rendering and displaying re-projected image/video data on a 3D space. In this process, the process may be reconfigured to finally output video/audio signals. A viewing orientation, viewing position/head position and viewpoint, in which a user's region of interest exists, may be subjected to tracking, and necessary video/audio/text information may selectively be used in accordance with this information. At this time, in case of video signal, different viewing positions may be selected in accordance with the user's region of interest as shown in c, and video in a specific orientation of a specific viewpoint at a specific position may finally be output as shown in d.

Feedback: may mean a process of delivering various kinds of feedback information, which can be acquired during a display process, to a transmission side. In this embodiment, a viewing orientation, a viewing position, and a viewpoint, which corresponds to a user's region of interest, may be estimated, and feedback may be delivered to reproduce video/audio based on the estimated result.

Figure 11:
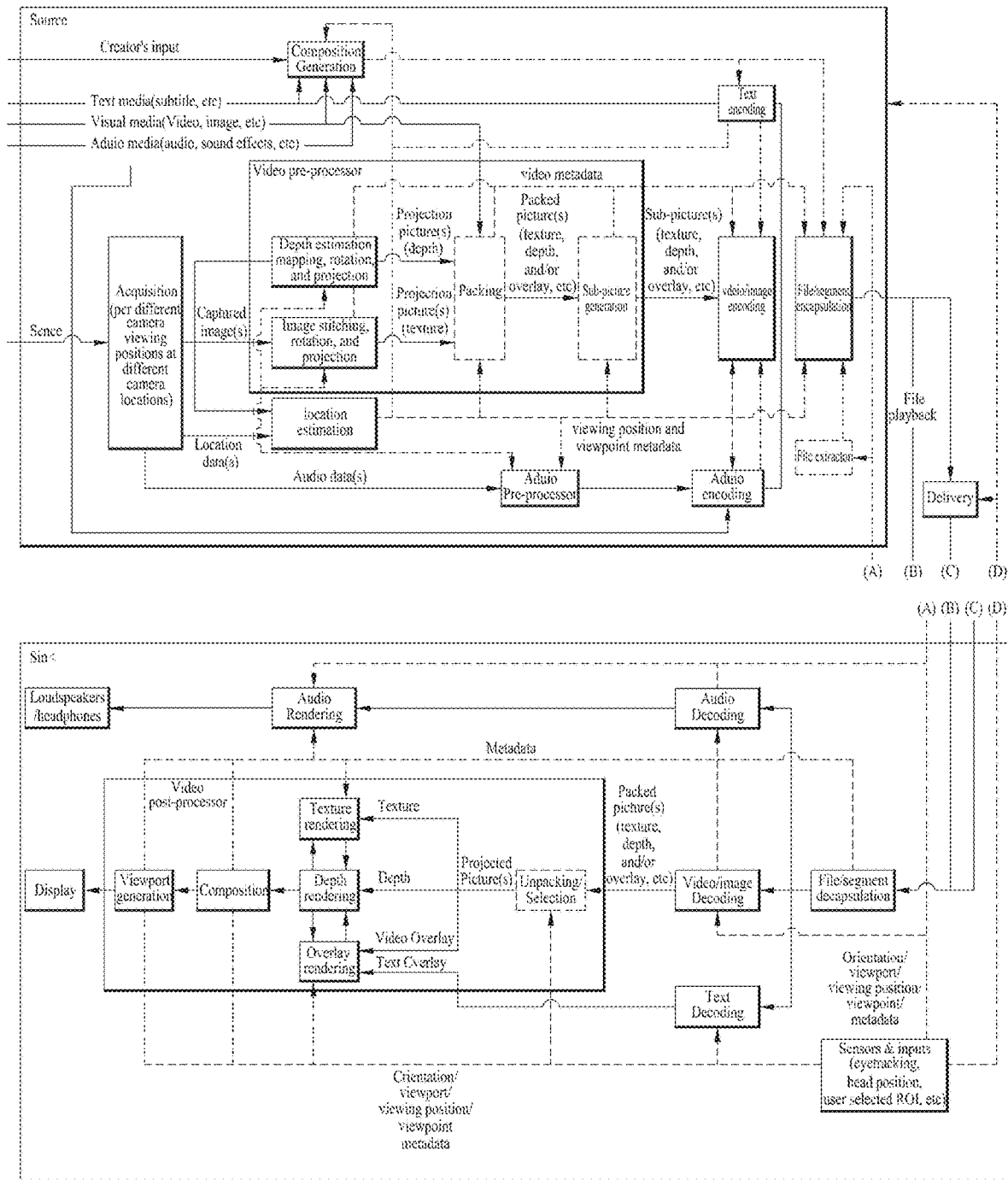
FIG. 11 is a view showing an architecture of a 3DoF+ end-to-end system.

FIG. 11 is a view showing an architecture of a 3DoF+ end-to-end system.

FIG. 11 is an example of a 3DoF+ end-to-end system architecture. As described in the architecture of FIG. 11, 3DoF+360 contents may be provided.

The 360-degree video transmission apparatus may include an acquisition module for acquiring 360-degree video (image)/audio data, a video/audio pre-processor for processing the acquired data, a composition generation module for composing additional information an encoder for encoding text, audio and projected 360-degree video, and an encapsulation module for encapsulating the encoded data. As described above, the encapsulated data may be output in the form of bitstreams. The encoded data may be encapsulated in a file format such as ISOBMFF and CFF, or may be processed in the form of other DASH segment. The encoded data may be delivered to the 360-degree video reception apparatus through a digital storage medium. Although not shown explicitly, the encoded data may be subjected to processing for transmission through the transmission-processor and then transmitted through a broadcast network or a broadband, as described above.

The data acquisition module may simultaneously or continuously acquire different kinds of information in accordance with sensor orientation (viewing orientation in view of video), information acquisition timing of a sensor (sensor position, or viewing position in view of video), and information acquisition position of a sensor (viewpoint in case of video). At this time, video, image, audio and position information may be acquired.

In case of video data, texture and depth information may respectively be acquired, and video pre-processing may be performed in accordance with characteristic of each component. For example, in case of the text information, 360-degree omnidirectional video may be configured using videos of different orientations of the same viewing position, which are acquired at the same viewpoint using image sensor position information. To this end, video stitching may be performed. Also, projection and/or region wise packing for modifying the video to a format for encoding may be performed. In case of depth image, the image may generally be acquired through a depth camera. In this case, the depth image may be made in the same format such as texture. Alternatively, depth data may be generated based on data measured separately. After image per component is generated, additional conversion (packing) to a video format for efficient compression may be performed, or a sub-picture generation for reconfiguring the images by segmentation into sub-pictures which are actually necessary may be performed. Information on image configuration used in a video pre-processing end is delivered as video metadata.

If video/audio/text information additionally given in addition to the acquired data (or data for main service) are together served, it is required to provide information for composing these kinds of information during final reproduction. The composition generation module generates information for composing externally generated media data (video/image in case of video, audio/effect sound in case of audio, and caption in case of text) at a final reproduction end based on a producer's intention, and this information is delivered as composition data.

The video/audio/text information subjected to each processing is compressed using each encoder, and encapsulated on a file or segment basis in accordance with application. At this time, only necessary information may be extracted (file extractor) in accordance with a method for configuring video, file or segment.

Also, information for reconfiguring each data in the receiver is delivered at a codec or file format/system level, and in this case, the information includes information (video/audio metadata) for video/audio reconfiguration, composition information (composition metadata) for overlay, viewpoint capable of reproducing video/audio and viewing position information according to each viewpoint (viewing position and viewpoint metadata), etc. This information may be processed through a separate metadata processor.

The 360-degree video reception apparatus may include a file/segment decapsulation module for decapsulating a received file and segment, a decoding module for generating video/audio/text information from bitstreams, a post-processor for reconfiguring the video/audio/text in the form of reproduction, a tracking module for tracking a user's region of interest, and a display which is a reproduction module.

The bitstreams generated through decapsulation may be segmented into video/audio/text in accordance with types of data and separately decoded to be reproduced.

The tracking module generates viewpoint of a user's region of interest, viewing position at the corresponding viewpoint, and viewing orientation information at the corresponding viewing position based on a sensor and the user's input information. This information may be used for selection or extraction of a region of interest in each module of the 360-degree video reception apparatus, or may be used for a post-processing process for emphasizing information of the region of interest. Also, if this information is delivered to the 360-degree video transmission apparatus, this information may be used for file selection (file extractor) or subpicture selection for efficient bandwidth use, and may be used for various video reconfiguration methods based on a region of interest (viewport/viewing position/viewpoint dependent processing).

The decoded video signal may be processed in accordance with various processing methods of the video configuration method. If image packing is performed in the 360-degree video transmission apparatus, a process of reconfiguring video is required based on the information delivered through metadata. In this case, video metadata generated by the 360-degree video transmission apparatus may be used. Also, if videos of a plurality of viewpoints or a plurality of viewing positions or various orientations are included in the decoded video, information matched with viewpoint, viewing position, and orientation information of the user's region of interest, which are generated through tracking, may be selected and processed. At this time, viewing position and viewpoint metadata generated at the transmission side may be used. Also, if a plurality of components are delivered for a specific position, viewpoint and orientation or video information for overlay is separately delivered, a rendering process for each of the data and information may be included. The video data (texture, depth and overlay) subjected to a separate rendering process may be subjected to a composition process. At this time, composition metadata generated by the transmission side may be used. Finally, information for reproduction in viewport may be generated in accordance with the user's region of interest.

The decoded audio signal may be generated as an audio signal capable of being reproduced, through an audio renderer and/or the post-processing process. At this time, information suitable for the user's request may be generated based on the information on the user's region of interest and the metadata delivered to the 360-degree video reception apparatus.

The decoded text signal may be delivered to an overlay renderer and processed as overlay information based on text such as subtitle. A separate text post-processing process may be included if necessary.

Figure 12:
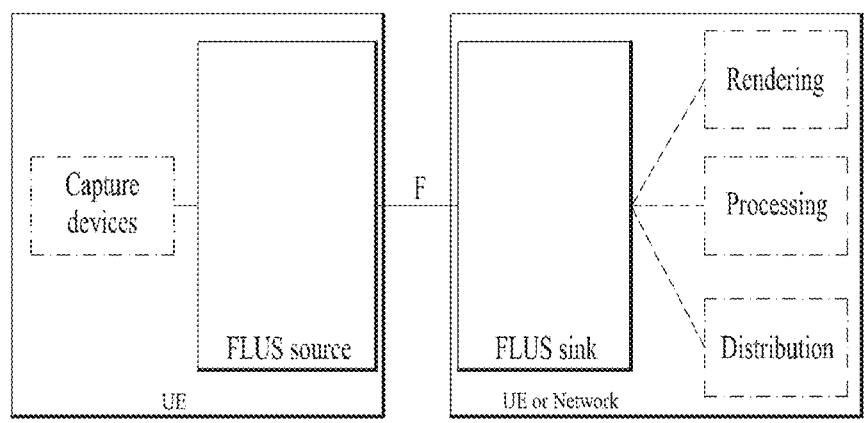
FIG. 12 is a view showing an architecture of a Frame for Live Uplink Streaming (FLUS).

FIG. 12 is a view showing an architecture of a Frame for Live Uplink Streaming (FLUS).

The detailed blocks of the transmission side and the reception side may be categorized into functions of a source and a sink in FLUS (Framework for Live Uplink Streaming).

In this case, the information acquisition module may implement the function of the source, implement the function of the sink on a network, or implement source/sink within a network node, as follows. The network node may include a user equipment (UE). The UE may include the aforementioned 360-degree video transmission apparatus or the aforementioned 360-degree reception apparatus.

A transmission and reception processing process based on the aforementioned architecture may be described as follows. The following transmission and reception processing process is described based on the video signal processing process. If the other signals such as audio or text are processed, a portion marked with italic may be omitted or may be processed by being modified to be suitable for audio or text processing process.

Figure 13:
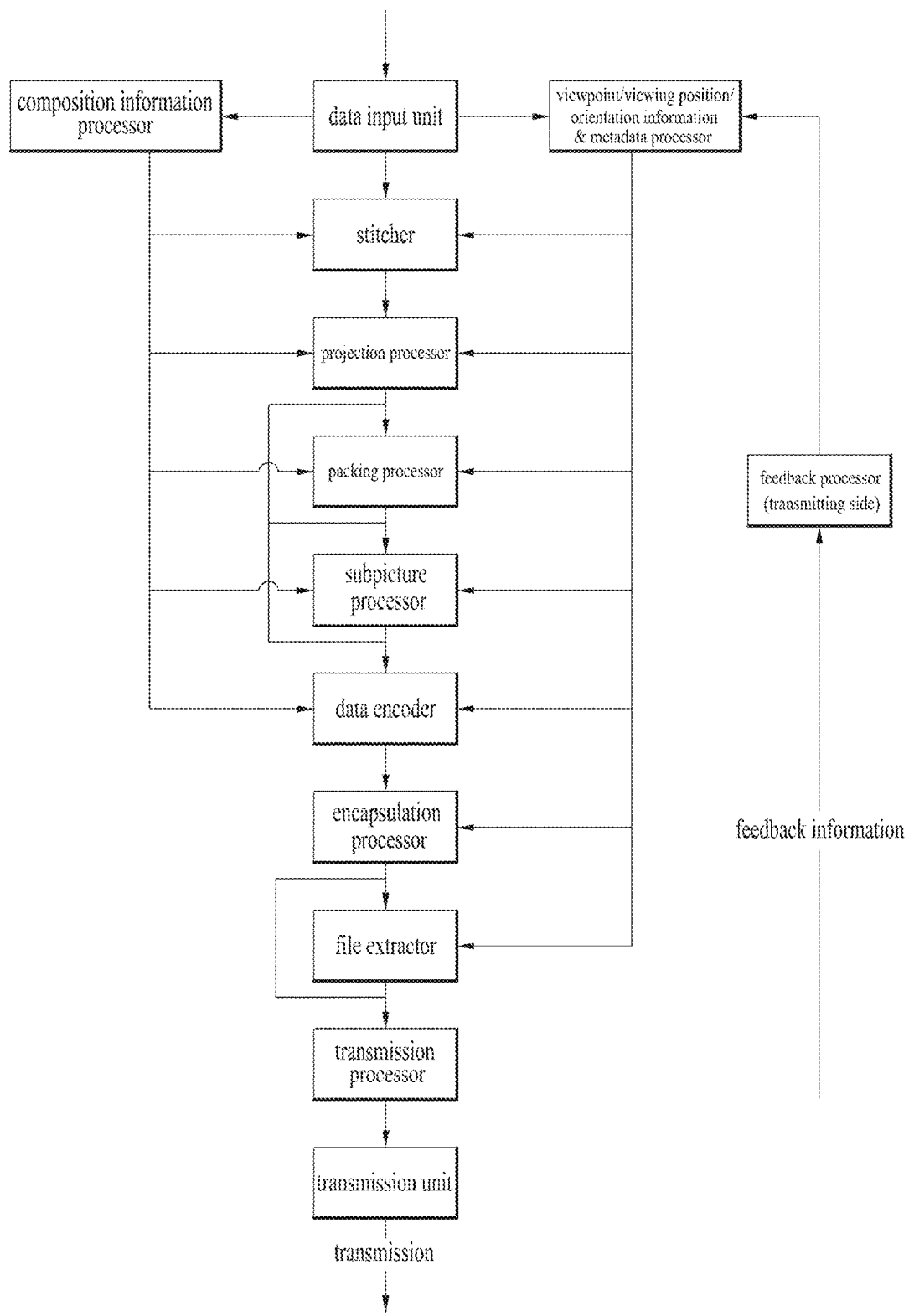
FIG. 13 is a view showing a configuration of 3DoF+ transmission side.

FIG. 13 is a view showing a configuration of 3DoF+ transmission side.

The transmission side (360-degree video transmission apparatus) may perform stitching for sphere image configuration per viewpoint/viewing position/component if input data are images output through a camera. If sphere images per viewpoint/viewing position/component are configured, the transmission side may perform projection for coding in 2D image. The transmission side may generate a plurality of images as sub-pictures of a packing or segmented region for making an integrated image in accordance with application. As described above, the region wise packing process is an optional process, and may not be performed. In this case, the packing process may be omitted. If the input data are video/audio/text additional information, a method for displaying additional information by adding the additional information to a center image may be notified, and the additional data may be transmitted together. The encoding process for compressing the generated images and the added data to generate bitstreams may be performed and then the encapsulation process for converting the bitstreams to a file format for transmission or storage may be performed. At this time, a process of extracting a file requested by the reception side may be processed in accordance with application or request of the system. The generated bitstreams may be converted to the transport format through the transmission-processor and then transmitted. At this time, the feedback processor of the transmission side may process viewpoint/viewing position/orientation information and necessary metadata based on the information delivered from the reception side and deliver the information to the related transmission side so that the transmission side may process the corresponding data.

Figure 14:
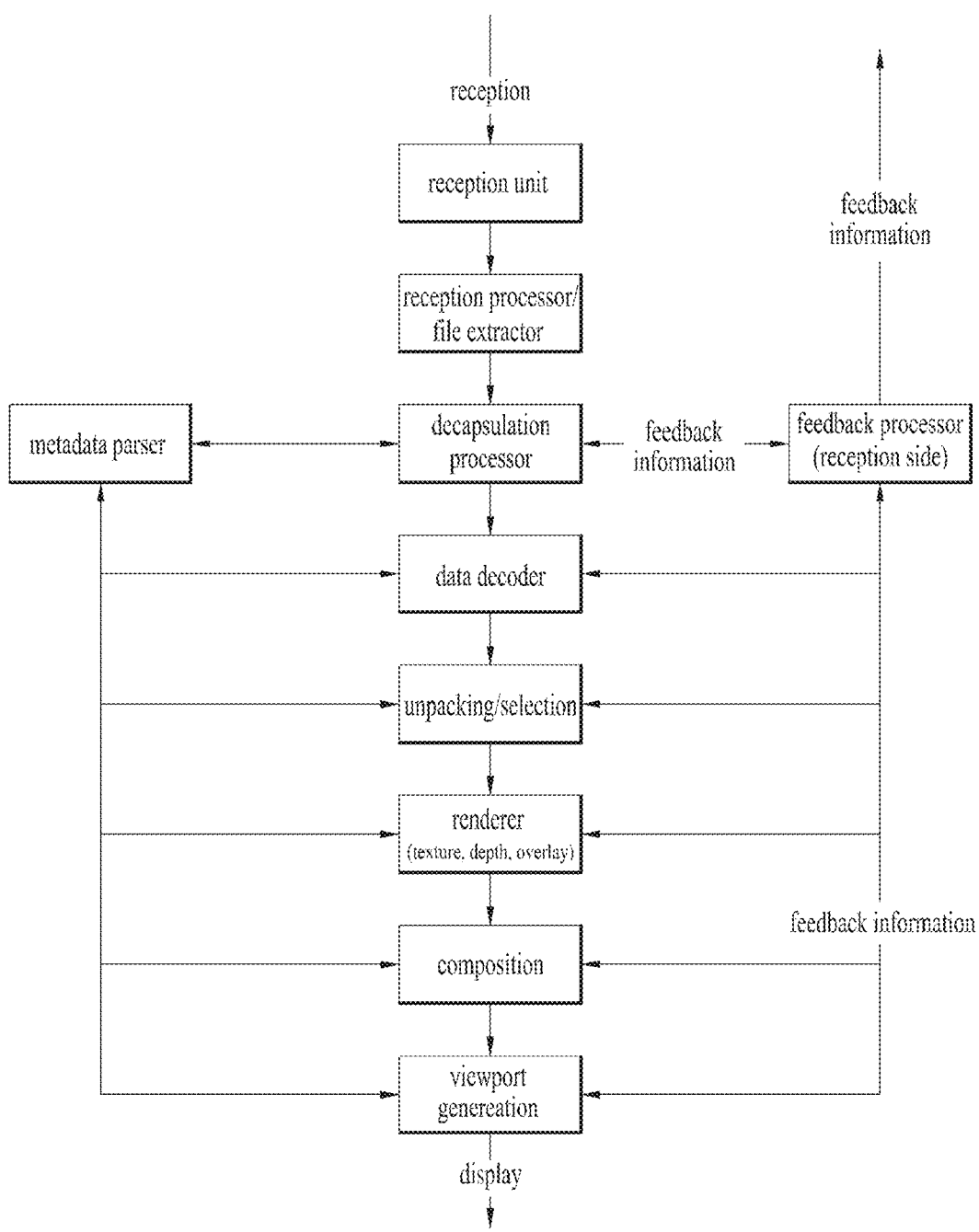
FIG. 14 is a view showing a configuration of 3DoF+ reception side.

FIG. 14 is a view showing a configuration of 3DoF+ reception side.

The reception side (360-degree video reception apparatus) may extract a necessary file after receiving the bitstreams delivered from the transmission side. The reception side may select bitstreams in the generated file format by using the viewpoint/viewing position/orientation information delivered from the feedback processor and reconfigure the selected bitstreams as image information through the decoder. The reception side may perform unpacking for the packed image based on packing information delivered through the metadata. If the packing process is omitted in the transmission side, unpacking of the reception side may also be omitted. Also, the reception side may perform a process of selecting images suitable for the viewpoint/viewing position/orientation information delivered from the feedback processor and necessary components if necessary. The reception side may perform a rendering process of reconfiguring texture, depth and overlay information of images as a format suitable for reproduction. The reception side may perform a composition process for composing information of different layers before generating a final image, and may generate and reproduce an image suitable for a display viewport.

Figure 15:
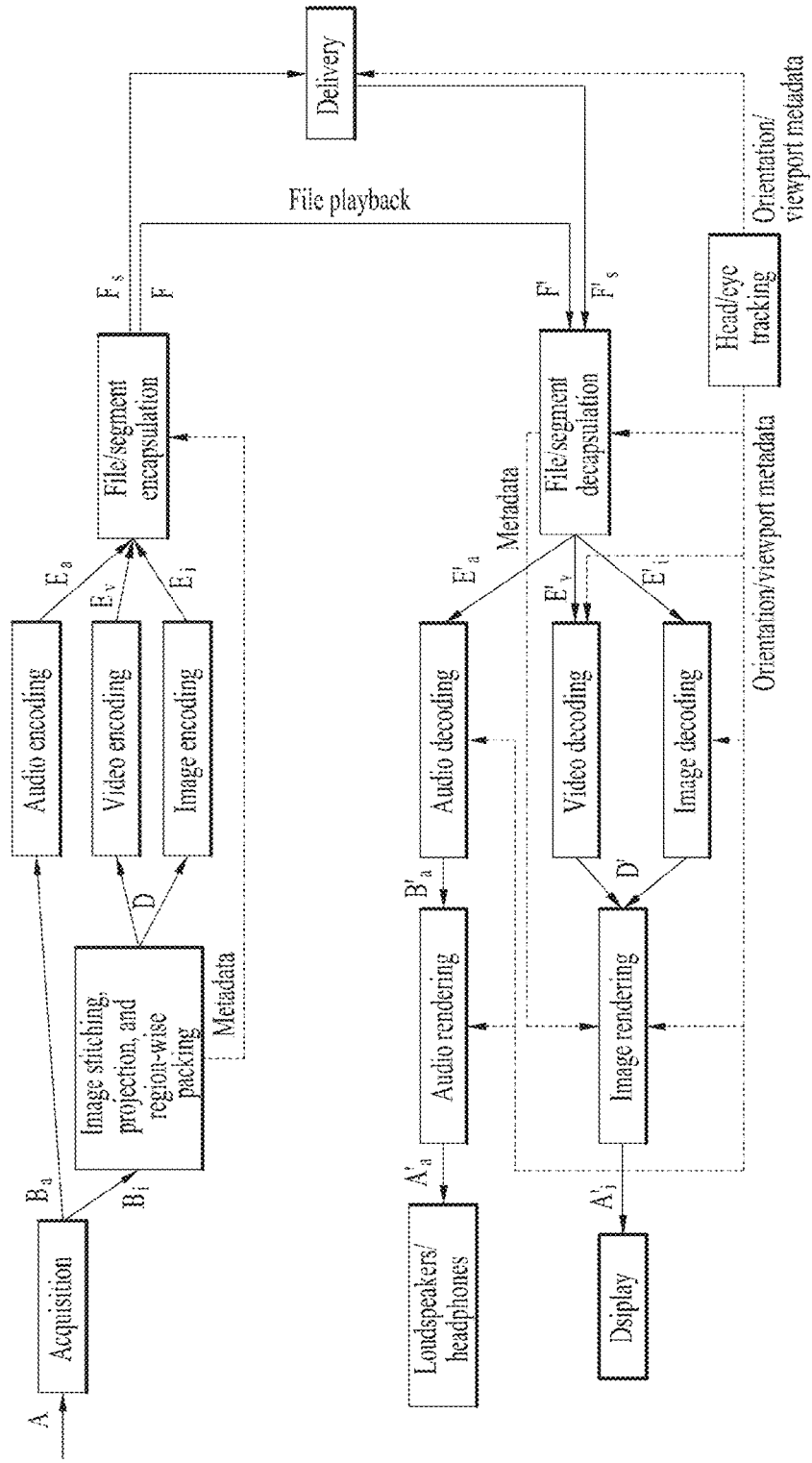
FIG. 15 is a view showing an OMAF structure.

FIG. 15 is a view showing an OMAF structure.

The 360-degree video based VR system may provide visual/auditory experiences for different viewing orientations based on a position of a user for 360-degree video based on the 360-degree video processing process. A service for providing visual/auditory experiences for different orientations in a fixed position of a user with respect to 360-degree video may be referred to as a 3DoF based service. Meanwhile, a service for providing extended visual/auditory experiences for different orientations in an arbitrary viewpoint and viewing position at the same time zone may be referred to as a 6DoF (six degree of freedom) based service.

A file format for 3DoF service has a structure in which a position of rendering, information of a file to be transmitted, and decoding information may be varied depending on a head/eye tracking module as shown in FIG. 15. However, this structure is not suitable for transmission of a media file of 6DoF in which rendering information/transmission details and decoding information are varied depending on a viewpoint or position of a user, correction is required.

Figure 16:
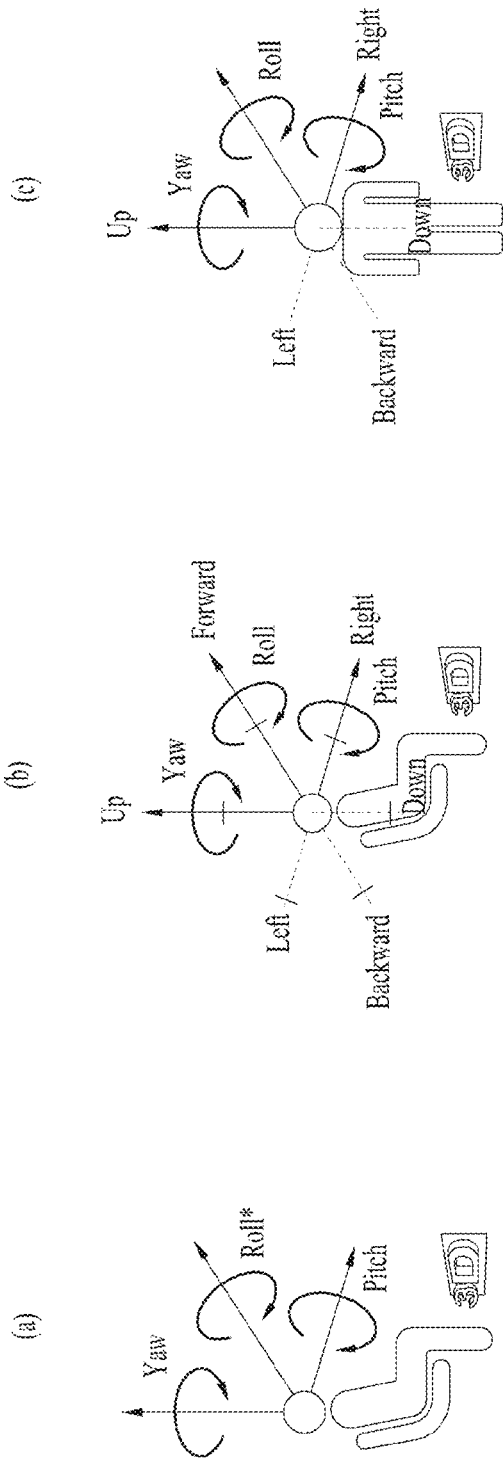
FIG. 16 is a view showing a type of media according to movement of a user.

FIG. 16 is a view showing a type of media according to movement of a user.

The present disclosure proposes a method for providing 6DoF content to provide a user with experiences of immersive media/realistic media. The immersive media/realistic media is a concept extended from a virtual environment provided by the existing 360 contents, and the position of the user is fixed in the form of (a) of the existing 360-degree video contents. If the immersive media/realistic media has only a concept of rotation, the immersive media/realistic media may mean an environment or contents, which can provide a user with more sensory experiences such as movement/rotation of the user in a virtual space by giving a concept of movement when the user experiences contents as described in (b) or (c).

(a) indicates media experiences if a view of a user is rotated in a state that a position of the user is fixed.

(b) indicates media experiences if a user's head may additionally move in addition to a state that a position of the user is fixed.

(c) indicates media experiences when a position of a user may move.

The realistic media contents may include 6DoF video and 6DoF audio for providing corresponding contents, wherein 6DoF video may mean video or image required to provide realistic media contents and captured or reproduced as 3DoF or 360-degree video newly formed during every movement. 6DoF content may mean videos or images displayed on a 3D space. If movement within contents is fixed, the corresponding contents may be displayed on various types of 3D spaces like the existing 360-degree video. For example, the corresponding contents may be displayed on a spherical surface. If movement within the contents is a free state, a 3D space may newly be formed on a moving path based on the user every time and the user may experience contents of the corresponding position. For example, if the user experiences an image displayed on a spherical surface at a position where the user first views, and actually moves on the 3D space, a new image on the spherical surface may be formed based on the moved position and the corresponding contents may be consumed. Likewise, 6DoF audio is an audio content for providing a content to allow a user to experience realistic media, and may mean contents for newly forming and consuming a spatial audio according to movement of a position where sound is consumed.

The present disclosure proposes a method for effectively providing 6DoF video. The 6DoF video may be captured at different positions by two or more cameras. The captured video may be transmitted through a series of processes, and the reception side may process and render some of the received data as 360-degree video having an initial position of the user as a starting point. If the position of the user moves, the reception side may process and render new 360-degree video based on the position where the user has moved, whereby the 6DoF video may be provided to the user.

Hereinafter, a transmission method and a reception method for providing 6DoF video services will be described.

Figure 17:
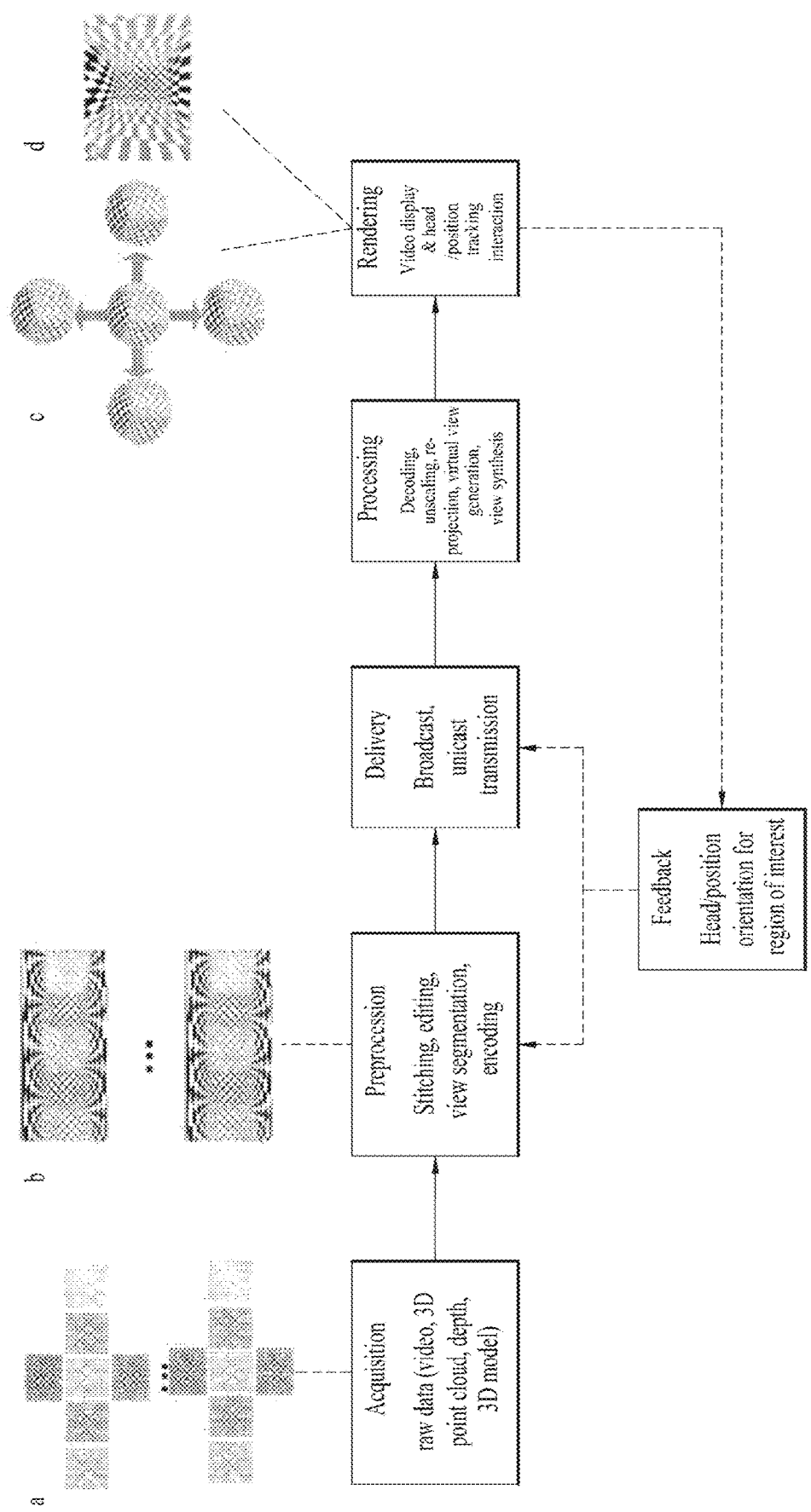
FIG. 17 is a view showing the entire architecture for providing 6DoF video.

FIG. 17 is a view showing the entire architecture for providing 6DoF video.

A series of the processes described above will be described in detail based on FIG. 17. First of all, as an acquisition step, HDCA (High Density Camera Array), Lenslet (microlens) camera, etc. may be used to capture 6DoF contents, and 6DoF video may be acquired by a new device designed for capture of the 6DoF video. The acquired video may be generated as several image/video data sets generated in accordance with a position of a camera, which is captured as shown in FIG. 3a. At this time, metadata such as internal/external setup values of the camera may be generated during the capturing process. In case of image generated by a computer not the camera, the capturing process may be replaced. The pre-processing process of the acquired video may be a process of processing the captured image/video and the metadata delivered through the capturing process. This process may correspond to all of types of pre-processing steps such as a stitching process, a color correction process, a projection process, a view segmentation process for segmenting views into a primary view and a secondary view to enhance coding efficiency, and an encoding process.

The stitching process may be a process of making image/video by connecting image captured in the direction of 360-degree in a position of each camera with image in the form of panorama or sphere based on the position of each camera. Projection means a process of projecting the image resultant from the stitching process to a 2D image as shown in FIG. 3b, and may be expressed as mapping into 2D image. The image mapped in the position of each camera may be segmented into a primary view and a secondary view such that resolution different per view may be applied to enhance video coding efficiency, and arrangement or resolution of mapping image may be varied even within the primary view, whereby efficiency may be enhanced during coding. The secondary view may not exist depending on the capture environment. The secondary view means image/video to be reproduced during a movement process when a user moves from the primary view to another primary view, and may have resolution lower than that of the primary view but may have the same resolution as that of the primary view if necessary. The secondary view may newly be generated by the receiver as virtual information as the case may be.

In some embodiments, the pre-processing process may further include an editing process. In this process, editing for image/video data may further be performed before and after projection, and metadata may be generated even during the pre-processing process. Also, when the image/video are provided, metadata for an initial view to be first reproduced and an initial position and a region of interest (ROI) of a user may be generated.

The media transmission step may be a process of processing and transmitting the image/video data and metadata acquired during the pre-processing process. Processing according to an arbitrary transmission protocol may be performed for transmission, and the pre-processed data may be delivered through a broadcast network and/or a broadband. The pre-processed data may be delivered to the reception side in an on demand manner.

The processing process may include all steps before image is generated, wherein all steps may include decoding the received image/video data and metadata, re-projection which may be called mapping or projection into a 3D model, and a virtual view generation and composition process. The 3D model which is mapped or a projection map may include a sphere, a cube, a cylinder or a pyramid like the existing 360-degree video, and may be a modified type of a projection map of the existing 360-degree video, or may be a projection map of a free type as the case may be.

The virtual view generation and composition process may mean a process of generating and composing the image/video data to be reproduced when the user moves between the primary view and the secondary view or between the primary view and the primary view. The process of processing the metadata delivered during the capture and pre-processing processes may be required to generate the virtual view. As the case may be, some of the 360-degree images/videos not all of the 360-degree images/videos may be generated/composed.

In some embodiments, the processing process may further include an editing process, an up scaling process, and a down scaling process. Additional editing required before reproduction may be applied to the editing process after the processing process. The process of up scaling or down scaling the received images/videos may be performed if necessary.

The rendering process may mean a process of rendering image/video, which is re-projected by being transmitted or generated, to be displayed. As the case may be, rendering and re-projection process may be referred to as rendering. Therefore, the rendering process may include the re-projection process. A plurality of re-projection results may exist in the form of 360-degree video/image based on the user and 360-degree video/image formed based on the position where the user moves in accordance with a moving direction as shown in FIG. 3c. The user may view some region of the 360-degree video/image in accordance with a device to be displayed. At this time, the region viewed by the user may be a form as shown in FIG. 3d. When the user moves, the entire 360-degree videos/images may not be rendered but the image corresponding to the position where the user views may only be rendered. Also, metadata for the position and the moving direction of the user may be delivered to previously predict movement, and video/image of a position to which the user will move may additionally be rendered.

The feedback process may mean a process of delivering various kinds of feedback information, which can be acquired during the display process, to the transmission side. Interactivity between 6DoF content and the user may occur through the feedback process. In some embodiments, the user's head/position orientation and information on a viewport where the user currently views may be delivered during the feedback process. The corresponding information may be delivered to the transmission side or a service provider during the feedback process. In some embodiments, the feedback process may not be performed.

The user's position information may mean information on the user's head position, angle, movement and moving distance. Information on a viewport where the user views may be calculated based on the corresponding information.

Figure 18:
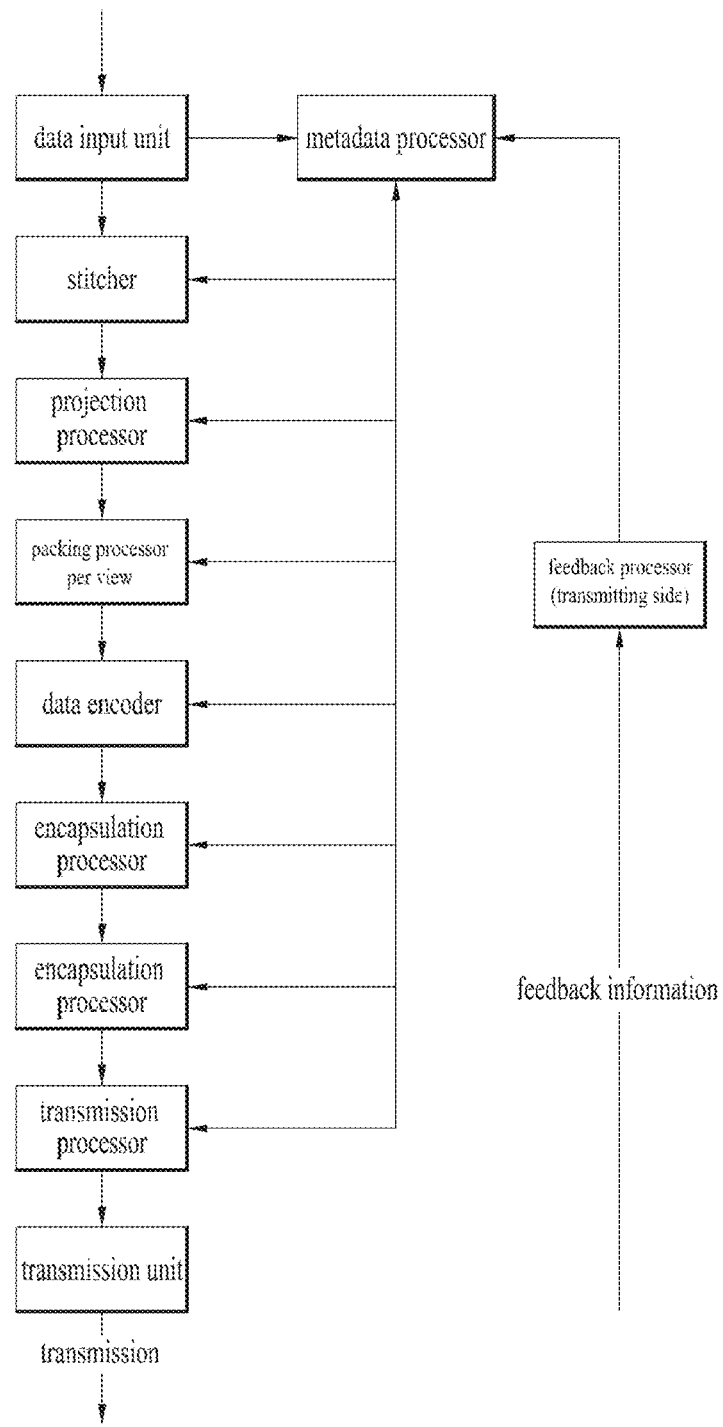
FIG. 18 is a view showing a configuration of a transmission apparatus for providing 6DoF video services.

FIG. 18 is a view showing a configuration of a transmission apparatus for providing 6DoF video services.

The present disclosure at the transmission side may be related to the 6DoF video transmission apparatus. The 6DoF video transmission apparatus may perform the aforementioned preparation processes and operations. The 6DoF video/image transmission apparatus according to the present disclosure may include a data input unit, a depth information processor (not shown), a stitcher, a projection processor, a view segmentation processor, a packing processor per view, a metadata processor, a feedback processor, a data encoder, an encapsulation processor, a transmission-processor, and/or a transmission unit as internal/external components.

The data input unit may receive image/video/depth information/audio data per view captured by one or more cameras at one or more positions. The data input unit may receive metadata generated during the capturing process together with the video/image/depth information/audio data. The data input unit may deliver the input video/image data per view to the stitcher and deliver the metadata generated during the capturing process to the metadata processor.

The stitcher may perform stitching for image/video per captured view/position. The stitcher may deliver the stitched 360-degree video data to the processor. The stitcher may perform stitching for the metadata delivered from the metadata processor if necessary. The stitcher may deliver the metadata generated during the stitching process to the metadata processor. The stitcher may vary a video/image stitching position by using a position value delivered from the depth information processor (not shown). The stitcher may deliver the metadata generated during the stitching process to the metadata processor. The delivered metadata may include information as to whether stitching has been performed, a stitching type, IDs of a primary view and a secondary view, and position information on a corresponding view.

The projection processor may perform projection for the stitched 6DoF video data to 2D image frame. The projection processor may obtain different types of results in accordance with a scheme, and the corresponding scheme may similar to the projection scheme of the existing 360-degree video, or a scheme newly proposed for 6DoF may be applied to the corresponding scheme. Also, different schemes may be applied to the respective views. The depth information processor may deliver depth information to the projection processor to vary a mapping resultant value. The projection processor may receive metadata required for projection from the metadata processor and use the metadata for a projection task if necessary, and may deliver the metadata generated during the projection process to the metadata processor. The corresponding metadata may include a type of a scheme, information as to whether projection has been performed, ID of 2D frame after projection for a primary view and a secondary view, and position information per view.

The packing processor per view may segment view into a primary view and a secondary view as described above and perform region wise packing within each view. That is, the packing processor per view may categorize 6DoF video data projected per view/position into a primary view and a secondary view and allow the primary view and the secondary view to have their respective resolutions different from each other so as to enhance coding efficiency, or may vary rotation and rearrangement of the video data of each view and vary resolution per region categorized within each view. The process of categorizing the primary view and the second view may be optional and thus omitted. The process of varying resolution per region and arrangement may selectively be performed. When the packing processor per view is performed, packing may be performed using the information delivered from the metadata processor, and the metadata generated during the packing process may be delivered to the metadata processor. The metadata defined in the packing process per view may be ID of each view for categorizing each view into a primary view and a secondary view, a size applied per region within a view, and a rotation position value per region.

The stitcher, the projection processor and/or the packing processor per view described as above may occur in an ingest server within one or more hardware components or streaming/download services in some embodiments.

The metadata processor may process metadata, which may occur in the capturing process, the stitching process, the projection process, the packing process per view, the encoding process, the encapsulation process and/or the transmission process. The metadata processor may generate new metadata for 6DoF video service by using the metadata delivered from each process. In some embodiments, the metadata processor may generate new metadata in the form of signaling table. The metadata processor may deliver the delivered metadata and the metadata newly generated/processed therein to another components. The metadata processor may deliver the metadata generated or delivered to the data encoder, the encapsulation processor and/or the transmission-processor to finally transmit the metadata to the reception side.

The data encoder may encode the 6DoF video data projected on the 2D image frame and/or the view/region-wise packed video data. The video data may be encoded in various formats, and encoded result values per view may be delivered separately if category per view is made.

The encapsulation processor may encapsulate the encoded 6DoF video data and/or the related metadata in the form of a file. The related metadata may be received from the aforementioned metadata processor. The encapsulation processor may encapsulate the corresponding data in a file format of ISOBMFF or OMAF, or may process the corresponding data in the form of a DASH segment, or may process the corresponding data in a new type file format. The metadata may be included in various levels of boxes in the file format, or may be included as data in a separate track, or may separately be encapsulated per view. The metadata required per view and the corresponding video information may be encapsulated together.

The transmission-processor may perform additional processing for transmission on the encapsulated video data in accordance with the format. The corresponding processing may be performed using the metadata received from the metadata processor. The transmission unit may transmit the data and/or the metadata received from the transmission-processor through a broadcast network and/or a broadband. The transmission-processor may include components required during transmission through the broadcast network and/or the broadband.

The feedback processor (transmission side) may further include a network interface (not shown). The network interface may receive feedback information from the reception apparatus, which will be described later, and may deliver the feedback information to the feedback processor (transmission side). The feedback processor may deliver the information received from the reception side to the stitcher, the projection processor, the packing processor per view, the encoder, the encapsulation processor and/or the transmission-processor. The feedback processor may deliver the information to the metadata processor so that the metadata processor may deliver the information to the other components or generate/process new metadata and then deliver the generated/processed metadata to the other components. According to another embodiment of the present disclosure, the feedback processor may deliver position/view information received from the network interface to the metadata processor, and the metadata processor may deliver the corresponding position/view information to the projection processor, the packing processor per view, the encapsulation processor and/or the data encoder to transmit only information suitable for current view/position of the user and peripheral information, thereby enhancing coding efficiency.

The components of the aforementioned 6DoF video transmission apparatus may be hardware components implemented by hardware. In some embodiments, the respective components may be modified or omitted or new components may be added thereto, or may be replaced with or incorporated into the other components.

Figure 19:
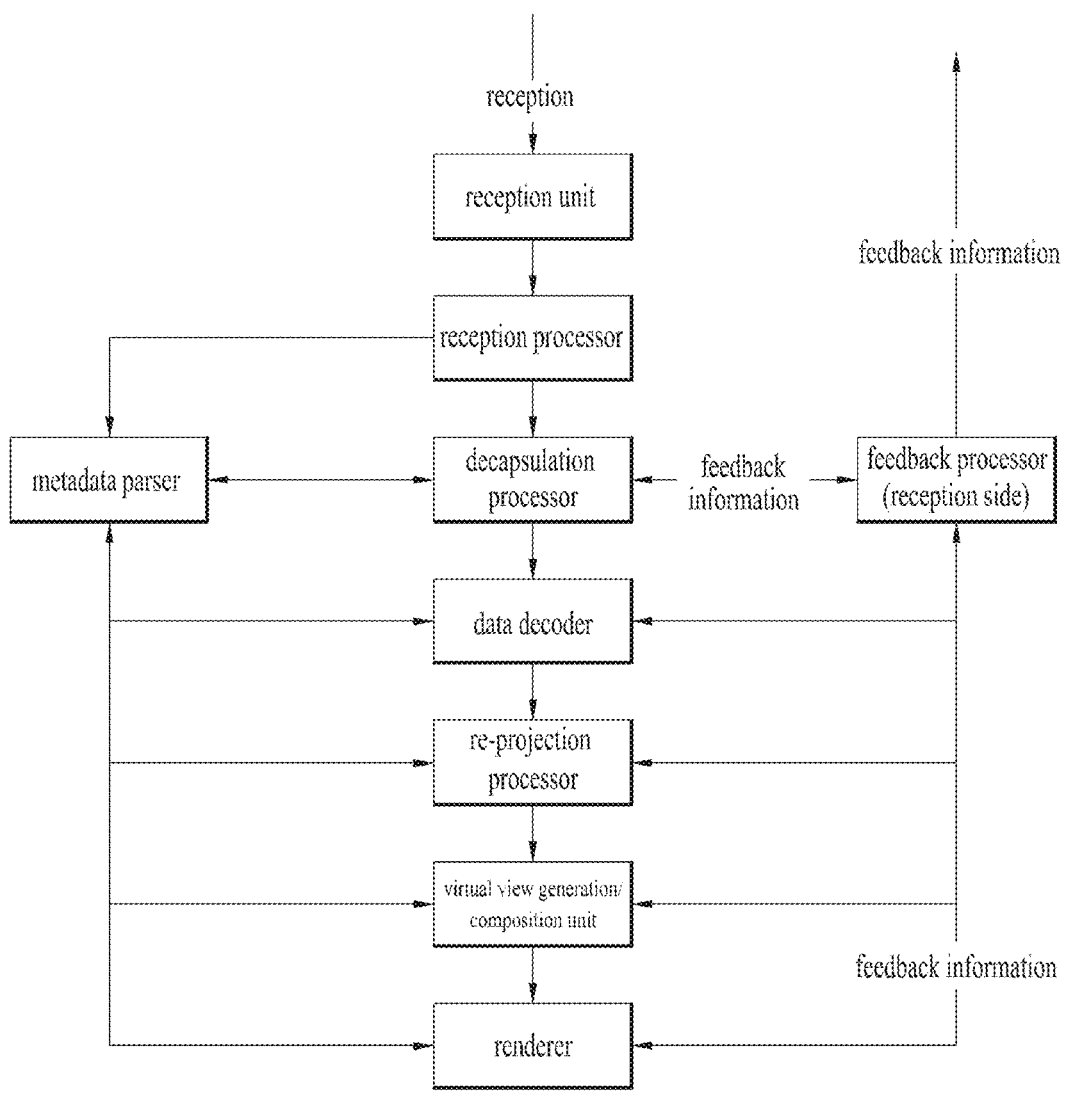
FIG. 19 is a view showing a configuration of 6DoF video reception apparatus.

FIG. 19 is a view showing a configuration of 6DoF video reception apparatus.

The present disclosure may be related to the reception apparatus. According to the present disclosure, the 6DoF video reception apparatus may include a reception unit, a reception processor, a decapsulation-processor, a metadata parser, a feedback processor, a data decoder, a re-projection processor, a virtual view generation/composition unit and/or a renderer as components.

The reception unit may receive video data from the aforementioned 6DoF transmission apparatus. The reception unit may receive the video data through a broadcast network or a broadband in accordance with a channel through which the video data are transmitted.

The reception processor may perform processing according to a transmission protocol for the received 6DoF video data. The reception processor may perform an inverse processing of the process performed in the transmission processor or perform processing according to a protocol processing method to acquire data obtained at a previous step of the transmission processor. The reception processor may deliver the acquired data to the decapsulation-processor, and may deliver metadata information received from the reception unit to the metadata parser.

The decapsulation-processor may decapsulate the 6DoF video data received in the form of file from the reception-processor. The decapsulation-processor may decapsulate the files to be matched with the corresponding file format to acquire 6DoF video and/or metadata. The acquired 6DoF video data may be delivered to the data decoder, and the acquired 6DoF metadata may be delivered to the metadata parser. As needed, the decapsulation-processor may receive metadata necessary for decapsulation from the metadata parser.

The data decoder may decode the 6DoF video data. The data decoder may receive metadata necessary for decoding from the metadata parser. The metadata acquired during the data decoding process may be delivered to the metadata parser and then processed.

The metadata parser may parse/decode the 6DoF video-related metadata. The metadata parser may deliver the acquired metadata to the decapsulation-processor, the data decoder, the re-projection processor, the virtual view generation/composition unit and/or the renderer.

The re-projection processor may re-project the decoded 6DoF video data. The re-projection processor may re-project the 6DoF video data per view/position in a 3D space. The 3D space may have different forms depending on the 3D models that are used, or may be re-projected on the same type of 3D model through a conversion process. The re-projection processor may receive metadata necessary for re-projection from the metadata parser. The re-projection processor may deliver the metadata defined during the re-projection process to the metadata parser. For example, the re-projection processor may receive 3D model of the 6DoF video data per view/position from the metadata parser. If 3D model of video data is different per view/position and video data of all views are re-projected in the same 3D model, the re-projection processor may deliver the type of the 3D model that is applied, to the metadata parser. In some embodiments, the re-projection processor may re-project only a specific area in the 3D space using the metadata for re-projection, or may re-project one or more specific areas.

The virtual view generation/composition unit may generate video data, which are not included in the 6DoF video data re-projected by being transmitted and received on the 3D space but need to be reproduced, in a virtual view area by using given data, and may compose video data in a new view/position based on the virtual view. The virtual view generation/composition unit may use data of the depth information processor (not shown) when generating video data of a new view. The virtual view generation/composition unit may generate/compose the specific area received from the metadata parser and a portion of a peripheral virtual view area, which is not received. The virtual view generation/ composition unit may selectively be performed, and is performed when there is no video information corresponding to a necessary view and position.

The renderer may render the 6DoF video data delivered from the re-projection module and the virtual view generation/composition unit. As described above, all the processes occurring in the re-projection module or the virtual view generation/composition unit on the 3D space may be incorporated within the renderer such that the renderer can perform these processes. In some embodiments, the renderer may render only a portion that is being viewed by a user and a portion on a predicted path in accordance with the user's view/position information.

In the present disclosure, the feedback processor (reception side) and/or the network interface (not shown) may be included as additional components. The feedback processor of the reception side may acquire and process feedback information from the renderer, the virtual view generation/ composition unit, the re-projection processor, the data decoder, the decapsulation module and/or the VR display. The feedback information may include viewport information, head and position orientation information, gaze information, and gesture information. The network interface may receive the feedback information from the feedback processor, and may transmit the feedback information to the transmission unit. The feedback information may be consumed in each component of the reception side. For example, the decapsulation processor may receive position/ viewpoint information of the user from the feedback processor, and may perform decapsulation, decoding, re-projection and rendering for corresponding position information if there is the corresponding position information in the received 6DoF video. If there is no corresponding position information, the 6DoF video located near the corresponding position may be subjected to decapsulation, decoding, re-projection, virtual view generation/composition, and rendering.

The components of the aforementioned 6DoF video reception apparatus may be hardware components implemented by hardware. In some embodiments, the respective components may be modified or omitted or new components may be added thereto, or may be replaced with or incorporated into the other components.

Figure 20:
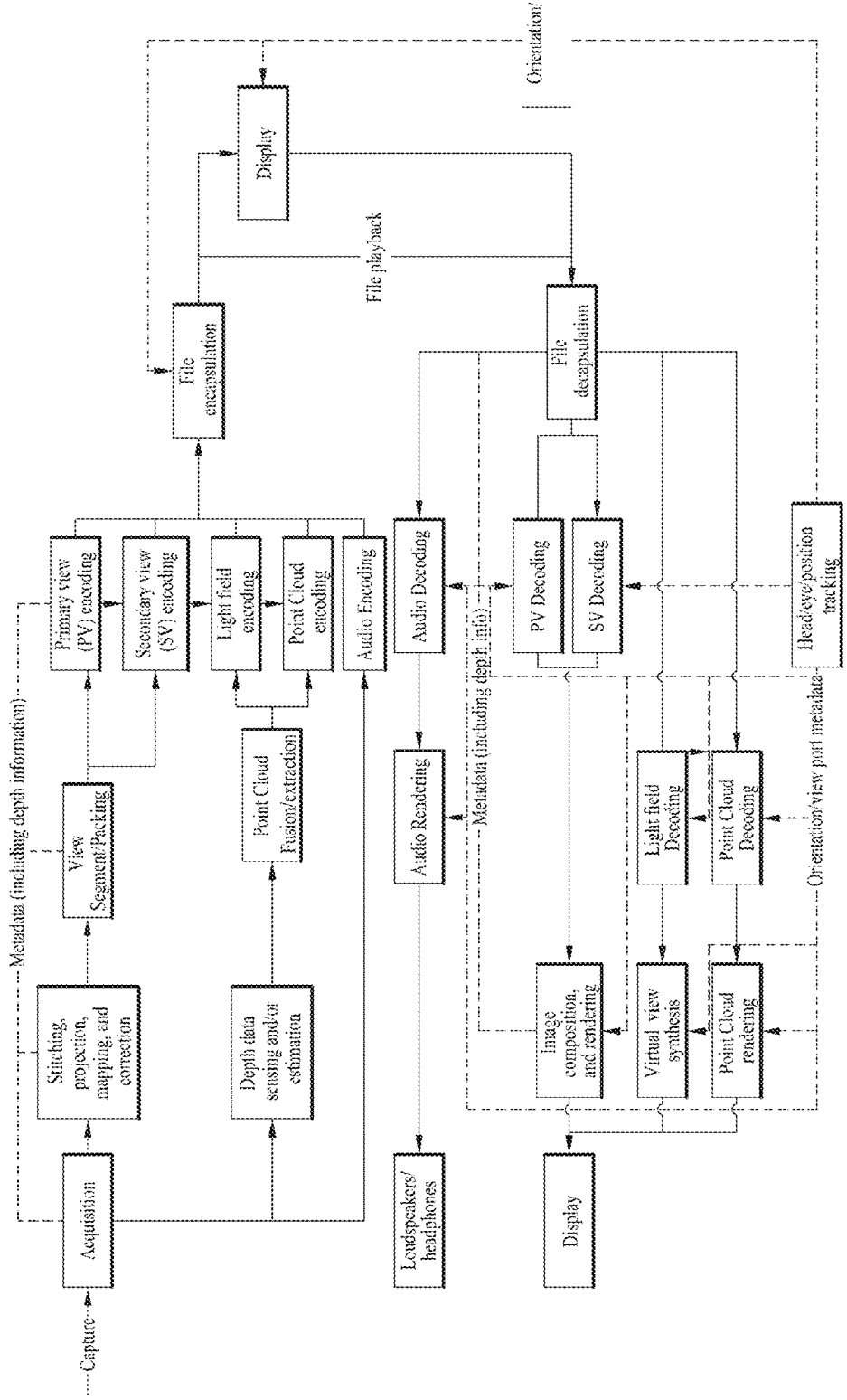
FIG. 20 is a view showing a configuration of 6DoF video transmission/reception apparatus.

FIG. 20 is a view showing a configuration of 6DoF video transmission/reception apparatus.

6DoF contents may be provided in the form of file or segment based download or streaming service such as DASH, or a new file format or streaming/download service method may be used. In this case, 6DoF contents may be called immersive media contents, light field contents, or point cloud contents.

As described above, each process for providing a corresponding file and streaming/download services may be described in detail as follows.

Acquisition: is an output obtained after being captured from a camera for acquiring multi view/stereo/depth image, and two or more videos/images and audio data are obtained, and a depth map in each scene may be acquired if there is a depth camera.

Audio Encoding: 6DoF audio data may be subjected to audio pre-processing and encoding. In this process, metadata may be generated, and related metadata may be subjected to encapsulation/encoding for transmission.

Stitching, Projection, mapping, and correction: 6DoF video data may be subjected to editing, stitching and projection of the image acquired at various positions as described above. Some of these processes may be performed in accordance with the embodiment, or all of the processes may be omitted and then may be performed by the reception side.

View segmentation/packing: As described above, the view segmentation/packing processor may segment images of a primary view (PV), which are required by the reception side, based on the stitched image and pack the segmented images and then perform pre-processing for packing the other images as secondary views. Size, resolution, etc. of the primary view and the secondary views may be controlled during the packing process to enhance coding efficiency. Resolution may be varied even within the same view depending on a condition per region, or rotation and rearrangement may be performed depending on the region.

Depth sensing and/or estimation: is intended to perform a process of extracting a depth map from two or more acquired videos if there is no depth camera. If there is a depth camera, a process of storing position information as to a depth of each object included in each image in image acquisition position may be performed.

Point Cloud Fusion/extraction: a process of modifying a previously acquired depth map to data capable of being encoded may be performed. For example, a pre-processing of allocating a position value of each object of image on 3D by modifying the depth map to a point cloud data type may be performed, and a data type capable of expressing 3D space information not the pointer cloud data type may be applied.

PV encoding/SV encoding/light field/point cloud encoding: each view may previously be packed or depth information and/or position information may be subjected to image encoding or video encoding. The same contents of the same view may be encoded by bitstreams different per region.

There may be a media format such as new codec which will be defined in MPEG-I, HEVC-3D and OMAF++.

File encapsulation: The encoded 6DoF video data may be processed in a file format such as ISOBMFF by file-encapsulation which is the encapsulation processor. Alternatively, the encoded 6DoF video data may be processed to segments.

Metadata (including depth information): Like the 6DoF vide data processing, the metadata generated during stitching, projection, view segmentation/packing, encoding, and encapsulation may be delivered to the metadata processor, or the metadata generated by the metadata processor may be delivered to each process. Also, the metadata generated by the transmission side may be generated as one track or file during the encapsulation process and then delivered to the reception side. The reception side may receive the metadata stored in a separate file or in a track within the file through a broadcast network or a broadband.

Delivery: file and/or segments may be included in a separate track for transmission based on a new model having DASH or similar function. At this time, MPEG DASH, MMT and/or new standard may be applied for transmission.

File decapsulation: The reception apparatus may perform processing for 6DoF video/audio data reception.

Audio decoding/Audio rendering/Loudspeakers/headphones: The 6DoF audio data may be provided to a user through a speaker or headphone after being subjected to audio decoding and rendering.

PV/SV/light field/point cloud decoding: The 6DoF video data may be image or video decoded. As a codec applied to decoding, a codec newly proposed for 6DoF in HEVC-3D, OMAF++ and MPEG may be applied. At this time, a primary view PV and a secondary view SV are segmented from each other and thus video or image may be decoded within each view packing, or may be decoded regardless of view segmentation. Also, after light field and point cloud decoding are performed, feedback of head, position and eye tracking is delivered and then image or video of a peripheral view in which a user is located may be segmented and decoded.

Head/eye/position tracking: a user's head, position, gaze, viewport information, etc. may be acquired and processed as described above.

Point Cloud rendering: when captured video/image data are re-projected on a 3D space, a 3D spatial position is configured, and a process of generating a 3D space of a virtual view to which a user can move is performed although the virtual view is failed to be obtained from the received video/image data.

Virtual view synthesis: a process of generating and synthesizing video data of a new view is performed using 6DoF video data already acquired near a user's position/view if there is no 6DoF video data in a space in which the user is located, as described above. In some embodiments, the virtual view generation and/or composition process may be omitted.

Image composition, and rendering: as a process of rendering image based on a user's position, video data decoded in accordance with the user's position and eyes may be used or video and image near the user, which are made by the virtual view generation/composition, may be rendered.

Figure 21:
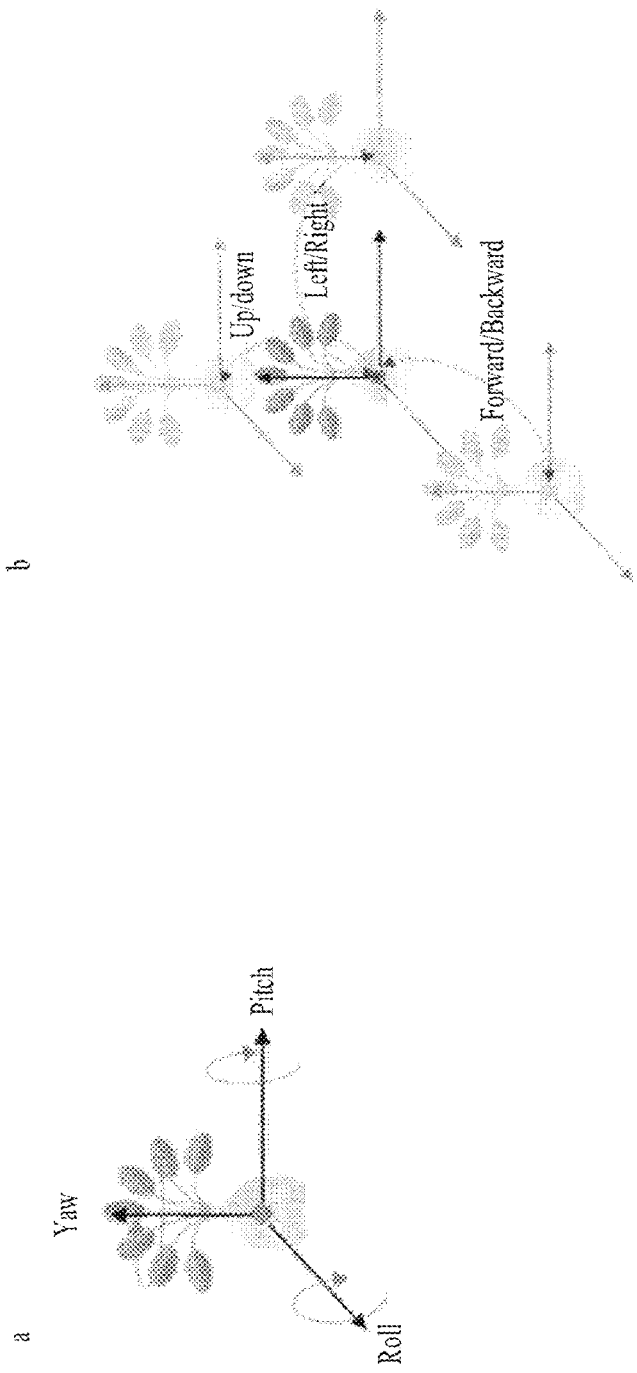
FIG. 21 is a view showing 6DoF space.

FIG. 21 is a view showing 6DoF space.

In the present disclosure, a 6DoF space before projection or after re-projection will be described and the concept of FIG. 21 may be used to perform corresponding signaling.

The 6DoF space may categorize an orientation of movement into two types, rational and translation, unlike the case that the 360-degree video or 3DoF space is described by yaw, pitch and roll. Rational movement may be described by yaw, pitch and roll as described in the orientation of the existing 3DoF like 'a', and may be called orientation movement. On the other hand, translation movement may be called position movement as described in 'b'. Movement of a center axis may be described by definition of one axis or more to indicate a moving orientation of the axis among Left/Right orientation, Forward/Backward orientation, and Up/down orientation.

The present disclosure proposes an architecture for 6DoF video service and streaming, and also proposes basic metadata for file storage and signaling for future use in the invention for 6DoF related metadata and signaling extension.

Metadata generated in each process may be extended based on the proposed 6DoF transceiver architecture.

Metadata generated among the processes of the proposed architecture may be proposed.

6DoF video related parameter of contents for providing 6DoF video services by later addition/correction/extension based on the proposed metadata may be stored in a file such as ISOBMFF and signaled.

6DoF video metadata may be stored and signaled through SEI or VUI of 6DoF video stream by later addition/correction/extension based on the proposed metadata.

Region (meaning in region-wise packing): region may mean a region where 360-degree video data projected on 2D image are located in a packed frame through region-wise packing. In this case, the region may mean a region used in region-wise packing in accordance with the context. As described above, regions may be identified by equally dividing 2D image, or may be identified by being randomly divided in accordance with a projection scheme.

Region (general meaning): unlike the region in the aforementioned region-wise packing, the terminology, region may be used as a dictionary definition. In this case, the region may mean 'area', 'zone', 'portion', etc. For example, when the region means a region of a face which will be described later, the expression 'one region of a corresponding face' may be used. In this case, the region is different from the region in the aforementioned region-wise packing, and both regions may indicate their respective areas different from each other.

Picture: picture may mean the entire 2D image in which 360-degree video data are projected. In some embodiments, a projected frame or a packed frame may be the picture.

Sub-picture: sub-picture may mean a portion of the aforementioned picture. For example, the picture may be segmented into several sub-pictures to perform tiling. At this time, each sub-picture may be a tile. In detail, an operation of reconfiguring tile or MCTS as a picture type compatible with the existing HEVC may be referred to as MCTS extraction. A result of MCTS extraction may be a sub-picture of a picture to which the original tile or MCTS belongs.

Tile: tile is a lower concept of a sub-picture, and the sub-picture may be used as a tile for tiling. That is, the sub-picture and the tile in tiling may be the same concept. In detail, the tile may be a tool enabling parallel decoding or a tool for independent decoding in VR. In VR, tile may mean MCTS (Motion Constrained Tile Set) that restricts a range of temporal inter prediction to a current tile internal range. Therefore, the tile herein may be called MCTS.

Spherical region: spherical region or sphere region may mean one region on a spherical surface when 360-degree video data are rendered on a 3D space (for example, spherical surface) at the reception side. In this case, the spherical region is regardless of the region in the region-wise packing. That is, the spherical region does not need to mean the same region defined in the region-wise packing. The spherical region is a terminology used to mean a potion on a rendered spherical surface, and in this case, 'region' may mean 'region' as a dictionary definition. In accordance with the context, the spherical region may simply be called region.

Face: face may be a terminology for each face in accordance with a projection scheme. For example, if cube map projection is used, a front face, a rear face, side face, an upper face, or a lower face may be called face.

Figure 22:
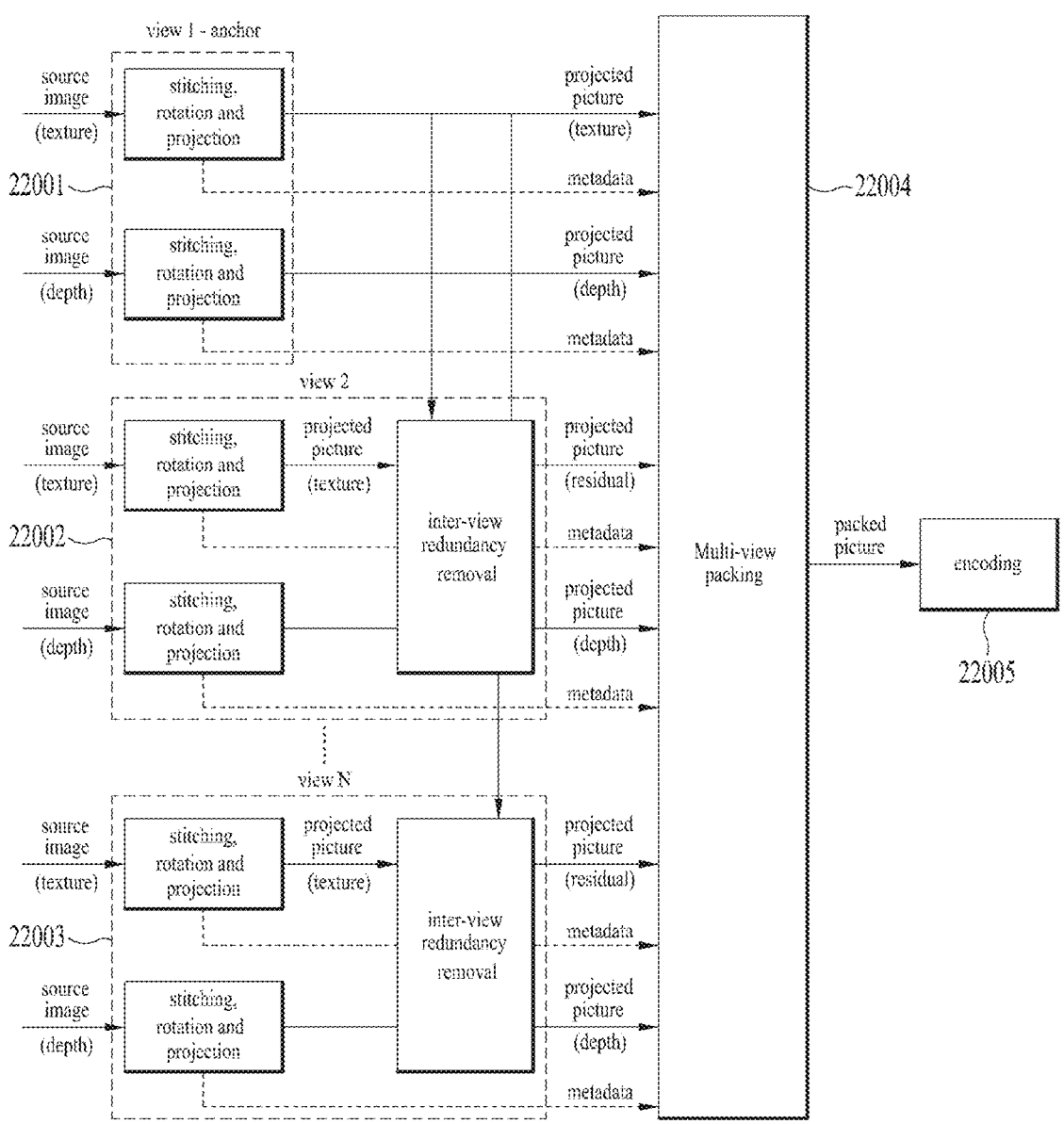
FIG. 22 is a view showing an architecture of a pre-encoding process for multi-views 3DoF+ video according to some embodiments.

FIG. 22 is a view showing an architecture of a pre-encoding process for multi-views 3DoF+ video according to some embodiments.

In FIG. 22, an example pre-encoding processing for the multi-view video for 3DoF+ or head motion parallax is described. As shown in the figure, each view could be composed by different components, texture and depth map, which are produced into a projected picture of each component of each view by stitching, rotation, projection and multi-view packing process. In addition, using redundancy between views, for example between anchor view and the right head motion view, the residual of texture, also depth or other components if possible, could be generated for subsidiary views. This could increase bit efficiency by eliminating redundant information between views. Ones the projected pictures of each view including texture, residual, and depth, they are packed into a single 2D image plane and then the video is encoded using single layer video encoder, such as HEVC or future video codec.

In detail, FIG. 22 is a block diagram showing a video transmission device according to some embodiments. The video transmission device according to some embodiments may mean a structure of a pre-encoding process for multi-views 3DoF+ video. The video transmission device according to some embodiments may include view 1 processor 22001 to view N processor 22003, a multi-view packing module 22004, and an encoding module (or encoder) 22005.

The view 1 processor 22001 may perform stitching/rotation/projection according to some embodiments for each of a texture source image and/or a depth source image corresponding to view 1, and may generate a texture projected picture and/or a depth projected picture for each of the texture source image and/or the depth source image. In this case, view 1 may mean an anchor view according to some embodiments. The anchor view may be referred to as a center view picture or center view, which will be described later.

The view 1 processor 22001 may generate metadata for view 1 if it performs stitching/rotation/projection according to some embodiments for each of the texture source image and/or the depth source image corresponding to view 1. In this case, the metadata for view 1 may include signaling formation related to a method for performing stitching, rotation for view 1 and/or projection. In this case, the metadata for view 1 may include reconstruction parameters according to some embodiments.

The view 2 processor 22002 may perform stitching/rotation/projection according to some embodiments for each of a texture source image and/or a depth source image corresponding to view 2 not view 1 (that is, anchor view), and may generate a texture projected picture and/or a depth projected picture for each of the texture source image and/or the depth source image. Also, the view 2 processor may generate a residual projected picture by further performing inter-view redundancy removal according to some embodiments for the texture projected picture. The residual projected picture may mean a reference view picture and/or sparse view picture, which will be described later. At this time, the residual projected picture may be generated by the inter-view redundancy removal according to some embodiments, based on the texture projected picture corresponding to view 1 (that is, anchor view).

Likewise, the view 2 processor 22002 may generate metadata for view 2 if it performs stitching/rotation/projection according to some embodiments for each of the texture source image and/or the depth source image corresponding to view 2. In this case, the metadata for view 2 may include signaling formation related to a method for performing stitching, rotation for view 2 and/or projection. In this case, the metadata for view 2 may include reconstruction parameters according to some embodiments.

The view N processor 22003 may perform stitching/rotation/projection according to some embodiments for each of a texture source image and/or a depth source image corresponding to view N not view 1 (that is, anchor view), and may generate a texture projected picture and/or a depth projected picture for each of the texture source image and/or the depth source image. Also, the view N processor may generate a residual projected picture by further performing inter-view redundancy removal according to some embodiments for the texture projected picture. The residual projected picture may mean a reference view picture and/or sparse view picture, which will be described later. At this time, the residual projected picture may be generated by the inter-view redundancy removal according to some embodiments, based on the texture projected picture corresponding to view 1 (that is, anchor view).

Likewise, the view N processor 22003 may generate metadata for view N if it performs stitching/rotation/projection according to some embodiments for each of the texture source image and/or the depth source image corresponding to view N. In this case, the metadata for view N may include signaling formation related to a method for performing stitching, rotation for view 2 and/or projection. In this case, the metadata for view N may include reconstruction parameters according to some embodiments.

The multi-view packing module 22004 may generate a packed picture by packing the texture projected picture for view 1, the depth projected picture for view 1 and the metadata for view 1, which are generated from the view 1 processor 22001, the texture projected picture for view 2, the depth projected picture for view 2 and the metadata for view 2, which are generated from the view 2 processor 22002, and the texture projected picture for view N, the depth projected picture for view N and the metadata for view N, which are generated from the view N processor 22003. The multi-view packing module 22004 may mean a packing module according to some embodiments, and the multi-view packing module may be referred to as a multi-view packing module.

The encoder 22005 may perform encoding according to some embodiments for the packed picture generated from the multi-view packing module 22004. The encoding module may mean the encoding module according to some embodiments. The encoding module may encode the packed pictures and/or the metadata. Encoding may be performed by a single layer video encoder or its corresponding device such as HEVC or future video codec.

In accordance with embodiments, each of the view 1 processor 22001, the view 2 processor 23002, . . . , the view N processor 22003, the multi-view packing module 22004 and/or the encoding module 22005 may correspond to hardware, and the video transmission device may perform processing according to the view 1 processor, processing according to the view 2 processor, processing according to the view N processor, multi-view packing and/or encoding operation.

Therefore, a method of transmitting a video in accordance with embodiments may include inter-view redundancy removing pictures for multiple viewing positions, inter-view redundancy removing pictures for multiple viewing positions and encoding the packed pictures and signaling information including center view generation information, pre-generation information, view synthesis recommendation information and reference view information.

Figure 23:
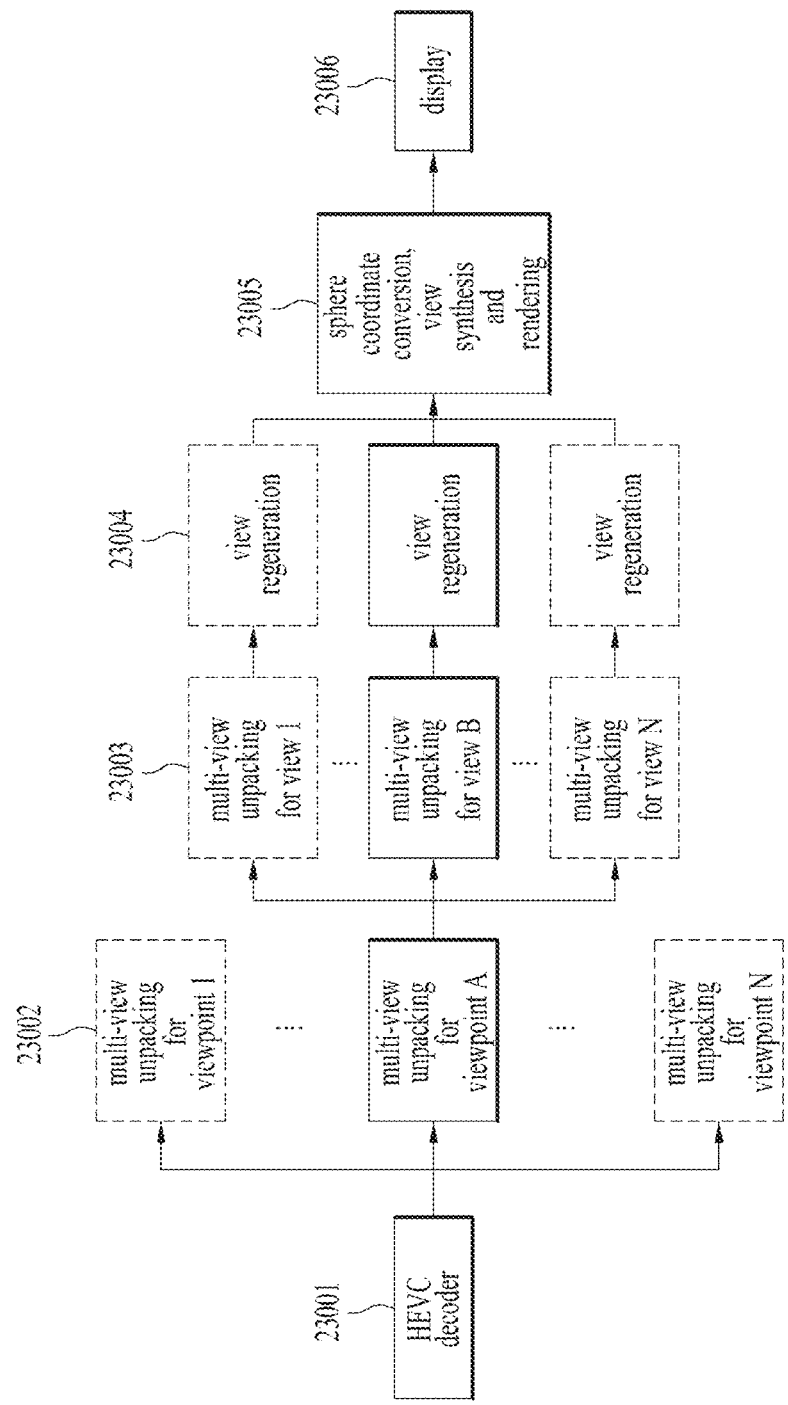
FIG. 23 is a view showing an architecture of a post-decoder process for multi-views 3DoF+ video according to some embodiments.

FIG. 23 is a view showing an architecture of a post-decoder process for multi-views 3DoF+ video according to some embodiments.

In FIG. 23, a concept of post-decoder process of multi-views 3DoF+ video is described. After decoding, the decoder post-processor could generate multiple projected pictures per view for each viewpoint. However, since not all the images are played on the display device, target projected pictures could be generated based on the viewer's viewpoint and viewing position. In this example, view B of viewpoint A is assumed to be selected and the related projected pictures, such as texture, residual, and depth map, could be inputs to the renderer before display. When the selected view is not a full view, texture depth regeneration process or/and view regeneration process is performed to reconstruct a view from the given pictures and additional information from patch or residual.

In detail, FIG. 23 is a block diagram showing a video reception device according to some embodiments. The video reception device according to some embodiments may mean a structure of a post-decoder process for multi-views 3DoF+ video. The video reception device according to some embodiments may include a decoder 23001, a multi-view unpacking module 23002 for one or more viewpoints, an unpacking module 23003 for one or more views, a view regeneration module 23004, a sphere co-ordinate conversion/view synthesis/rendering module 23005, and a display 23006.

The HEVC decoder 23001 may decode bitstreams received in the video reception device. The HEVC decoder may mean a decoder according to some embodiments. The HEVC decoder may generate or output multi-views for one or more viewpoints.

The multi-view unpacking module 23003 for one or more viewpoints may select (or unpack) pictures (or views) for each viewpoint included in the decoded bitstream.

The multi-view unpacking module 23003 for one or more views may select (or unpack) one or more pictures for views for the selected viewpoints.

The view regeneration module 23004 may generate regenerated views according to some embodiments from one or more views (or pictures) selected by the multi-view unpacking module 23002 for one or more viewpoints and/or the multi-view unpacking module 23003 for one or more views.

The sphere coordinate conversion/view synthesis/rendering module 23005 may render a picture (or picture for a target viewing position) for an arbitray viewpoint by using the view regenerated by the view regeneration module 23004.

The display 23006 may display the picture (or picture for a target viewing position) for the rendered arbitray viewpoint.

Each of the HEVC decoder 23001, the multi-view unpacking module 23002 for one or more viewpoints, the unpacking module 23003 for one or more views, the view regeneration module 23004, the sphere coordinate conversion/view synthesis/rendering module 23005, and the display 23006 may correspond to hardware, and the video transmission device may perform all or some of these modules in accordance with some embodiments.

A method of receiving a video in accordance with embodiments may include decoding a bitstream of the video based on viewing position and viewport information, unpacking pictures in the decoded bitstream, view regenerating the unpacked pictures and/or view synthesizing the view regenerated pictures.

Figure 24:
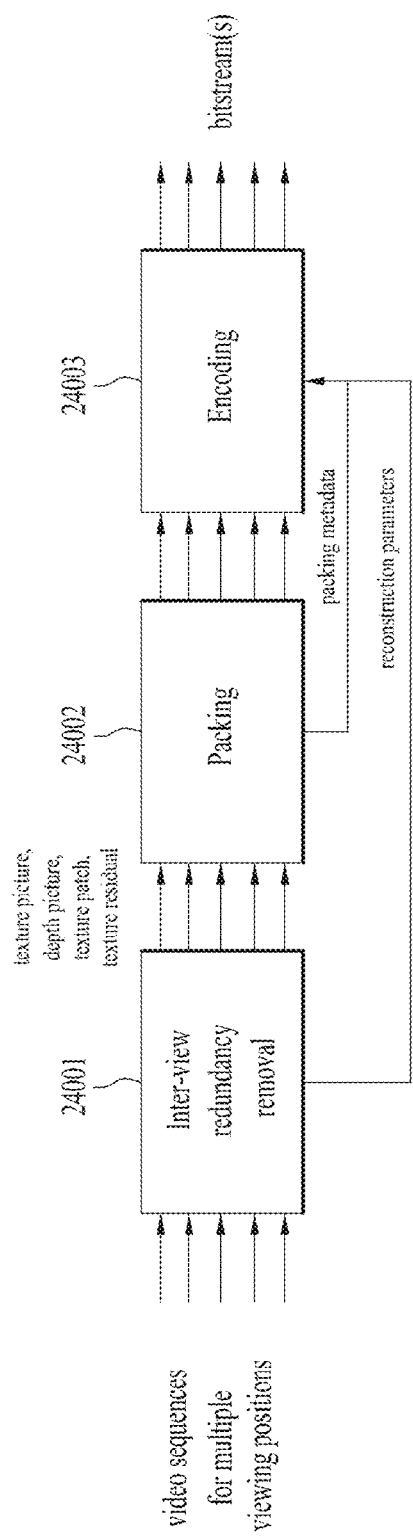
FIG. 24 is a block diagram showing encoder pre-processing units according to some embodiments.

FIG. 24 is a block diagram showing encoder pre-processing units according to some embodiments.

In FIG. 24, block diagram of encoder pre-processing for multi-views 3DoF+ video is described. Based on the high correlation between pictures in the adjacent viewing positions, the redundant pixel information between pictures is removed. After this process, less number of pictures which are used to estimate the removed pixel information is preserved while partial regions or residual of the regions which could not be predicted by the reserved pictured are remained with reduced size of data. The information which viewing position is reserved for full picture, which kind of information is remained in the other viewing positions, how the removed information could be derived, and how the picture of the viewing position could be regenerated is delivered with reconstruction parameter, such as view regeneration information SEI message or texture depth regeneration information SEI message. When the redundancy is removed, the remaining picture, patches, and residuals, etc are paced into one or multiple pictures. The packing information, such as the location and size of the picture, patches, and residuals, the type of the pixels in the region, the location and size of the region in the original picture, the size of the original picture, etc are delivered with the packing metadata, such as Multiview region-wise packing information SEI message.

In detail, FIG. 24 is a block diagram showing a video transmission device according to some embodiments. The video transmission device according to some embodiments may include an encoder pre-processor. The video transmission device according to some embodiments may include an inter-view redundancy removal module 24001, a packing module 24002, and/or an encoder 24003.

The inter-view redundancy removal module 24001 removes redundancy between adjacent views for viewing positions included in video sequences for multiple viewing positions by receiving the video sequences. The inter-view redundancy removal module 24001 may output a texture picture, a depth picture, a texture patch, and/or a texture residual, from which redundancy between views is removed. In this case, the video sequences for multiple viewing positions may mean or include images for the viewing positions or source image.

At this time, the inter-view redundancy removal module may generate reconstruction parameters. The reconstruction parameters may mean signaling information required in performing view regeneration of the receiver according to some embodiments. For example, the reconstruction parameters may include all or some of parameters included in a viewing position group information SEI message syntax shown in FIG. 30.

The packing module 24002 may generate one or more packed pictures by packing the pictures (texture picture, depth picture, texture patch and/or texture residual) generated from the inter-view redundancy removal module 24001. The packing module 24002 may further generate packing metadata. The packing metadata may mean signaling information required to perform unpacking according to some embodiments. For example, the packing metadata may include all or some of the parameters included in the viewing position group information SEI message syntax shown in FIG. 30.

The encoder 24003 may encode the packed pictures received from the packing module and output them as bitstreams. The encoder may mean the encoder according to FIG. 22 or the aforementioned embodiments. The encoder may further encode the packing metadata and/or the reconstruction parameters according to some embodiments as well as the packed pictures.

Each of the inter-view redundancy removal module 24001, the packing module 24002, and the encoder 24003 may correspond to hardware, and the video transmission device may perform inter-view redundancy, removing, packing and/or encoding in accordance with some embodiments.

Therefore, a method of transmitting a video in accordance with embodiments may include inter-view redundancy removing pictures for multiple viewing positions, interview redundancy removing pictures for multiple viewing positions and encoding the packed pictures and signaling information including center view generation information, pre-generation information, view synthesis recommendation information and reference view information.

Figure 25:
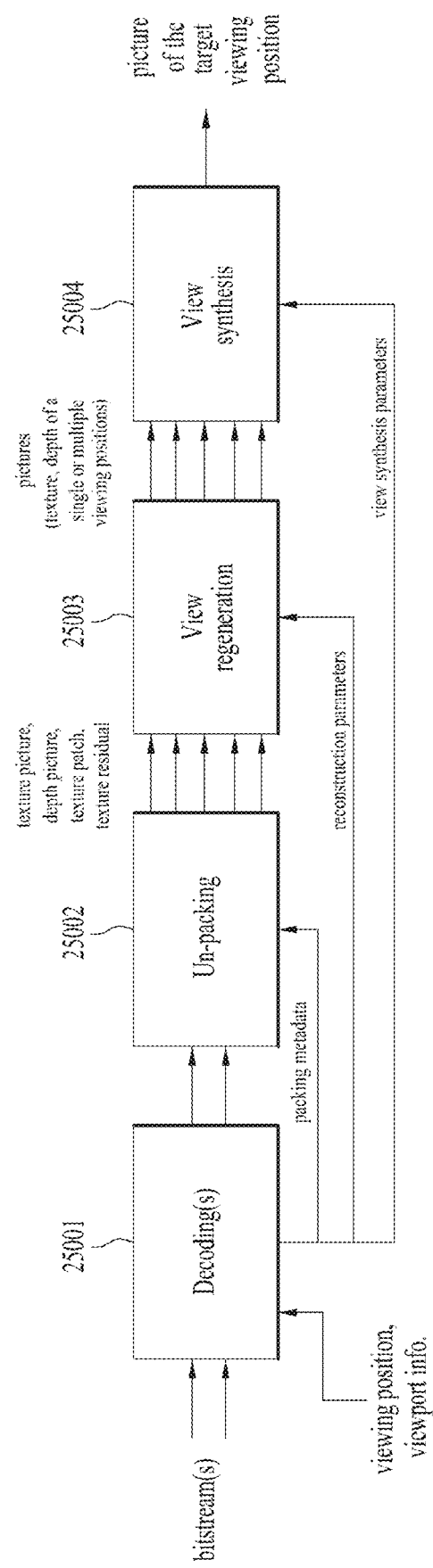
FIG. 25 is a block diagram showing decoder post-processing units according to some embodiments.

FIG. 25 is a block diagram showing decoder post-processing units according to some embodiments.

In FIG. 25, block diagram of decoder post-processing for multi-views 3DoF+ video is described. When the bitstreams are decoded, the decoded output pictures are unpacked by using the packing metadata. In the metadata, the size, type, and the viewing position of the target picture, the size, type, location of each region are described. After the un-packing process, pictures in the missing viewing position are restored by the view regeneration process (or texture depth regeneration process) in aid of the reconstruction parameters. In this metadata, the size and the location of the patches and residuals, the method of estimating the removed pixel values, how to regenerate the missing pixel values, and post-filtering parameters for block boundary removal is described. With the regenerated and delivered pictures for multiple viewing positions, a single view corresponding to the viewer's viewing position is synthesized by view synthesis module.

In detail, FIG. 25 is a block diagram showing a video reception device according to some embodiments. The video reception device according to some embodiments may include a post-processor. The video reception device according to some embodiments may include a decoder 25001, an unpacking module 25002, a view regeneration module 25003, and/or a view synthesis module 25004.

The decoder 25001 may generate or output packed views (or pictures) and/or related signaling information by decoding bitstreams received from the video reception device according to some embodiments. The related signaling information output from the decoder, for example, may include packing metadata, reconstruction parameters, view synthesis parameters, etc. The packing metadata may be signaling information required to perform unpacking in the unpacking module 25002 according to some embodiments. The reconstruction parameters may be signaling information required to perform view regeneration in the view regeneration module 25003 according to some embodiments. The view synthesis parameters may be signaling information required to perform view synthesis in the view synthesis module 25004 according to some embodiments. The decoder may perform decoding based on viewing position of the receiver and/or viewport information as information generated in the receiver.

The viewing position and/or viewport information according to some embodiments is information on viewing position and/or viewport of a user. The decoder 25001 according to some embodiments may decode pictures corresponding to viewing position and/or viewport information based on viewing position and/or viewport information of pictures included in the received bitstreams. The decoder 25001 according to some embodiments may efficiently decode only the pictures for viewing position and/or viewport viewed by a user.

The unpacking module 25002 may generate or output one or more texture pictures, depth pictures, texture patches and/or texture residuals by unpacking packed views (or packed pictures) included in the bitstreams decoded by the decoder. The unpacking module may perform unpacking based on packing metadata included in the signaling information included in the bitstreams decoded by the decoder. For example, the packing metadata may include all or some of the parameters included in the viewing position group information SEI message syntax shown in FIG. 30.

The view regeneration module 25003 may generate or output regenerated views based on one or more texture pictures, depth pictures, texture patches and/or texture residuals generated/output by the unpacking module. The regenerated views may mean texture pictures of a single or multiple viewing positions and/or depth pictures of a single or multiple viewing positions. At this time, the view regeneration module 25003 may perform view regeneration based on the reconstruction parameters included in the signaling information included in the bitstreams decoded by the decoder. The reconstruction parameters may include all or some of the parameters included in the viewing position group information SEI message syntax shown in FIG. 30.

The view synthesis module 25004 may generate a picture of the target viewing position based on the view regenerated by the view regeneration module. The picture of the target viewing position may mean a picture of an arbitrary viewing position. At this time, the view synthesis module may perform view synthesis based on view synthesis parameters according to some embodiments, which are included in the signaling information included in the bitstreams decoded by the decoder. The view synthesis parameters may include all or some of the parameters included in the viewing position group information SEI message syntax shown in FIG. 30.

A method of receiving a video in accordance with embodiments may include decoding a bitstream of the video based on viewing position and viewport information, unpacking pictures in the decoded bitstream, view regenerating the unpacked pictures and/or view synthesizing the view regenerated pictures.

Figure 26:
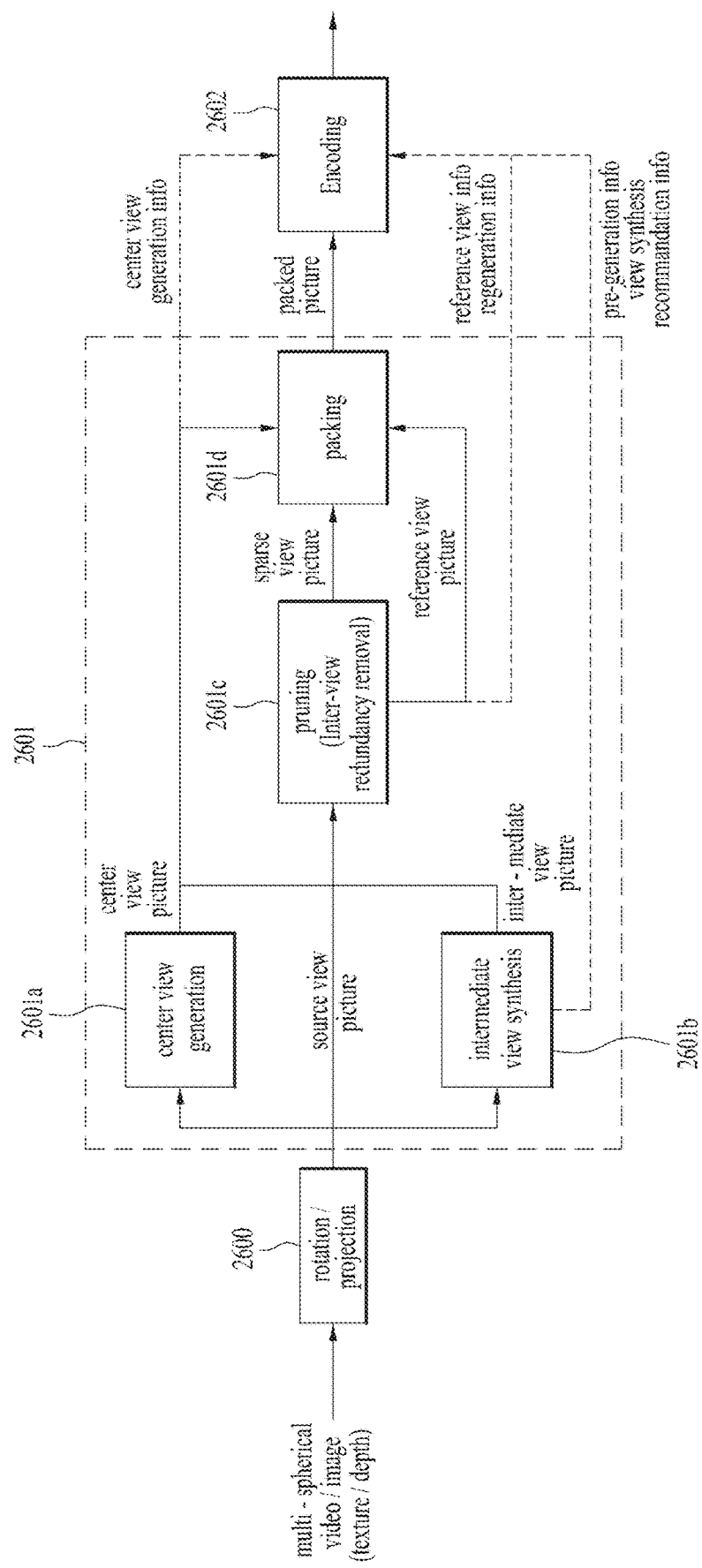
FIG. 26 is a block diagram showing encoder pre-processing units according to some embodiments.

FIG. 26 is a block diagram showing encoder pre-processing according to some embodiments.

In FIG. 26, the detailed description of the inter-view redundancy removal in the encoder pre-processing is described. According to the picture type that is delivered in the encoder input, view_position_processing_order_idx, viewing position picture type are generated to indicate the processing order and processing method.

Center view generation: generate a view that could represent the center view of this group of viewing positions. It could produce center view picture itself and/or the center view generation information, such as, alternative viewing position id, alternative view distance, rec center view generation method type, alternative view distance, viewing position id, and center view generation parameter. In detail, the center view picture may mean a spherical video/image for a center position of multi-spherical video/image. Also, if the center view picture is included in the input image or there is no center view picture, the center view picture may be generated through virtual viewpoint generation of the center view generation according to some embodiment.

Intermediate view synthesis: if the processor uses generated views on top of the provided views (or source view), intermediate view could be synthesized. The output of this process is intermediate views with additional information of pre-generation information, such as pregeneration_method_type, num_ref_views, viewing_position_id, num_sparse_views, and picture_id. In addition, information that could be used in the view synthesis in the decoder post-processing could be delivered, such as view_synthesis_parameter, num_ref_views, viewing_position_id, sparse_view_present_flag, and alternative_viewing_position_id.

Pruning: given multiple videos corresponding to the viewing position that are in the same group, consist of source view, intermediate view, and center view, the redundancy between view are removed in this step. The output of this process is sparse view pictures, conceptually unique information/pixels in a viewing position, reference view pictures, a picture that could provide a base information/picture to the others. In addition reference view information, num_views_using_this_ref_view, num_ref_views, viewing_position_id, view_regeneration_method_type, num_sparse_views, picture_id, and/or regeneration information, num_ref_views, viewing_position_id, view_regeneration_method_type, num_sparse_views, picture_id[i] [j], could be produced.

In other words, rotation/projection 2600 may mean stitching/rotation/projection according to some embodiments. That is, rotation/projection 2600 may mean stitching/rotation/projection or some of them according to FIG. 22. In FIG. 26, multi-spherical videos/image may mean all or some of video sequences for multiple viewing positions as embodiments. Also, a source view picture shown in FIG. 26 may mean a picture for which rotation/projection 2600 is performed. As embodiments, the source view picture described in in FIG. 26 may mean the projected picture according to FIG. 22.

A center view generation 2601a may generate a center view picture by receiving one or more source view pictures. The center view picture may include a texture picture and/or a depth picture corresponding thereto. The center view picture may mean the anchor view described in FIG. 22.

The center view or the center view picture may mean a spherical video or video/image for a center position of multi-spherical video or image (or corresponding picture). The center view may be referred to as an anchor view or center view picture. The center view generation in the reception device according to some embodiments may generate a center view according to some embodiments from the source view picture if the center view is not included in the unpacked pictures. That is, if the center view is included in the input image, or there is no center view, the center view may be generated through virtual viewpoint generation.

The center view generation may generate center view generation information that includes center view related information. The center view generation information may mean signaling information used by the center view generation of the reception device, which exists in the decoder end (or the reception device according to some embodiments) to generate the center view. The center view generation information may include all or some of alternative_viewing_position_id[i], alternative_view_distance, rec_center_view_generation_method_type[i], num_pictures_for_center_view_generation[i], viewing_position_id [i], and center_view_generation_parameter[i] shown in FIG. 30 as embodiments.

An intermediate view synthesis 2601*b* may generate an intermediate view picture by receiving one or more source view pictures.

An intermediate view picture may mean multi-spherical video or image (or corresponding picture) according to some embodiments, that is, a picture generated for a viewing position (that is, picture for a viewpoint) which does not exist within the source view pictures. Also, the intermediate view synthesis may generate pre-generation information and/or view synthesis recommendation information as signaling information. The intermediate view picture may be one or more. The pre-generation information and/or the view synthesis recommendation information may mean signaling information required for the reception device according to some embodiments to perform view synthesis.

The pre-generation information and/or the view synthesis recommendation information may mean information delivered in case of viewing_position_picture_type[i], ==3, 4 in the viewing position group information SEI message syntax in FIG. 30 as an embodiment. In other words, the pre-generation information may include pre-generation_method_type_[i], num_ref_views [i], viewing_position_id [i] [j], view_regeneration_method_type [i], num_sparse_views [i] and/or picture_id [i] as information delivered in case of viewing_position_picture_type[i], ==3 in FIG. 30. Also, the view synthesis recommendation information may include view_synthesis_method_type[i], view_synthesis_parameter[i], num_ref_views[i], viewing_position_id[i] [j] and/or sparse_view_present_flag as information delivered in case of viewing_position_picture_type[i], ==4 in FIG. 30.

Pruning 2601*c* may remove redundancy between one or more source views by receiving one or more source view pictures. At this time, the pruning may be performed by further receiving a center view picture and/or intermediate view as well as one or more source view pictures. The pruning may generate a sparse view picture and/or a reference view picture by receiving one or more source view pictures, center view pictures and/or intermediate view pictures and removing redundancy.

The reference view pictures may mean pictures that may provide basic information for one or more source view pictures (or some or all of the corresponding viewing position). That is, the reference view pictures may mean images of peripheral viewpoints of a specific viewpoint (current viewpoint), which are used to estimate the specific viewpoint, in performing pruning for the source view picture. In this case, as the reference view, all or some of the source view pictures may be used, or all or some of the pictures (for example, intermediate views) generated by synthesis of virtual viewpoints may be used.

The sparse view picture may mean a picture that includes specific information (or pixels) for one or more source view pictures (or some or all of corresponding viewing positions). That is, the sparse view picture may mean an image containing information which is not capable of being estimated when the specific viewpoint (current viewpoint) is estimated from peripheral viewpoints of the specific viewpoint through pruning for the source view picture. That is, the sparse view picture may indicate information (that is, information capable of being estimated) repeated with a peripheral portion in an image of the specific viewpoint (current viewpoint) as gray/black regions, and information which is not capable of being estimated may be included in the sparse view picture.

Pruning may generate reference view information and/or regeneration information. The reference view information may mean signaling information indicating information on one or more reference views or each reference view. Also, the regeneration information may mean signaling information related to view regeneration of the decoder end of the receiver. The reference view information may include num_views_using_this_ref_view[i], viewing_position_id [i], etc. shown in FIG. 30 as embodiments. Also, the view regeneration information may include num ref views[i], view_regeneration_method_type[i], num_sparse_views[i], picture_id[i] [j], etc. shown in FIG. 30 as embodiments. That is, the reference view information and/or the regeneration information may include only information that may be delivered by viewing_position_picture_type[i]==1, 2, or may include some of the information.

Packing 2601*d* may pack one or more sparse view pictures and reference view pictures generated by pruning. For example, the packing 2601*d* may pack the center view picture generated by the center view generation. The packing 2601*d* described in FIG. 26 may mean multi-view packing and/or packing according to FIG. 22 and/or FIG. 24 as embodiments. The packing may generate a packed picture by packing one or more sparse view pictures, reference view pictures and/or center view pictures.

Encoding 2602 may encode the packed picture and/or signaling information. The signaling information may include the aforementioned center view generation information, reference view information, regeneration information, pre-generation information and/or view synthesis recommendation information.

In accordance with embodiments, each of rotation/projection 2600, center view generation 2601*a*, intermediate view synthesis 2601*b*, pruning 2601*c*, packing 2601*d* and/or encoding 2602 may be performed by the video transmission device, and may be performed by the rotation/projection module, the center view generation module, the intermediate view synthesis module, a pruning module (or inter-view redundancy removal module), the packing module and/or the encoder (or encoding module), respectively.

Therefore, a method of transmitting a video in accordance with embodiments may include inter-view redundancy removing pictures for multiple viewing positions, interview redundancy removing pictures for multiple viewing positions and encoding the packed pictures and signaling information including center view generation information, pre-generation information, view synthesis recommendation information and reference view information.

An example of method may include, generating a center view picture and center view generation information based on source view pictures included in the pictures for multiple viewing positions, wherein the packing further packs the center view picture.

An example of method may include, synthesizing intermediate view pictures based on the source view pictures, wherein the synthesizing generates intermediate view pictures, pre-generation information and view synthesis recommendation information.

Additionally for an example, wherein the inter-view redundancy removing performs pruning redundancy based on the source view pictures and the center view picture, wherein the inter-view redundancy removed pictures include one or more sparse view pictures and one or more reference view pictures.

In so, wherein the inter-view redundancy removing generates reference view information, the reference view information including first information representing a number of the reference view pictures and second information representing a number of the sparse view pictures, wherein the pre-generation information includes third information representing type of pre-generation method. Also, wherein the center view generation information includes fourth information for alternative viewing position related to the center view picture and fifth information related to method of generating the center view.

Receivers could generate a video with head motion parallax and/or binocular disparity, or different viewpoints, which receivers could generate interactive video with changing locations. Therefore, by saving bandwidth to deliver the 3DoF+ video or the storage space, high quality of 3DoF+ video which could provide head motion parallax could be achieved. Due to this configuration, receiver can provide different viewing experience with viewer's action in the VR environment.

Figure 27:
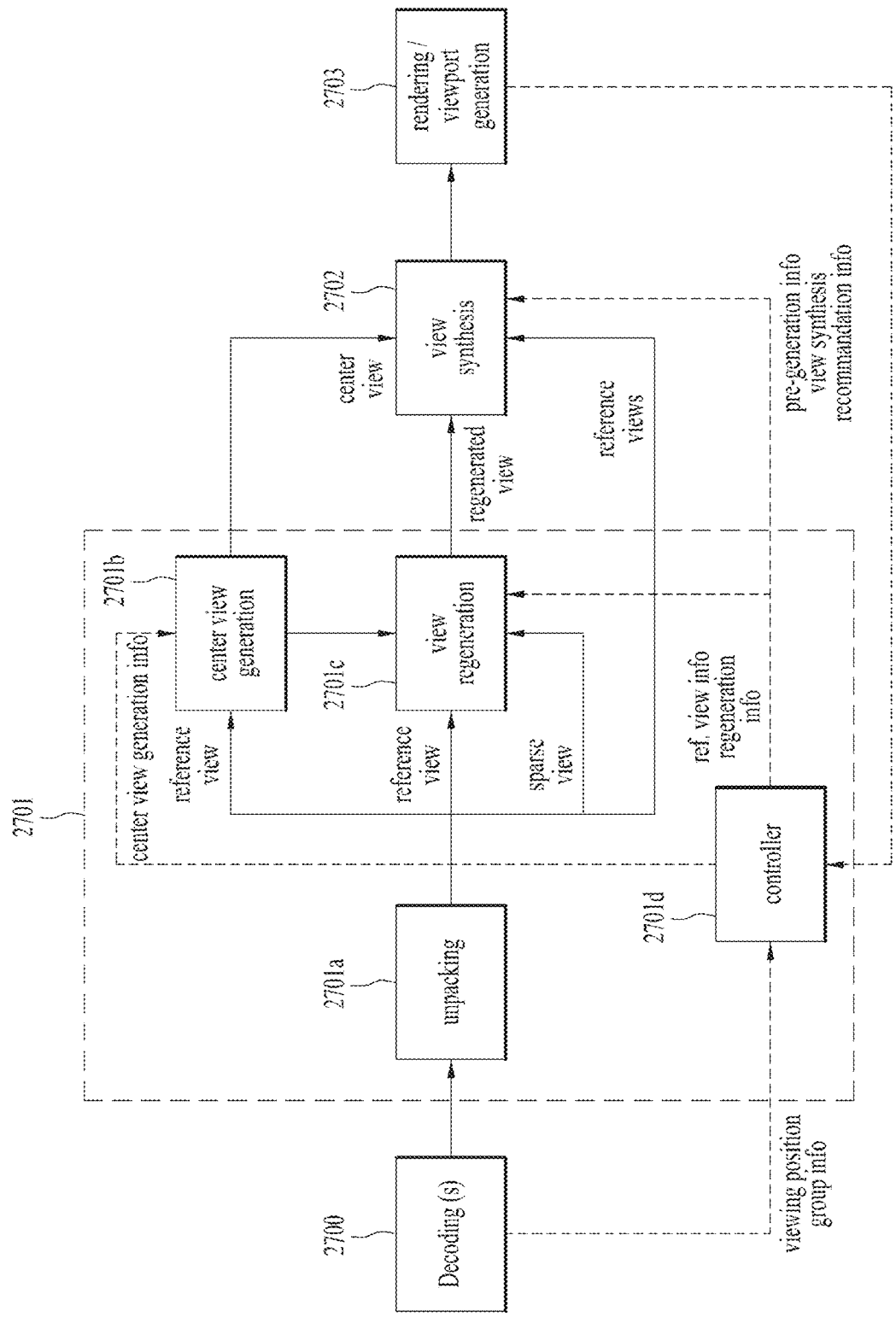
FIG. 27 shows a relationship between viewing positions due to the processing orders in a reception device according to some embodiments.

FIG. 27 shows a relationship between viewing positions due to the processing orders for the reception device according to some embodiments.

In FIG. 27, detailed description of view regeneration in the post-processing unit is described. According to the viewpoint of the viewer, the viewing positions that are needed by the view synthesizer could be determined. Then, decoder post-processer could determine the process that is needed for each viewing position by using viewing position picture type of each viewing position. In addition, the process order in the receiver could follow view position processing order idx of each viewing position. The followings are description of each module according to the picture type of different viewing positions.

Center view generation: when the viewing position picture type equal to 0 or center view present flag equal to 0, the center view generation is processed. The reference viewing positions and the parameters for each viewing position is given by viewing_position_id, center_view_generation_parameter. In other case, if the computational complexity is huge burden to the receiver, alternative viewing position could be used by the information given alternative_viewing_position_id, alternative_view_distance, rec_center_view_generation_method_type. In detail, the center view picture may mean a spherical video/image for a center position of the multi-spherical video/image. Also, if the center view picture is included in the input image, or there is no center view picture, the center view picture may be generated through virtual viewpoint generation.

View generation: when viewing_position_picture_type equal to 1, the picture could be used as a reference picture to the other viewing position. In this case, decoder could store the picture in the buffer with the information of viewing position that uses this picture given by viewing_position_id.

when viewing_position_picture_type equal to 2, view generation shall be used to restore the picture of this viewing position. The reference views and the sparse view that are needed to the regeneration process are are indicated by viewing_position_id and picture_id, respectively. The receiver shall use the regeneration process method given by view_regeneration_method_type to restore the viewing position intended by the encoder.

View synthesis: when viewing_position_picture_type equal to 3, the picture is not a source picture but pre-generated views. Receivers could determine whether it uses this picture or synthesize a new picture with the regenerated views. In the determination, the processed method could be one of the determination criteria given by pregeneration_method_type. If the receiver uses this picture, reference pictures given by viewing_position_id and the sparse view given by picture_id are used with the regeneration method.

when viewing_position_picture_type equal to 4, recommended view synthesis information is provided for this viewing position. They are the synthesis method, parameter, reference viewing position indicator, and sparse view present flag, given by ref_view_systhesis_method_type, view_synthesis_parameter, viewing_position_id, sparse_view_present_flag, respectively.

when viewing_position_picture_type equal to 5, the viewing position could be replaced by other view from the source view, regenerated view, or synthesized views, indicated by alternative_viewing_position_id The metadata, view position group information given by the encoder pre-processing, is parsed by controller in FIG. 9. In this module, the whole viewport generation process is controlled by determining which viewing position shall be generated, which process module shall be worked, and in which order the modules shall be processed. For example, if a viewing position that viewer want to watch is a center position or a picture position that is exactly same with the reference picture position, only the picture of that position could be selected from the unpacked picture. However if the center position is not generated in the encoder pre-processor, the center view generation module could be processed with the reference pictures in the packed picture. In other cases, if the viewing position is not a full picture so additional process is needed, the processing units, such as view regeneration or center view generation, shall be turned on and the method which is indicated in the metadata, which means intended by the encoder pre-processor, is used to generate picture of a viewing position from reference pictures and sparse pictures. In this step, it is general to use the center view or reference views to generate the other views, so center view or reference view generation shall be processed precedent to the view regeneration. If the viewing position is not match with the viewing positions provided or regenerated from the decoded picture, the picture shall be synthesized using given viewing positions. As the view synthesis module produces a new view by using other views, view regeneration module shall be precedent to the view synthesis model for all viewing positions that are needed to generate the synthesized view. The relationship or the processing order is given by viewing_position_picture_type and view_position_processing_order_idx.

In other words, the video reception method and/or the video reception device according to the embodiments described in FIG. 27 will be described.

Decoding 2700 may perform decoding for the received bitstreams. Decoding may be performed by the decoder of the video reception device according some embodiments. Decoding and/or decoder described in FIG. 27 may mean decoding and/or decoder according to the aforementioned description.

Unpacking 2701*a* may unpack the decoded bitstreams. Unpacking may output or generate one or more reference views and/or one or more sparse views by unpacking the decoded bitstreams. That is, if the received bitstreams are decoded, the decoded bitstreams may include one or more reference views and/or one or more sparse views. Unpacking described in FIG. 27 may mean the unpacking according to the afore-mentioned description. Also, unpacking may be performed by an unpacker as embodiments.

Center view generation 2701b may generate a center view (center view picture) based on one or more reference views output or generated in accordance with the aforementioned unpacking. The center view may mean a view indicating a viewing position or a group of viewing positions. The center view generation may generate a center view (center view picture) based on one or more reference views, and may be generated in the center view generation information.

The center view generation information may mean signaling information used by the center view generation to generate a center view. The center view generation information may include all or some of alternative_viewing_position_id[i], alternative_view_distance, rec_center_view_generation_method_type[i], num_pictures_for_center_view_generation[i], viewing_position_id[i] and/or center_view_generation_parameter[i] in FIG. 30 as embodiments. The center view described in FIG. 27 may be referred to as a center view picture.

The center view may mean a spherical video or video/image for a center position of multi-spherical video or image (or corresponding picture). The center view generation according to some embodiments may generate a center view according to some embodiments from the source view picture (or reference view pictures) if the center view is not included in the unpacked pictures. That is, if the center view is included in the input image, or there is no center view, the center view may be generated by the center view generation through virtual viewpoint generation.

View regeneration 2701c may generate a regenerated view based on one or more unpacked reference views. The view regeneration may generate a regenerated view based on one or more unpacked reference views, one or more unpacked sparse views and/or the center view generated in accordance with the center view generation 2701b. Also, the regenerated view may be generated based on reference view information and/or regeneration information.

Reference view information may mean signaling information indicating information on one or more reference views or each reference view. Also, the regeneration information may mean signaling information related to the view regeneration 2701c. The reference view information may include num_views_using_this_ref_view[i] and/or viewing_position_id[i] shown in FIG. 30 as embodiments. Also, the view regeneration information may include num_ref_views[i], view_regeneration_method_type[i], num_sparse_views[i], and picture_id[i] [j] shown in FIG. 30 as embodiments. That is, the reference view information and/or the regeneration information may include information that may be delivered by viewing_position_picture_type[i]==1, 2, or may include only some of the information.

A controller 2701d may receive and parse viewing position group information included in the decoded bitstreams. The viewing position group information may mean a group of signaling information on one or more viewing positions. The viewing position group information may include center view generation information, reference view information, regeneration information, pre-generation information and/or view synthesis recommendation information. The controller may receive information (for example, viewport information and/or information on viewing position) on the reception device according to some embodiments, which is generated by rendering/viewport generation, and may perform parsing based on the received information.

The controller 2701d may deliver center view generation information to the center view generation 2701b. The controller 2701d may deliver reference view information and/or regeneration information to the view regeneration 2701c as embodiments. The controller 2701d may deliver pre-generation information and/or view synthesis recommendation information to a view synthesis 2702 as embodiments.

The view synthesis 2702 may perform view synthesis based on the view regenerated by the view regeneration. Moreover, the view synthesis may perform view synthesis based on the center view generated by the center view generation and/or one or more unpacked reference views. The view synthesis may mean view synthesis 2504 according to FIG. 25. Also, the view synthesis may perform view synthesis based on pre-generation information and/or view synthesis recommendation information which is signaling information.

A rendering/viewport generation 2703 may generate or render a view synthesized by the view synthesis 2702 as a viewport.

In accordance with embodiments, each of the decoding 2700, the unpacking 27001a, the center view generation 2701b, the view regeneration 2701c, the view synthesis 2702 and/or the rendering/viewport generation 2703 may be performed by the video transmission device, and may be performed by the decoding module (or decoder), the unpacking module (or unpacker), the center view generator (or center view generation module), the view regeneration module (or view regenerator), the view synthesizer (or view synthesis module) and/or the rendering/viewport generator (or rendering/viewport generation module). The controller 2701d according to some embodiments may be performed by the video transmission device in accordance with some embodiments.

Therefore, a method of receiving a video in accordance with embodiments may include decoding a bitstream of the video based on viewing position and viewport information, unpacking pictures in the decoded bitstream, view regenerating the unpacked pictures and/or view synthesizing the view regenerated pictures.

In addition, example of method may further includes, generating a center view picture based on reference view pictures included in the unpacked pictures and/or center view generation information included in the decoded bitstream, wherein the view regenerating is performed based on the center view picture, the reference view pictures, sparse view pictures included in the unpacked pictures and/or reference view information.

Moreover, example of method may includes, parsing the decoded bitstream including the reference view information, the center view generation information and information for view synthesis, wherein the view synthesizing is performed based on the information for view synthesis.

In another example of the method, wherein the reference view pictures include a first picture and a second picture, wherein the center view picture is generated based on the first picture and the second picture, wherein the view regeneration generates a third picture based on the center view picture and a fourth picture included in the sparse view pictures, wherein the view synthesizing synthesizes a fifth picture based on the center view picture, the first picture and the third picture.

Receivers could generate a video with head motion parallax and/or binocular disparity, or different viewpoints, which receivers could generate interactive video with changing locations. Therefore, by saving bandwidth to deliver the 3DoF+ video or the storage space, high quality of 3DoF+ video which could provide head motion parallax could be achieved. Due to this configuration, receiver can provide different viewing experience with viewer's action in the VR environment.

Due to the center view generation 2701b according to some embodiments, the reception device according to some embodiments may efficiently generate or estimate a center view picture from reference view pictures and/or center view generation information.

Also, due to the view regeneration 2701b according to some embodiments, the reception device according to some embodiments may efficiently generate a regenerated view for a viewing position desired by a user based on signaling information including a reference view (reference view picture), a sparse view (sparse view picture), a center view (center view picture), reference view information and/or view regeneration information.

Also, the view synthesis 2702 according to some embodiments may efficiently generate an exact view for a viewing position desired by a user based on the center view generated by the center view generation, the pre-generation information and/or the view synthesis recommendation information according to some embodiments.

Also, in accordance with the aforementioned embodiments, the transmitter according to some embodiments may increase data transmission efficiency and improve decoding performance by transmitting only images required for estimation in the receiver without transmitting all images, wherein the images required for estimation are those subjected to pruning (that is, images from which redundancy is removed) according to some embodiments.

Also, the aforementioned operation increases transmission efficiency of 3DoF+ video data based on the signaling information according to some embodiments, and provides an effect that may improve decoding performance.

Figure 28:
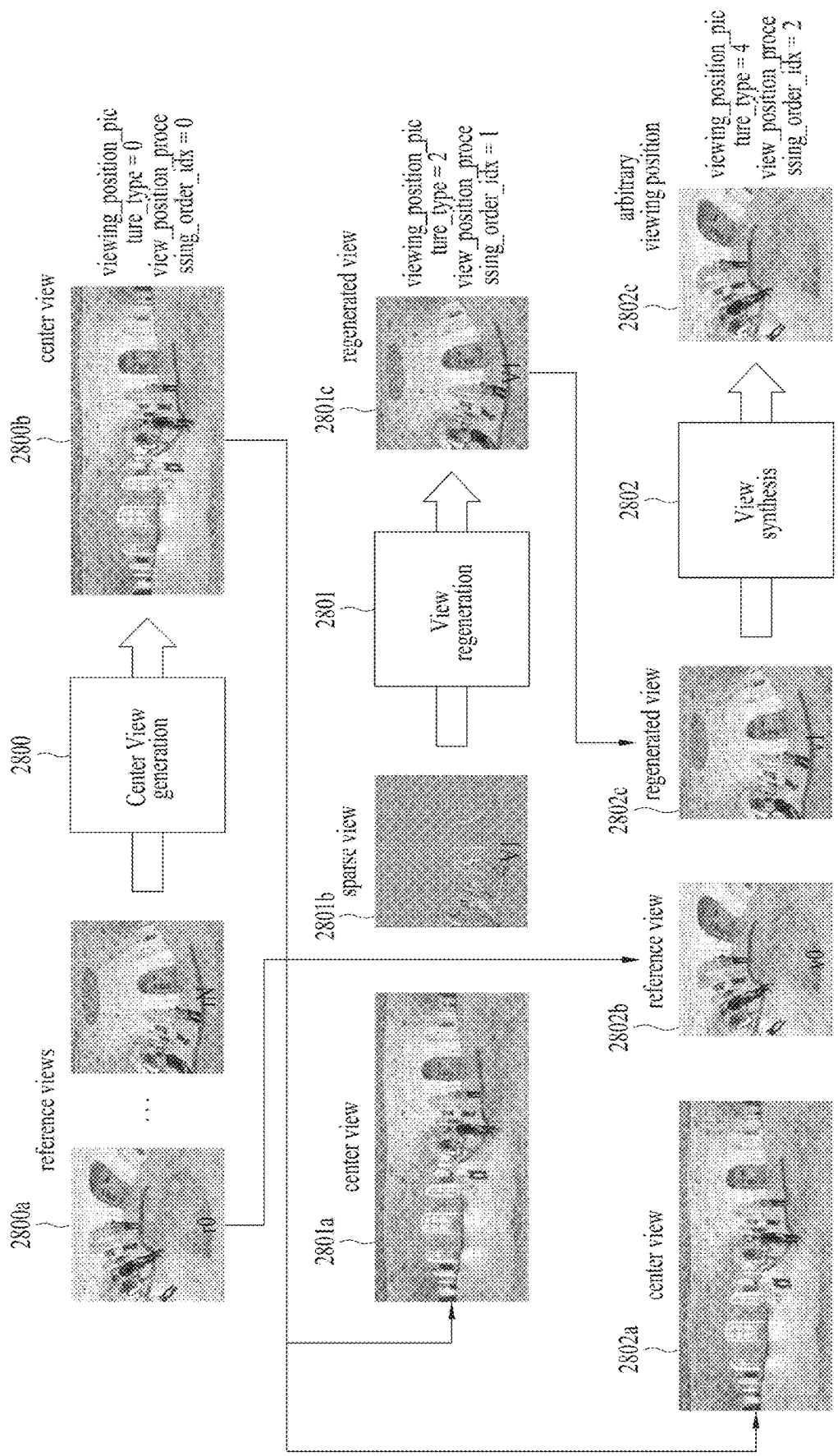
FIG. 28 shows an operation flow of a decoder end according to some embodiments.

FIG. 28 shows an operation flow of a decoder end according to some embodiments.

In FIG. 28, the relationship between the viewing positions depending on the processing order is described with the input output description of the center view generation, view regeneration and view synthesis processing units.

FIG. 28 shows an operation of decoder post-processing of the reception device according to some embodiments, specifically shows an example of relationship between viewing positions due to the processing orders.

Reference views 2800a may mean unpacked reference view pictures according to some embodiments, The reference view pictures may mean pictures that may provide basic information for one or more source view pictures (or for some or all of corresponding viewing position). The reference views are images of peripheral viewpoints used to estimate (or generate) the current viewpoint. As the reference view, the source view picture or source view image may be used, or picture or image generated by virtual viewpoint synthesis may be used. That is, the reference view of the reception device according to some embodiments may be the source view picture, or may be an intermediate view picture according to some embodiments.

The reference view according to some embodiments may exists as multiple reference views. For example, a plurality of reference views including reference views r0 to rN. That is, the reference views may mean pictures for multiple viewing positions or multiple peripheral viewpoints, and may be indicated as r0 to rN.

Center view generation 2800 may generate a center view picture 2800b based on all or some of the unpacked reference view pictures. The center view generation may mean the center view generation 2701b according to some embodiments described in FIG. 27.

The center views 2800b, 2801a, and 2802b may mean center view pictures in accordance with some embodiments. The center view picture may mean the center view picture described in FIG. 26 and/or FIG. 27. That is, the center view picture may mean the multi-spherical video or image for a center position of the multi-spherical videos or images (or corresponding picture). The center view generation according to some embodiments may generate the center view according to some embodiments from the reference view picture (or reference view pictures) if the center view is not included in the unpacked pictures. That is, if the center view is included in the input image or there is no center view, the center view may be generated by the center view generation through the virtual viewpoint generation.

The center view generation 2800 generates the pictures for peripheral viewpoints, for example, the center view which is the picture for the center viewpoint from the reference views.

In this case, whether a specific picture is the center view may be identified by related signaling information. As embodiments, a viewing_position_picture_type[i] parameter which will be described later in FIG. 30 may exist. The viewing_position_picture_type[i] may mean type information of a picture having an ith index. Therefore, if the specific picture having the ith index is the center view, viewing_position_picture_type[i] may be indicates as 0.

As embodiments, if there is a picture of which viewing_position_picture_type is 0, among the unpacked pictures in the decoder of the reception device according to some embodiments (that is, if there is the center view picture among the unpacked pictures), the center view generation of the decoder end (reception device) according to some embodiments may not be performed. However, if there is no picture of which viewing_position_picture_type is 0, among the unpacked pictures (that is, if there is no center view picture among the unpacked pictures), the center view generation according to some embodiments may be performed.

Also, signaling information related to the processing order for specific pictures may be initiated. As embodiments, there may be view_position_processing_order_idx[i] parameter which will be described later in FIG. 30. In this case, a value of view_position_processing_order_idx of a picture corresponding to the center view may be 0. That is, the center view may mean a view to be first processed from the reference views.

A sparse view 2801b may mean a sparse view picture according to some embodiments. The sparse view picture may mean a picture that includes specific information (or pixels) for one or more source view pictures (or for some or all of the corresponding viewing position). That is, the sparse view picture indicates an image (or picture) containing information which is not capable of being estimated when the current viewpoint is estimated from the peripheral viewpoints through pruning or source view pruning according to some embodiments. At this time, information (information capable of being estimated) repeated with a peripheral portion in an image of the current viewpoint may be indicated as gray/black (or single) region. At this time, information which is not capable of being estimated may be included in the sparse view picture.

View regeneration 2801 may generate a regenerated view based on the center view 2801a and/or sparse view 281b according to some embodiments. The view regeneration may mean the view regeneration according to some embodiments described in FIG. 27.

The view regeneration 2800 according to some embodiments may efficiently regenerate (estimate and predict) views by using the center view and/or the sparse view. The center view according to some embodiments is generated from the received reference views. Since the received sparse view according to some embodiments is a picture from which redundancy between views is removed (pruned) in the encoder or the transmitter, the sparse view includes data which are not capable of being estimated. The receiver according to some embodiments may efficiently estimate the views by using only the center view (center view picture) and/or the sparse view (sparse view picture).

The regenerated views 2801c and 2802c may mean the picture generated based on the center view 2801a and/or the sparse view 2801b. In this case, signaling information indicating whether a specific picture is a regenerated view or a picture for the regenerated view may be initiated. As embodiments, there may be viewing_position picture type[i] parameter which will be described later in FIG. 30. The viewing_position_picture_type[i] may mean type information having a picture having an ith index. Therefore, if the specific picture having the ith index is the regenerated view, the viewing_position_picture_type[i] may be indicated as 2. Also, a value of view_position_processing_order_idx of a picture corresponding to the regenerated view may be 1. That is, the view regeneration 2801 may mean an operation to be performed after the aforementioned view generation.

In this case, v0 and v1 may mean view 0 and view 1, respectively, or may mean viewpoints adjacent to each other. In FIG. 28, the sparse view 2801b may mean the sparse view according to some embodiments, and indicates a view regeneration process of generating a view at a final position v1 by using the sparse view v1 (position) delivered after v1 is estimated through the center view 2801b. Also, when viewpoint synthesis is performed in FIG. 28, an arbitrary viewpoint may be generated using the center view, the reference view (image delivered for position v0 is used), and the regenerated view (image reconstructed through the sparse view for position v1) as examples of three positions of a center (that is, position for center view), v0 and v1.

In other words, v0 may mean a first viewpoint, and v1 may mean a second viewpoint. That is, view regeneration may generate a regenerated view for the first viewpoint corresponding to v0 by using the center view 2801a according to some embodiments. In order to generate the regenerated view, the sparse view for the first viewpoint corresponding to the center view and v0 may be used. In detail, view regeneration may generate a view (picture) at a final position v1 by using the sparse view (position v1) delivered after v1 is estimated through the center view.

One or more reference views 2802b to be used for view synthesis may mean all or some pictures of the aforementioned reference views 2800a.

The view synthesis 2802 may generate a view 2802c synthesized based on one or more reference views 2802b to be used for view synthesis and/or the regenerated view 2802c according to some embodiments. The synthesized view may mean an arbitrary viewing position. The arbitrary viewing position may be referred to as a target viewing position. The view synthesis may mean the view synthesis 2702 described in FIG. 27 as embodiments.

The arbitrary viewing positions 2801c and 2802c may mean views for an arbitray viewing position synthesized based on the aforementioned center view 2802a, one or more reference views 2802b to be used for view synthesis, and/or the regenerated view 2802c according to some embodiments, that is, the synthesized view according to some embodiments. In this case, signaling information indicating that a specific picture is the synthesized view 2802c or a picture for the synthesized view may be initiated. As embodiments, there may be viewing position picture type[i] parameter which will be described later in FIG. 30. The viewing position picture type[i] may mean type information having a picture having an ith index. Therefore, if the specific picture having the ith index is the synthesized view, the viewing position picture type[i] may be indicated as 4. Also, a value of view position processing order idx of a picture corresponding to the synthesized view may be 2. That is, the view synthesis 2802 may mean an operation to be performed after the aforementioned view regeneration.

In detail, the view synthesis 2802 may use the center view 2802a, a reference view (for example, reference view for a first viewpoint of v0) at a viewpoint related to a corresponding arbitray viewpoint and/or a regenerated view (for example, regenerated view for a second viewpoint in FIG. 28) at a viewpoint related to the corresponding arbitray viewpoint to generate a picture for the arbitray viewpoint. That is, when the view synthesis 2802 performs view synthesis, the view synthesis 2802 may use three positions of a center view picture (picture for center), a picture (for example, reference view for v0) related to the viewpoint of v0, and a picture (for example, regenerated view for v1) related to the viewpoint of v1. That is, as shown in FIG. 28, the view synthesis 2802 may generate an arbitrary viewpoint by using the center view, the reference view (as embodiment, image delivered for position of v0 is used), and the regenerated view (as embodiment, regenerated picture reconstructed through sparse view for position of v1).

The decoder according to some embodiments may perform view synthesis to provide higher accuracy. For example, the decoder may perform synthesis for views for the final viewing position by using the center view generated from the reference views for multiple viewing positions, the view (e.g., v1) estimated from the sparse view (e.g., v1) for the first viewing position (or viewpoint) and/or the center view, and the reference view (e.g., v0) for the second viewpoint.

Therefore, a method of receiving a video in accordance with embodiments may include decoding a bitstream of the video based on viewing position and viewport information, unpacking pictures in the decoded bitstream, view regenerating the unpacked pictures and/or view synthesizing the view regenerated pictures.

In addition, example of may further includes, generating a center view picture based on reference view pictures included in the unpacked pictures and/or center view generation information included in the decoded bitstream, wherein the view regenerating is performed based on the center view picture, the reference view pictures, sparse view pictures included in the unpacked pictures and/or reference view information.

Moreover, example of method may includes, parsing the decoded bitstream including the reference view information, the center view generation information and information for view synthesis, wherein the view synthesizing is performed based on the information for view synthesis.

In another example of the method, wherein the reference view pictures include a first picture and a second picture, wherein the center view picture is generated based on the first picture and the second picture, wherein the view regeneration generates a third picture based on the center view picture and a fourth picture included in the sparse view pictures, wherein the view synthesizing synthesizes a fifth picture based on the center view picture, the first picture and the third picture.

Receivers could generate a video with head motion parallax and/or binocular disparity, or different viewpoints, which receivers could generate interactive video with changing locations. Therefore, by saving bandwidth to deliver the 3DoF+ video or the storage space, high quality of 3DoF+ video which could provide head motion parallax could be achieved. Due to this configuration, receiver can provide different viewing experience with viewer's action in the VR environment.

Due to the center view generation 2701b according to some embodiments, the reception device according to some embodiments may efficiently generate or estimate from the reference view pictures and/or the center view generation information.

Also, due to the view regeneration 2701b according to some embodiments, the reception device according to some embodiments, the reception device according to some embodiments may efficiently generate a regenerated view for a viewing position desired by a user based on signaling information including a reference view (reference view picture), a sparse view (sparse view picture), a center view (center view picture), reference view information and/or view regeneration information.

Also, the view synthesis 2702 according to some embodiments may efficiently generate an exact view for a viewing position desired by a user based on the center view generated by the center view generation, the pre-generation information and/or the view synthesis recommendation information according to some embodiments.

The aforementioned operation increases transmission efficiency of 3DoF+ video data based on the signaling information according to some embodiments, and provides an effect that improves decoding performance.

Figure 29:
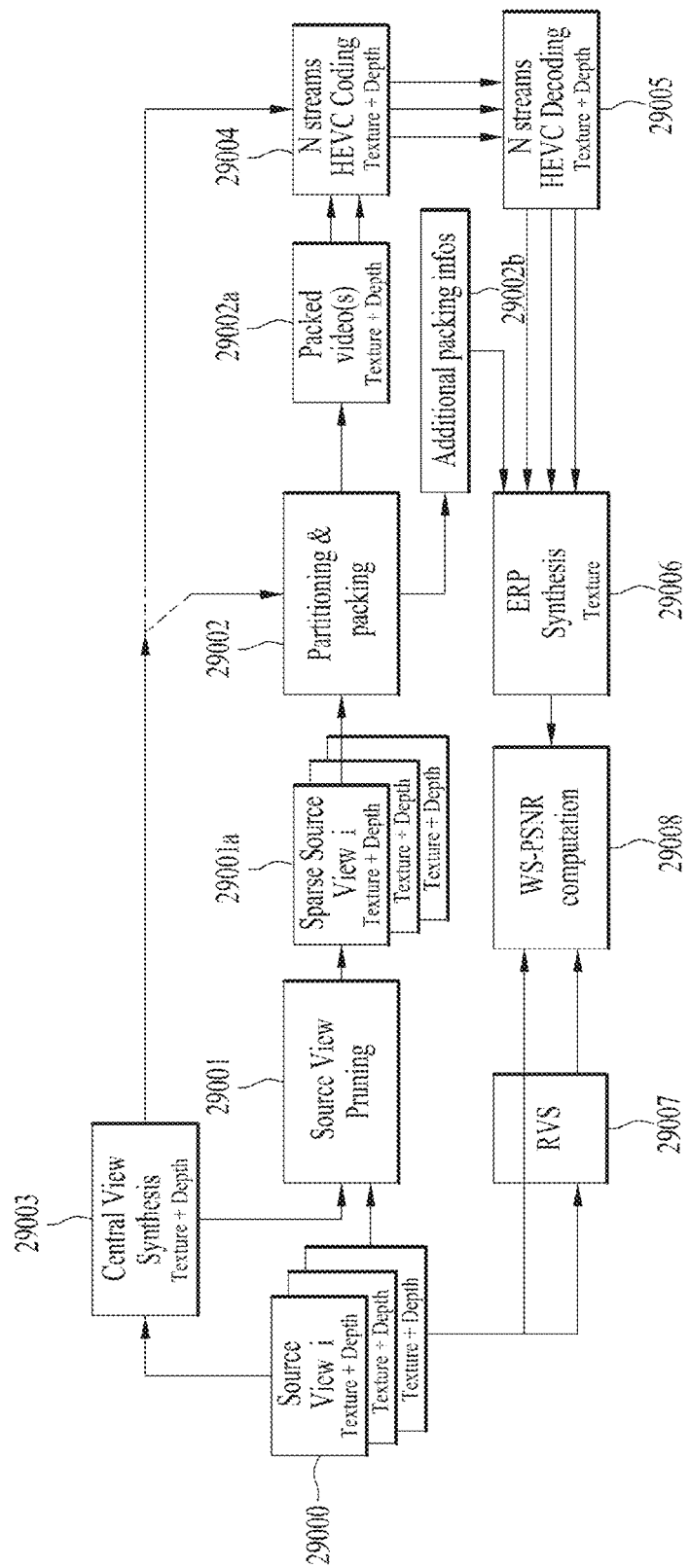
FIG. 29 is a block diagram showing 3DoF+ SW platform according to some embodiments.

FIG. 29 is a block diagram showing 3DoF+ SW platform according to some embodiments.

This drawing illustrates one embodiment of a platform implemented hardware combined with software or software, which can implement 3DoF+ system according to some embodiments.

Central View Synthesis module

This module will generate a plain and full ERP (texture+depth) view in charge of conveying most of the visual information. The parameters of this module will be at minimum:
  Resolution of the related stream
  Exact position of the central view
  Source View Pruning module This module will make use of the depth buffer output by the Central View Synthesis module, and discard any pixel already projected. The parameters of this module will be at minimum:
  Resolution of the related stream
  QP for the texture and QP for the depth
  Partitioning & packing module When activated, this module browses the totality of the sparse source views, and implements the following
  partitions each sparse source views
  discards empty partitions
  packs them in a patch atlas on one or more streams
  generates additional informations accordingly
  View synthesis module This module generates the final viewport just as RVS does, but accepts as input a heterogeneous set of texture+depth videos complemented with the previously generated additional informations. It then synthesizes the view in ERP or perspective mode.

In other words, source view i 29000 means i number of source views, and may be input images for the ith position (or viewing position). Each source view may include a texture picture and/or depth picture corresponding thereto.

A Source View Pruning module 29001 may perform the aforementioned inter-view redundancy removal operation according to the aforementioned embodiments based on at least one source view 29000 and a synthesized center view 29003. A spare source view I 29001a may mean a source view for which redundancy removal from the source view pruning module is performed. The sparse source view i may correspond to the sparse views according to some embodiments.

A Partitioning & Packing module 29002 may perform packing according to the embodiments of the present disclosure for at least one sparse source view 29001a and/or a synthesized center view 29003. Packed pictures may mean pictures packed by the partitioning & packing module (29002a). The packed pictures may include a texture picture for which packing is performed and/or a depth picture for which packing is performed. Additional packing information may mean signaling information generated from the partitioning & packing module. The signaling information may be included as some or all of the aforementioned reconstruction parameters, the view synthesis parameters and the packing metadata.

A Central View Synthesis module 29003 or a center view synthesis module may perform center view regeneration or intermediate view synthesis. In this case, intermediate view synthesis may mean the intermediate view synthesis operation described in FIG. 26. That is, the center view may be generated using at least one source view 29000. The center view may include a texture picture and/or depth picture corresponding thereto.

The central view synthesis module 29003 may perform center view generation according to the aforementioned description as embodiments, and may mean a center view generator as embodiments.

N streams HEVC Coding/Decoding modules 29004 and 29005 may encode the synthesized center view 29003 and/or the packed pictures, and may decode the encoded pictures. The center view may include a texture picture and/or depth picture corresponding thereto.

An ERP Synthesis module 29006 may perform view synthesis according to the embodiments of the present disclosure for the decoded texture pictures, or may perform view regeneration and view synthesis. ERP synthesis may be performed based on the additional packing information.

RVS means a reference view synthesizer 29007. The RVS may synthesize views by using at least one source view. The RVS may perform a view synthesis operation according to the embodiments of the present disclosure.

WS-PSNR computation module 28008 may be a module for numerical comparison.

The WS-PSNR computation module may mean a processor for performing numerical computation by using the views synthesized by at least one source view, the views synthesized by the RVS and/or the views synthesized from the ERP synthesis module.

FIG. 30 shows a viewing position group information SEI message syntax according to some embodiments.

In other words, viewing position group information SEI message syntax according to some embodiments described in FIG. 30 indicates an embodiment of a syntax of signaling information on operations of the video transmission method according to some embodiments and the video reception method according to some embodiments. That is, the video transmission method according to some embodiments and the video reception method (or device) according to some embodiments may transmit or receive all or some of signaling information and parameters in the viewing position group information SEI message syntax according to some embodiments, which is shown in FIG. 30.

The viewing position group information SEI message syntax or some of the viewing position group information SEI message syntax may be included in bitstreams encoded by the encoder according to some embodiments in the transmitter, or may mean information transmitted from the other block or module except the encoder according to some embodiments. On the contrary, the viewing position group information SEI message syntax or some parameters or groups of the parameters included in the viewing position group information SEI message syntax may be included in bitstreams received by the receiver, or may be received through a separate path.

In detail, signaling information and parameters in the viewing position group information SEI message syntax shown in FIG. 30 may be transmitted by being encoded by the encoder according to some embodiments of the encoder (transmitter), or some of the signaling information and parameters may be transmitted by being encoded by the encoder.

Therefore, the viewing position group information SEI message syntax according to some embodiments may include all or some of the signaling information described in FIGS. 25 to 28. For example, the packing metadata and reconstruction parameters according to the embodiments in FIG. 24 may be included in some of the viewing position group information SEI message syntax. On the contrary, the viewing position group information SEI message syntax may include only some of the packing metadata and reconstruction parameters.

Likewise, the center view generation information, the reference view information, the regeneration information, the pre-generation information and/or the view synthesis recommendation information may be included in some of the viewing position group information SEI message syntax. On the contrary, the viewing position group information SEI message syntax may include only some of the aforementioned related signaling information. Likewise, the signaling information according to the embodiments in FIG. 27 may be included in some of the viewing position group information SEI message syntax, or vice versa.

Hereinafter, as an embodiment of the signaling information according to some embodiments, the viewing position group information SEI message syntax will be described.

The Viewing position group information SEI message provides information of the a viewing position group and the relationship between them in the 3D virtual space and post-decoding process (e.g., regeneration process to restore pictures of intended viewing positions) corresponding to a viewpoint (or center/anchor viewing position).

viewing_position_group_info_id contains an identifying number that may be used to identify the purpose of the viewing position group information. The value of viewing_position_group_info_id may be used to indicate the different use cases of this SEI message, to support different receiver capabilities, or to indicate different level of information contained in the SEI message, different viewpoint, or different group of viewpoints, etc.

When more than one viewing position information SEI message is present with the same value of viewing_posidion_group_info_id, the content of these viewing position group information SEI messages shall be the same. When viewing position group information SEI messages are present that have more than one value of viewing_position_group_info_id, this may indicate that the information indicated by the different values of viewing_posidion_group_info_id are alternatives that are provided for different purposes or that a cascading of correction to be applied in a sequential order (an order might be specified depending on the application). The value of viewing_posidion_group_info_id shall be in the range of 0 to $2^{12}-1$, inclusive.

viewing position group info cancel flag equal to 1 indicates that the viewing position group information SEI message cancels the persistence of any previous viewing position group information SEI message in output order that applies to the current layer. viewing_position_group_info_cancel_flag equal to 0 indicates that viewingposition group information follows.

viewing_position_group_info_persistence flag specifies the persistence of the viewing position group information SEI message for the current layer.

viewing_position_group_info_persistence_flag equal to 0 specifies that the viewing position group information applies to the current decoded picture only.

Let picA be the current picture. viewing_position_group_info_persistence_flag to 1 specifies that the viewing position group information SEI message persists for the current layer in output order until any of the following conditions are true:

A new CLVS of the current layer begins.

The bitstream ends.

A picture picB in the current layer in an access unit containing a viewing position group information SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for the picture order count of picB.

viewpoint_id specifies the identifier that indicates the viewpoint of the viewing position group that is described in this SEI message. The viewpoint_id might be defined in the other SEI message to describe the overall viewpoints that consists the overall VR/AR environment or subset of viewpoints those are related to each other with spatially or conceptually adjacent so that user could switch from one position to the other positions. In other words, the viewpoint_id may indicate where the corresponding viewpoint is located under the assumption that there is a viewpoint map.

The viewpoint could be one of the viewing positions, such as center viewing position or anchor viewing position, which could represent the viewing position group.

The details of viewpoint could be described by XYZ position, viewing orientation (yaw, pitch, and roll), and horizontal and vertical coverage described in view_point_descriptor( ) In this case, the viewing_position_id could indicate one of the viewing position defined in this SEI message.

view_point_descriptor means information or descriptor indicating a position of a viewpoint, an application range of a viewing position (that is, information on whole coverage), and information (that is, information on whole rotation) on a viewing orientation. The view_point_descriptor may include viewing_position_id, viewing_position_x, viewing_position_y, viewing_position_z, viewing_position_yaw, viewing_position_pitch, viewing_position_roll, coverage_horizontal and/or coverage_vertical, which will be described later. In this case, out_of_center_ref_view_present_flag could signal the numbers if needed.

center_view_present_flag equal to 1 indicate that the video corresponding to the center (or anchor or representative) viewing position is present in the group of videos for this viewpoint corresponding to viewpoint_id. center_view_present_flag equal to 0 indicate that the video the corresponding to the center (or anchor or representative) viewing position is not present in the group of videos for this viewpoint corresponding to viewpoint_id.

center_view_present_flag might be set equal to 1 when at least one viewing position whose viewing_position_picture_type[i] equal to 0 is present in the current SEI message.

out_of_center_ref_view_present_flag equal to 1 indicate that the video that are not corresponding to the center (or anchor or representative) viewing position is present in the group of videos for this viewpoint corresponding to viewpoint_id. out_of_center_ref_view_present_flag equal to 0 indicate that the video that are not corresponding to the center (or anchor or representative) viewing position is not present in the group of videos for this viewpoint corresponding to viewpoint_id. Or this could signal the numbers if needed.

out_of_center_ref_view_present_flag might be set equal to 1 when at least one viewing position whose viewing_position_picture_type[i] equal to 1 is present in the current SEI message.

source_view_with_regeneration_present_flag equal to 1 indicate that viewing position that needs additional processing(s) to reconstruct a intended picture is included in the set of viewing positions of a viewpoint that corresponding to the current viewpoint_id. source_view_with_regeneration_present_flag equal to 0 indicate that viewing position that needs additional processing(s) to reconstruct a intended picture is not included in the set of viewing positions of a viewpoint that corresponding to the current viewpoint_id.

source_view_with_regeneration_present_flag might be set equal to 1 when at least one viewing position whose viewing_position_picture_type[i] equal to 2 is present in the current SEI message.

pregenerated_view_present_flag equal to 1 indicate that viewing position that are not originally captured but generated before encoding is present in the set of viewing positions of a viewpoint that corresponding to the current viewpoint_id. pre-generated_view_present_flag equal to 0 indicate that viewing position that are not originally captured but generated before encoding is not present in the set of viewing positions of a viewpoint that corresponding to the current viewpoint_id.

pregenerated_view_present_flag might be set equal to 1 when at least one viewing position whose viewing_position_picture_type[i] equal to 3 is present in the current SEI message.

analyzed_view_synthesis_info_present_flag equal to 1 indicate that viewing position that additional information that could be used in the view synthesis of a intermediate view or determine the process of the intermediate view generation is present in the set of viewing positions of a viewpoint that corresponding to the current viewpoint_id. analyzed_view_synthesis_info_present_flag equal to 0 indicate that viewing position that additional information that could be used in the view synthesis of a intermediate view or determine the process of the intermediate view generation is not present in the set of viewing positions of a viewpoint that corresponding to the current viewpoint_id.

analyzed_view_synthesis_info_present_flag might be set equal to 1 when at least one viewing position whose viewing_position_picture_type[i] equal to 4 is present in the current SEI message.

dynamic_interview_reference_flag equal to 1 specifies that the reference pictures of the reconstruct/regenerate process of a viewing position could vary when time changes. dynamic_interview_reference_flag equal to 0 indicate that the reference pictures of the reconstruct/regenerate process of a viewing position does not vary when time changes so the reference picture relationship could be utilized in whole video sequences.

Hereinafter, the signaling information that may be included in the center view generation information according to some embodiments will be described. The center view generation information according to some embodiments may include alternative_viewing_position_id, alternative_view_distance, rec_center_view_generation_method_type[i], viewing_position_id[i], center_view_generation_parameter[i], num_pictures_for_center_view_generation, rec_center_view_generation_method_type[i], etc. The presence of all or some of the signaling information included in the center view generation information may be identified by the center_view_present_flag.

alternative_viewing_position_id specifies the viewing position that could be used alternative to the center/anchor reference viewing position. The value of alternative_viewing_position_id shall be one of the viewing position indicated by viewing_position_id in this SEI message or related SEI message.

alternative_view_distance specifies the distance of the alternative viewing position corresponding to the alternative_viewing_position_id, in the units of $2^{-16}$ millimeters.

rec_center_view_generation_method_type specifies the method to generate the center view when center view is not present in this SEI message. rec_center_view_generation_method_type equal to 0 represent the view synthesis method that uses given viewing positions by viewing_position_id with different weights given by center_view_generation_parameter. rec_center_view_generation_method_type equal to 1 could represent image stitching method with given viewing positions by viewing_position_id with different weights given by center_view_generation_parameter.

viewing_position_id indicates the viewing position that is used for the center view position. The value of viewing_position_id shall be one of the viewing position indicated by viewing_position_id in this SEI message or related SEI message.

center_view_generation_parameter specifies the viewing position dependent parameter that is recommended to be used in the center view generation methods indicated by rec_center_view_generation_method_type.

rec_center_view_generation_method_type, viewing_position_id, and center_view_generation_parameter are used to indicate the recommended method of center view generation. Otherwise, rec_center_view_generation_method_type, viewing_position_id, and center_view_generation_parameter could be used to indicate the method and its corresponding parameters that were used to generate the center view picture in the pre-processing before encoding. In this case, a new flag to indicate the presence of this information could be defined and used instead of center_view_present_flag not present flag.

The num_pictures_for_center_view_generation may indicate information on the number of pictures required when the center view generation is performed.

Hereinafter, signaling information on one or more viewing positions according to some embodiments will be described. The signaling information on one or more viewing positions may include num viewing position, view_position_depth_present_flag, view_position_texture_present_flag, view_position_processing_order_idx, viewing_position_picture_type, etc.

num_viewing_position specifies the total number of viewing positions that are related to the viewpoint or center viewing position that is indicated by viewoint_id.

view_position_depth_present_flag and view_position_texture_present_flag equal to 1 specify the depth or texture is present for the i-th viewing position, respectively. If there is other component, such as alpha channel to indicate the opacity of the pixel values at each pixel position or other layers such as overlay, logos, they could be indicated by defining flags corresponding to component.

view_position_processing_order_idx specify the processing order of the multiple viewing positions. The lower the number is, the faster the processing order. If two different viewing positions have same view_position_processing_order_idx, there is no preference in processing order.

The example use case of the view_position_processing_order_idx is the center viewing position or mostly referenced viewing position in view regeneration process. As the reference pictures are used to restore the other pictures in the view regeneration process, the reference pictures could be assigned with lower view_position_processing_order_idx compared to the non-referenced pictures. When the reference relationship is happened between non-referenced pictures or reference pictures, they could be indicated with different view_position_processing_order_idx according to the processing order.

viewing_position_picture_type specifies the picture type of the i-th viewing position in terms of picture generation. In other words, this may mean processing type of picture of i(i-th viewing position).

When viewing_position_picture_type equal to 0, the i-th viewing position is a center view.

When viewing_position_picture_type equal to 1, the picture of the i-th viewing position is used as a reference picture in the view regeneration process.

When viewing_position_picture_type equal to 2, the picture of the i-th viewing position will be generated from the view regeneration process.

When viewing_position_picture_type equal to 3, the picture of the i-th viewing position is pre-generated view in the encoding pre-process.

When viewing_position_picture_type equal to 4, the picture of the i-th viewing position might not be present in the decoded pictures but a view synthesis method is recommended with additional information. This could be used to reduce the time consumption process with regard to view synthesis.

When viewing_position_picture_type equal to 5, the picture of the i-th viewing position might not be present in the decoded pictures but alternative picture from other viewing position is present.

Hereinafter, signaling information that may be included in the reference view information according to some embodiments will be described. The reference view information according to some embodiments may include num_views_using_this_ref_view, num_ref_views, etc. The reference view information may be information delivered by viewing_position_picture_type[i]==1. In this case, the viewing position id is viewing positions that use this reference view.

num_views_using_this_ref_view specifies the number of viewing positions that uses the picture of the i-th viewing position as the reference view in the regeneration process. The viewing positions that uses this reference view are indicated by viewing_position_id.

num_ref_views specifies the number of reference views that are used for the regeneration of the picture corresponding to the i-th viewing position. The reference viewing positions are indicated by the viewing position id.

Hereinafter, signaling information that may be included in the view regeneration information according to some embodiments will be described. The view regeneration information according to some embodiments may include the num_ref_views, and the viewing_position_id. Also, the view regeneration information according to some embodiments may include view_regeneration_method_type, num_sparse_views, picture_id, etc. The reference view information may be information delivered by viewing_position_picture_type[i]==2. In this case, the viewing_position_id may mean reference viewing positions for view regeneration.

view_regeneration_method_type specifies the type of view regeneration method that is used to restore the picture of the i-th viewing position. When view_regeneration_method_type equal to 0, view synthesis based prediction method is used. When view_regeneration_method_type equal to 1, block disparity prediction method is used.

num_sparse_views specifies the number of sparse views used to regenerate the picture corresponding to the i-th viewing position.

picture_id specifiest the identifier which contains the j-th sparse view that is used to reconstruct the picture corresponding to the i-th viewing position.

Hereinafter, signaling information that may be included in the pre-generation information according to some embodiments will be described. The pre-generation information according to some embodiments may include the num_ref_views, and the viewing_position_id. Also, the pre-generation information according to some embodiments may include pregeneration_method_type, view_regeneration_method_type, picture_id, and num_sparse_views. The reference view information may be information delivered by viewing_position_picture type[i]==3. In this case, the viewing_position_id may mean reference viewing positions for view regeneration.

pregeneration_method_type specifies the view generation method that is used to generate the picture corresponding to the i-th viewing position. When pre-generation_method_type equal to 0, the reference view synthesis algorithm is used. when pregeneration_method_type equal to 1, the view generation algorithm A is used.

The view_regeneration_method_type may mean signaling information related to the method for performing view regeneration according to some embodiments.

Hereinafter, signaling information that may be included in the view synthesis recommendation information according to some embodiments will be described. The view synthesis recommendation information according to some embodiments may include ref_view_synthesis_method_type, and ing_position_id. Also, the view synthesis recommendation information according to some embodiments may further include sparse_view_present_flag and/or num_ref_views. The view synthesis recommendation information may be information delivered by viewing_position_picture_ type[i]==4. In this case, the viewing position id may mean reference viewing positions for view synthesis.

ref_view_synthesis_method_type specifies the view synthesis method that is recommended to generate the picture corresponding to the i-th viewing position. When ref_view_synthesis_method_type equal to 0, the reference view synthesis algorithm is recommended. when ref_view_synthesis_method_type equal to 1, the view synthesis algorithm A is recommended.

alternative_view_position_id specifies the identifier that is recommended to be used as an alternative viewing position of the i-th viewing position.

sparse_view_present_flag is signaling information indicating whether the sparse view (or sparse view picture) according to some embodiments exists.

Hereinafter, signaling information included in the aforementioned view_point_descriptor and view_point_descriptor will be described in detail.

view_point_descriptor means information or descriptor indicating a position of a viewpoint, an application range of a viewing position (that is, information on whole coverage), and information (that is, information on whole rotation) on a viewing orientation. The view_point_descriptor may include viewing_position_id, viewing_position_x, viewing_position_y, viewing_position_z, viewing_position_yaw, viewing_position_pitch, viewing_position_roll, coverage_horizontal_z, viewing_position_yaw, viewing_position_pitch, viewing_position_roll, coverage_horizontal and/or coverage_vertical, which will be described later.

viewing_position_id indicate the identifier of a viewing position that is described by the viewing position, orientation and coverage, specified by viewing_position_x, viewing_position_y, and viewing_position_z, viewing_orientation_yaw, viewing_orientation_pitch, and viewing_orientation_roll, and coverage_horizontal and coverage_vertical, respectively. The parameters or features which describe the viewing position could be added to differentiate different viewing positions.

viewing_position_x, viewing_position_y, and viewing_position_z indicate the (x,y,z) location of viewing position corresponding to the decoded picture in the units of $2^{-16}$ millimeters, respectively. The range of viewing_position_x, viewing_position_y and viewing_position_z shall be in the range of $-32768*2^{16}-1$ (i.e., −2147483647) to $32768*2^{16}$ (i.e., 2147483648), inclusive.

The value of viewing position x, viewing position y and viewing position z could be represented by absolute position in the XYZ coordinate or relative position corresponding to the anchor location.

viewing orientation yaw, viewing orientation pitch, and viewing orientation roll indicate the yaw, pitch, and roll orientation angles in units of $2^{-16}$ degrees, respectively. The value of viewing orientation yaw shall be in the range of $-180*2^{16}$ (i.e., −11796480) to $180*2^{16}-1$ (i.e., 11796479), inclusive, the value of viewing orientation pitch shall be in the range of $-90*2^{16}$ (i.e., −5898240) to $90*2^{16}$ (i.e., 5898240), inclusive, and the value of viewing orientation roll shall be in the range of $-180*2^{16}$ (i.e., −11796480) to $180*2^{16}-1$ (i.e., 11796479), inclusive.

Depending on the applications, viewing orientation yaw, viewing orientation pitch, and viewing orientation roll could be used to indicate azimuth, elevation, and tilt, respectively. Also, viewing orientation yaw, viewing orientation pitch, and viewing orientation roll could represent the rotation that is applied to the unit sphere of head position corresponding to the decoded picture to convert the local coordinate axes to the global coordinate axes, respectively.

coverage horizontal and coverage vertical specifies the horizontal and vertical ranges of the coverage of the viewing position corresponding to the decoded picture, in units of $2^{-16}$ degrees, respectively.

Therefore, a method of receiving a video in accordance with embodiments may include decoding a bitstream of the video based on viewing position and viewport information, unpacking pictures in the decoded bitstream, view regenerating the unpacked pictures and/or view synthesizing the view regenerated pictures.

In addition, example of may further includes, generating a center view picture based on reference view pictures included in the unpacked pictures and/or center view generation information included in the decoded bitstream, wherein the view regenerating is performed based on the center view picture, the reference view pictures, sparse view pictures included in the unpacked pictures and/or reference view information.

Moreover, example of method may includes, parsing the decoded bitstream including the reference view information, the center view generation information and information for view synthesis, wherein the view synthesizing is performed based on the information for view synthesis.

In another example of the method, wherein the reference view pictures include a first picture and a second picture, wherein the center view picture is generated based on the first picture and the second picture, wherein the view regeneration generates a third picture based on the center view picture and a fourth picture included in the sparse view pictures, wherein the view synthesizing synthesizes a fifth picture based on the center view picture, the first picture and the third picture.

The Viewing position group information SEI message provides information of the a viewing position group and the relationship between them in the 3D virtual space and post-decoding process (e.g., regeneration process to restore pictures of intended viewing positions) corresponding to a viewpoint (or center/anchor viewing position).

In the usage of the view regeneration information SEI message, the bit efficiency of the encoded 3DoF+ video is anticipated to be increased since the redundancy between multiple pictures are removed by using the spatial relationship of adjacent viewing position. By saving bandwidth to deliver the 3DoF+ video or the storage space, high quality of 3DoF+ video which could provide head motion parallax could be achieved. Also, receiver can provide different viewing experience with viewer's action in the VR environment.

Figure 31:
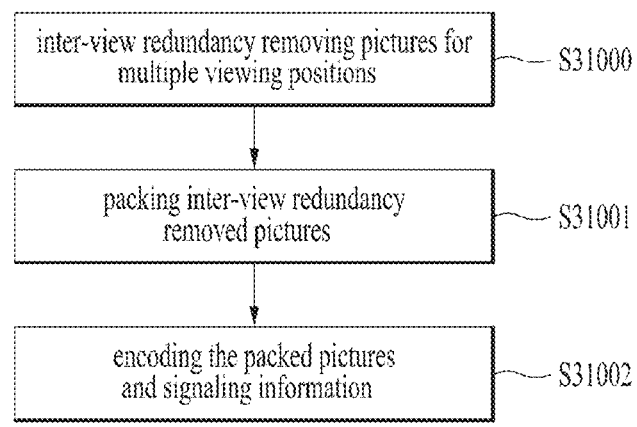
FIG. 31 is a flow chart showing a method for transmitting a video according to some embodiments.

FIG. 31 is a flow chart showing a method for transmitting a video according to some embodiments.

The method for transmitting pictures according to the embodiments of the present disclosure may perform inter-view redundancy removal 53300 according to the embodiments of the present disclosure for pictures for multiple viewing positions. At this time, the aforementioned reconstruction parameters may be generated. Also, the pictures may mean one of at least one texture picture, depth picture, texture patch and texture residual. Inter-view redundancy removal may be referred to as pruning as embodiments, and the step of performing inter-view redundancy removal may mean the step of performing pruning according to the aforementioned embodiments.

In this case, the method for transmitting pictures according to some embodiments may further include the step of generating the center view picture. Also, the step of generating the center view picture may further generate center view generation information.

In this case, the method for transmitting pictures according to some embodiments may further include the step of synthesizing intermediate view pictures. The step of synthesizing intermediate view pictures may generate intermediate view pictures, and may further include pre-generation information and/or view synthesis recommendation information according to the embodiments described in FIGS. 26, 27 and 30 as related signaling information.

The method for transmitting pictures according to the embodiments of the present disclosure may perform packing 53301 according to the embodiments of the present disclosure for the pictures for which inter-view redundancy removal is performed. At this time, the aforementioned packing parameters may be generated. Also, inter-view redundancy removal 53300 and/or packing 53301 according to the embodiments of the present disclosure may mean the aforementioned pre-encoding, pre-processing, or encoder pre-processing. The packing step may pack the aforementioned center view picture, one or more sparse view pictures and/or one or more reference view pictures. As embodiments, the packing step may mean packing according to FIG. 26.

The method for transmitting pictures according to the embodiments of the present disclosure may perform encoding 53302 for the packed pictures. Encoding according to the embodiments of the present disclosure may encode the packed pictures and/or metadata. Encoding according to the embodiments of the present disclosure may encode the packed pictures and/or the metadata. Encoding may be performed by a single layer video encoder or its corresponding device such as HEVC or future video codec.

Therefore, a method of transmitting a video in accordance with embodiments may include inter-view redundancy removing pictures for multiple viewing positions, interview redundancy removing pictures for multiple viewing positions and encoding the packed pictures and signaling information including center view generation information, pre-generation information, view synthesis recommendation information and reference view information.

Figure 32:
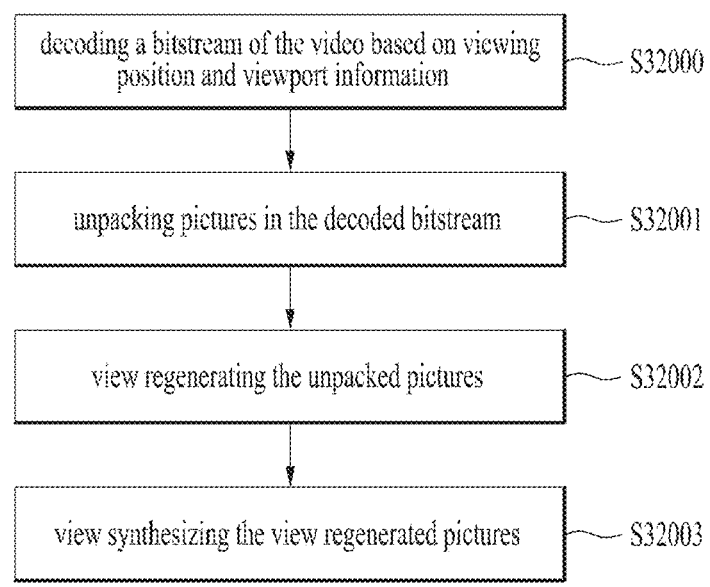
FIG. 32 is a flow chart showing a method for receiving a video according to some embodiments.

FIG. 32 is a flow chart showing a method for receiving a video according to some embodiments of present disclosure.

The video reception method according to some embodiments may perform decoding (S3200) for the bitstreams. Decoding according to some embodiments may be performed based on viewing position information and/or viewport information. Decoding according to some embodiments may output at least one picture by decoding the bitstreams. Decoding according to some embodiments outputs one or more of the packing metadata, the reconstruction parameters and the view synthesis parameters by decoding the bitstreams. In this case, the reconstruction parameters may include all or some of the signaling information corresponding to the reference view information according to some embodiments and/or all or some of the signaling information corresponding to the regeneration information according to some embodiments. Also, the view synthesis parameters may include all or some of the pre-generation information and/or the view synthesis recommendation information. Decoding according to some embodiments may be performed by the decoder. The decoder according to some embodiments may perform the decoding operation according to the aforementioned embodiments.

The video reception method according to some embodiments may perform unpacking (S3201) for the pictures in the decoded bitstreams. Unpacking according to some embodiments may be performed based on the packing metadata. At this time, the unpacked pictures may include one or more of a texture picture, a depth picture, a texture patch and a texture residual. Unpacking according to some embodiments may mean unpacking of post-processing or unpacking of post-decoding according to some embodiments. Unpacking according to some embodiments may be performed by an unpacker or an unpacking module. The unpacker according to some embodiments may perform the unpacking operation according to the some embodiments.

The method for receiving bitstreams according to some embodiments may perform view regeneration (S3202) based on the unpacked pictures. View regeneration according to some embodiments may mean view regeneration of post-processing or post-decoding according to some embodiments, or may mean texture depth regeneration.

The video reception method according to some embodiments may perform view synthesis (S3203) for the pictures for which view regeneration according to the embodiments is performed. View synthesis according to the embodiments may be performed based on the view synthesis parameters.

Therefore, a method of receiving a video in accordance with embodiments may include decoding a bitstream of the video based on viewing position and viewport information unpacking pictures in the decoded bitstream, view regenerating the unpacked pictures and/or view synthesizing the view regenerated pictures.

In this document, the term "I" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

The apparatus for transmitting a video, the apparatus for receiving a video according to some embodiments and/or internal modules/blocks thereof may perform the above-described embodiments.

A description will be given of the apparatus and/or the method according to some embodiments.

The internal blocks/modules, etc. of the apparatus and/or the method described above may correspond to processors that execute continuous operations stored in a memory, or hardware elements positioned inside/outside the apparatuses according to a given embodiment, software, firmware or a combination of thereof.

It will also be understood that, although the terms first, second, etc. are, in some instances, used herein to describe various elements, these elements should not be limited by these terms. These terms are only used to distinguish one element from another. For example, a first user input signal could be termed a second user input signal, and, similarly, a second user input signal could be termed a first user input signal, without departing from the scope of the various described embodiments. The first user input signal and the second user input signal are both user input signals, but they are not the same user input signals, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context. Similarly, the phrase "when it is determined" or "when [a stated condition or event] is detected" is, optionally, construed to mean "upon determining" or "in response to determining" or "upon detecting [the stated condition or event]" or "in response to detecting [the stated condition or event]," depending on the context.

The above-described modules may be omitted according to a given embodiment or replaced by other modules that perform similar/the same operations.

Although the description of the present embodiments is explained with reference to each of the accompanying drawings for clarity, it is possible to design new embodiment(s) by merging some embodiments shown in the accompanying drawings with each other. And, if a recording medium readable by a computer, in which programs for executing some embodiments mentioned in the foregoing description are recorded, is designed in necessity of those skilled in the art, it may belong to the scope of the appended claims and their equivalents.

An apparatus and method according to the present embodiments may be non-limited by the configurations and methods of some embodiments mentioned in the foregoing description. And, some embodiments mentioned in the foregoing description can be configured in a manner of being selectively combined with one another entirely or in part to enable various modifications.

In addition, a method according to the present embodiments can be implemented with processor-readable codes in a processor-readable recording medium provided to a network device. The processor-readable medium may include all kinds of recording devices capable of storing data readable by a processor. The processor-readable medium may include one of ROM, RAM, CD-ROM, magnetic tapes, floppy discs, optical data storage devices, and the like for example and also include such a carrier-wave type implementation as a transmission via Internet. Furthermore, as the processor-readable recording medium is distributed to a computer system connected via network, processor-readable codes can be saved and executed according to a distributive system.

It will be appreciated by those skilled in the art that various modifications and variations can be made in the present embodiments without departing from the scope of the inventions. Thus, it is intended that the present embodiments covers the modifications and variations of this invention provided they come within the scope of the appended claims and their equivalents.

Both apparatus and method embodiments are mentioned in this specification and descriptions of both of the apparatus and method embodiments may be complementarily applicable to each other.

It will be apparent to those skilled in the art that various modifications and variations can be made in the present embodiments without departing from the spirit or scope of the inventions. Thus, it is intended that the present embodiments covers the modifications and variations of this invention provided they come within the scope of the appended claims and their equivalents.

MODE FOR THE INVENTION

Various embodiments have been described in the best mode for carrying out the invention.

INDUSTRIAL APPLICABILITY

The present embodiments is applicable to VR related fields.

It will be apparent to those skilled in the art that various modifications and variations can be made in the present embodiments without departing from the spirit or scope of the inventions. Thus, it is intended that the present embodiments cover the modifications and variations of the invention provided they come within the scope of the appended claims and their equivalents.

The invention claimed is:

1. A method of transmitting a video, the method comprising:
   generating a center view picture and center view generation information based on source view pictures for a group of multiple viewing positions;
   performing inter-view redundancy removing to remove inter-view redundancy from pictures for multiple viewing positions;
   packing the inter-view redundancy removed pictures and the center view picture; and
   encoding the packed pictures and signaling information including center view generation information, pre-generation information, view synthesis recommendation information, and reference view information.

2. The method of claim 1,
   wherein the signaling information further includes viewing position group information for regenerating the group of the multiple viewing positions.

3. The method of claim 2, the method further comprising,
   synthesizing intermediate view pictures based on the source view pictures,
   wherein the synthesizing generates intermediate view pictures, pre-generation information and view synthesis recommendation information.

4. The method of claim 2,
   wherein the inter-view redundancy removing performs pruning redundancy based on the source view pictures and the center view picture,
   wherein the inter-view redundancy removed pictures include one or more sparse view pictures and one or more reference view pictures.

5. The method of claim 4,
   wherein the inter-view redundancy removing generates reference view information,
   the reference view information including first information representing a number of the reference view pictures and second information representing a number of the sparse view pictures, wherein the pre-generation information includes third information representing type of pre-generation method.

6. The method of claim 4,
wherein the center view generation information includes fourth information for alternative viewing position related to the center view picture and fifth information related to method of generating the center view.

7. An apparatus configured to transmit video, the apparatus comprising:
a center view generator configured to generate a center view picture and center view generation information based on source view pictures for a group of multiple viewing positions;
an inter-view redundancy remover configured to remove inter-view redundancy from pictures for multiple viewing positions;
a packer configured to pack the inter-view redundancy removed pictures and the center view picture; and
an encoder configured to encode the packed pictures and signaling information including center view generation information, pre-generation information, view synthesis recommendation information, and reference view information.

8. The apparatus of claim 7,
wherein the signaling information further includes viewing position group information for regenerating the group of the multiple viewing positions.

9. The apparatus of claim 8, the apparatus further comprising,
intermediate view synthesizer configured to synthesize intermediate view pictures based on the source view pictures,
wherein the synthesizer generates intermediate view pictures, pre-generation information and view synthesis recommendation information.

10. The apparatus of claim 8,
wherein the inter-view redundancy remover performs pruning redundancy based on the source view pictures and the center view picture,
wherein the inter-view redundancy removed pictures include one or more sparse view pictures and one or more reference view pictures.

11. The apparatus of claim 10,
wherein the inter-view redundancy remover generates reference view information,
the reference view information including first information representing a number of the reference view pictures and second information representing a number of the sparse view pictures,
wherein the pre-generation information includes third information representing type of pre-generation method.

12. The apparatus of claim 10,
wherein the center view generation information includes fourth information for alternative viewing position related to the center view picture and fifth information related to method of generating the center view.

13. A method of receiving a video, the method includes:
decoding a bitstream of the video based on viewing position and viewport information;
unpacking pictures in the decoded bitstream;
generating a center view picture based on reference view pictures in the unpacked pictures for a group of multiple viewing positions and center view generation information in the bitstream;

performing view regenerating to view regenerate the unpacked pictures based on the center view picture, the reference view pictures, sparse view pictures in the pictures, and reference view information; and
performing view synthesizing to view synthesize the view regenerated pictures.

14. The method of claim 13,
wherein signaling information in the bitstream further includes viewing position group information for regenerating the group of the multiple viewing positions.

15. The method of claim 14, wherein the method further includes,
parsing the decoded bitstream including the reference view information, the center view generation information and information for view synthesis,
wherein the view synthesizing is performed based on the information for view synthesis.

16. The method of claim 14,
wherein the reference view pictures include a first picture and a second picture,
wherein the center view picture is generated based on the first picture and the second picture,
wherein the view regeneration generates a third picture based on the center view picture and a fourth picture included in the sparse view pictures,
wherein the view synthesizing synthesizes a fifth picture based on the center view picture, the first picture and the third picture.

17. An apparatus of receiving a video, the apparatus comprising:
a decoder configured to decode a bitstream of the video based on viewing position and viewport information;
an unpacker configured to unpack pictures in the decoded bitstream;
a center view generator configured to generate a center view picture based on reference view pictures included in the unpacked pictures for a group of multiple viewing positions and center view generation information in the bitstream;
a view regenerator configured to view regenerate the unpacked pictures based on the center view picture, the reference view pictures, sparse view pictures included in the unpacked pictures, and reference view information; and
a view synthesizer configured to view synthesize the view regenerated pictures.

18. The apparatus of claim 17,
wherein signaling information in the bitstream further includes viewing position group information for regenerating the group of the multiple viewing positions.

19. The apparatus of claim 18, further comprising:
a parser configured to parse the decoded bitstream including the reference view information, the center view generation information and information for view synthesis,
wherein the view synthesizing is performed based on the information for view synthesis.

20. The apparatus of claim 18,
wherein the reference view pictures include a first picture and a second picture,
wherein the center view picture is generated based on the first picture and the second picture,
wherein the view regeneration generates a third picture based on the center view picture and a fourth picture included in the sparse view pictures, wherein the view synthesizing synthesizes a fifth picture based on the center view picture, the first picture and the third picture.

\* \* \* \* \*